United States Patent
Camelio

(10) Patent No.: US 7,885,887 B2
(45) Date of Patent: Feb. 8, 2011

(54) METHODS AND APPARATUSES FOR FINANCING AND MARKETING A CREATIVE WORK

(75) Inventor: Brian Camelio, New York, NY (US)

(73) Assignee: ArtistShare, Inc., New York, NY (US)

( * ) Notice: Subject to any disclaimer, the term of this patent is extended or adjusted under 35 U.S.C. 154(b) by 1539 days.

(21) Appl. No.: 10/403,398

(22) Filed: Mar. 31, 2003

(65) Prior Publication Data

US 2004/0015427 A1 Jan. 22, 2004

Related U.S. Application Data

(60) Provisional application No. 60/394,974, filed on Jul. 9, 2002.

(51) Int. Cl.
*G06Q 40/00* (2006.01)

(52) U.S. Cl. .............................. 705/37; 705/35; 705/36; 705/38; 705/1; 705/2; 705/22; 705/26; 705/27; 713/156; 709/214

(58) Field of Classification Search ................... 705/7, 705/35–38, 1, 26–27; 709/214; 713/156
See application file for complete search history.

(56) References Cited

U.S. PATENT DOCUMENTS

| 5,826,024 | A | * | 10/1998 | Higashimura et al. ....... 709/214 |
| 6,240,415 | B1 | | 5/2001 | Blumberg ..................... 707/9 |
| 6,285,989 | B1 | | 9/2001 | Shoham ........................ 705/37 |
| 6,792,411 | B1 | * | 9/2004 | Massey, Jr. ................... 705/35 |
| 6,973,439 | B1 | * | 12/2005 | Wilk ............................ 705/35 |
| 7,451,103 | B1 | * | 11/2008 | Boyle et al. .................... 705/35 |
| 2002/0032626 | A1 | * | 3/2002 | DeWolf et al. ................ 705/35 |
| 2002/0099611 | A1 | * | 7/2002 | De Souza et al. ............. 705/26 |

(Continued)

FOREIGN PATENT DOCUMENTS

JP 2001325471 * 11/2001 .................. 82/214

(Continued)

OTHER PUBLICATIONS

Ronnie Gul ("Finding pic coin online"; Daily Variety, Jul. 6, 1998).*

(Continued)

*Primary Examiner*—Harish T Dass
(74) *Attorney, Agent, or Firm*—Rissman, Hendricks & Oliverio, LLP

(57) ABSTRACT

The present invention is directed to a system and method for raising financing and/or revenue by artist for a project, where the project may be a creative work of the artist. The method including registering, by at least one artist, with a centralized database, at least one or more projects, offering, by the at least one artist, an entitlement related to the artist in exchange for capital for the project of the artist. The method and system may also include searching, by an interested party, the centralized database, for the least one artist, registering, by the interested party, with the centralized database and accepting the offer by the interested party for the entitlement related to the project. The capital may then be forwarded to the artist and the entitlement provided to the interested party.

37 Claims, 63 Drawing Sheets

U.S. PATENT DOCUMENTS

| | | | |
|---|---|---|---|
| 2002/0174035 A1* | 11/2002 | Stern et al. | 705/27 |
| 2002/0198723 A1* | 12/2002 | Mowry | 705/1 |
| 2003/0038099 A1* | 2/2003 | Bauman et al. | 211/71.01 |
| 2005/0075956 A1 | 4/2005 | Artis | |

FOREIGN PATENT DOCUMENTS

| | | |
|---|---|---|
| WO | WO 02/25547 A1 | 3/2002 |

OTHER PUBLICATIONS

Surfview web pages.*
Electronic book.*
Low-buget movie.*
"McLachlan court ruling a lesson for songwriters ; Collaborations should be noted, judge's ruling says; [1 Edition]"; Greg Quill. Toronto Star. Toronto, Ont.: Dec. 14, 1999. p. 1.*

* cited by examiner

US 7,885,887 B2

METHODS AND APPARATUSES FOR FINANCING AND MARKETING A CREATIVE WORK

CLAIM TO PRIORITY

The present application claims benefit under 35 U.S.C. §119(e) of U.S. provisional patent application No. 60/394,974, filed Jul. 9, 2002, the entire disclosure of which is herein incorporated by reference.

FIELD OF THE INVENTION

The invention is directed to a new business and distribution paradigm for creative works. More particularly, the invention is directed to methods and systems for obtaining financing from interested individuals to produce a creative work in exchange for an entitlement from the author of the work. The invention is also directed to methods and systems for presenting an artist-centered business model paradigm (using the entertainment industry as an example). The invention is also further directed to a portal for allowing industry (industry professionals and other interested individuals or groups of individuals) to shop for new talent and/or purchase or license rights for particular works (for example). Such rights may include manufacturing rights, distribution rights, merchandising rights, and intellectual property (IP) rights.

BACKGROUND OF THE INVENTION

A substantial majority of artists, authors and performers have difficulty in producing and/or distributing creative works which are economically beneficial to the artist without losing the rights (and therefore much of the royalties) of the creative works or sacrificing a significant portion of the sale price. Specifically, with regard to musical creations, the majority of musicians find it incredibly difficult, if not impossible, to record, market and distribute a song/album to their fans and make a profit, unless the artist has a recording contract with a record company, and the song/album is well received (well sold) by fans and/or the public. In fact, even if the artist has a recording contract, artists generally make little to no money from recording an album since artists are either required to pay for producing the album up front, or through sales of the album. If the latter, most times sales of the album do not cover those costs. Thus, artists generally don't make any money from making albums and often times are never able to recoup the costs of making the album.

For example, according to the publication, "This Business of Music" the artist royalty on a typical record album is as follows: new artists usually typically receive 7 to 12 percent of the suggested retail list price for domestic sales. In the case of a superstar, the royalty on domestic sales may start at 15 percent or more of the suggested retail price. Accordingly, here is a typical all-in royalty calculation on a $14.98 compact disc where the artist's base royalty is 12 percent:

12 percent−3 percent (producer's royalty)=9 percent 9 percent×0.75 (25 percent reduction for packaging)
  =6.75 percent 6.75 percent×0.85 (15 percent for "free goods")=5.74 percent 5.74 percent×0.80 (20 percent reduction for CDs)=4.59 percent 4.59 percent×0.65 (35 percent reduction for reserves)
  =2.98 percent 2.98 percent of $14.98=$0.447.

The profit per album for superstars is only modestly more, about $0.56. However, superstars generally sell enough albums to cover recording and distribution costs. However, the above royalty calculations do not take into account items charged against an artist's royalty account, such as video production costs or independent promotion costs.

Another problem with the current recording business model is copyright infringement from the trading of digital copies of artists' creations over the Internet (for example) using peer-to-peer file sharing networks. Currently, both artists and the recording industry are losing millions (or perhaps billions) of dollars in lost sales due to the piracy of copyrighted works.

Accordingly, there exists a need for a method and/or system which will allow artists, for example, to raise capital on their own and profit for producing a creative work, preferably prior to producing the work, and preferably without a recording contract with a recording company.

Another problem for up-and-coming artists is the lack of exposure to a broad audience. Without signing a contract with a record company, it has been virtually impossible for new artists to gain the exposure they need to sustain grow financially and creatively. Accordingly, there is a need for a broader more effective method for artists to develop a larger fan base without sacrificing the majority of their profits or their intellectual property.

SUMMARY OF THE INVENTION

Accordingly, the invention addresses the above-noted problems with the current business model of different artist industries (especially the recording industry) and presents systems and methods for financing creative works, marketing creative works, and addresses the needs of artists, fans, industry and investors.

The invention may also include a web based application, ArtistShare, which may provide products and services to artists, fans/patrons, industry and investors that enable them to either separately or collectively, create, finance, sell, buy, distribute or invest in new or existing creative works. The invention may also offer artists a unique way to develop their audience and enhance relationships with their fans and/or patrons using, for example, existing file-sharing networks.

The advantages for artists may include:
  Increased revenue. Musicians, for example, may realize greater revenue than a traditional recording contract with a recording company—all proceeds after expenses go to the artist;
  A smaller fan/patron base is needed to generate greater revenue and produce a profit;
  Reduced risk and recoup time on investment and/or the elimination of any personal out of pocket expenses;
  Artist retains ownership and control of all rights associated with the creative work and/or the artist;
  No prohibiting or unfair contracts (recording contracts for example);
  A single system that may provide all necessary services to market their creative works to the public and collect financing for their creative works;
  Direct exposure to other industries;
  Freedom to be creative in many ways (e.g., creating incentives for patrons);

Lesser known artists or artists of different genres may have the opportunity to gain more exposure and thus build a larger fan base through an Artist Affiliate program where an artist of any level or genre (preferably artists of a higher or more diverse profile) can advertise or promote another artist to their existing fan base in exchange for a percentage of each sale generated by the promotion. The sales may be tracked by special variables contained in the links, or any other means familiar to those of ordinary skill in the art.

Any artist big or small may enjoy increased revenue by advertising or recommending fellow artists from any genre and collecting referral fees for each sale generated through the Artist Affiliate program.

The advantages for the fan or patron may include:

Opportunities to obtain one-of-a-kind and/or collectable items from the artist, as well as an opportunity to establish a more personal relationship with the artist;

The ability to maintain an account which allows them access to purchase items, services, special offers, contests, and the like, offered by participating artists A client specific application(s) operable on a computer system of a fan which may act as a private portal to ArtistShare artists, projects and products.

Industry, industry professionals and other interested individuals also receive benefits from the invention, which may include:

Reduction in risk of investment due to the increased ability to predict the success of a product based on the results of the initial online offering by the artist;

Increased effectiveness of direct target marketing through the analysis of popularity and demographic statistics generated by ArtistShare system;

Decreased overhead expenses by purchasing physical inventory directly from ArtistShare thus eliminating the middle tier.

Reduced or eliminated need to purchase and stock physical inventory.

Obtain a competitive edge by partnering with ArtistShare or an artist to offer unique proprietary or exclusive merchandise to their customers.

Access to a large and convenient searchable pool of licensable content for resale, distribution, syndication etc. . . .

Opportunities to purchase or bid on an artist's work for commercial resale. Record distributors, for example, may be provided with opportunities to purchase rights for printing and distributing compact discs;

Retail sales outlets, for example, may be provided with opportunities to purchase or bid on merchandising rights directly from the artist or a participating recording/publishing company/distributor;

Industry and Industry professionals may also be provided with tools for analyzing patterns of online sales, so that the interested party may make an informed decision to develop products while reducing risk and production expenses;

Industry may be provided branding services and corporate sponsorship opportunities for linking their products and/or services to an artist and their work (music for example) to reach their respective demographic market.

Investors and other interested individuals also receive many benefits from the invention, which may include:

The ability to re-sell (outright sale or auction) their rights at any time;

Reduction in risk of investment due to the increased ability to predict the success of a product based on the results of the initial online offering by the artist.

Investors may be provided with means to buy, sell and trade publishing rights, copyrights and intellectual property rights in new or existing works so that the investor may collect licensing royalties for, in turn, licensing the creative work.

Investment tools may also be provided which allows the investor to determine the value of such rights.

The invention may make use of a combination of existing, proven business models including banking, patron systems, merchandising partnerships, direct marketing, publishing, file sharing and internet networking, file compression, audio/video technologies, and online auctions (for example).

Accordingly, in a first aspect of the present invention, a method for generating capital for a project of an artist may include transmitting data from a server to a client via a network for presenting an offer from the artist, for example, to an interested party, the offer for an entitlement related to a project in exchange for capital for the project, for example, and the project includes at least one or more creative works by the artist or other party. The method also includes receiving at the client such data and presenting the offer to the interested party, accepting the offer by the interested party, receiving data at the server from the client accepting the offer and processing of the acceptance data by the server.

In another aspect of the invention, a method for generating capital for a project of an artist is provided and may include communicating an offer by an artist, for example, to an interested party for an entitlement which may be related to the artist at a predetermined level of patronage among a plurality of levels of patronage in exchange for a corresponding predetermined amount of capital for the project. The project may include at least one creative work. The method may also include acceptance of the offer by the interested party for patronage in the project at one of the levels of patronage among the plurality of levels and providing the entitlement in exchange for the capital.

In another aspect of the present invention, a system for generating capital for a project of an artist may include transmitting means for transmitting data from a server to a client via a network for presenting an offer from the artist, for example, to an interested party. The offer may be for an entitlement related to the artist in exchange for capital for the project, where the project may include one or more creative works of the artist. The system may also include receiving means for receiving at the client such data and presenting the offer to the interested party, transmitting means for transmitting data back to the server from the client accepting the offer and processing means for processing the acceptance data by the server.

In yet another aspect of the invention, a system for raising capital by an artist for a project is provided, where the project may include one or more creative works of the artist. The system may include communicating means for communicating an offer by an artist to an interested party for patronage in the project at a predetermined level of patronage among a plurality of levels of patronage in exchange for a corresponding predetermined amount of capital for financing the project, for example. Each level of patronage may include an associated entitlement related to the artist. The system may also include acceptance means for accepting the offer by a patron for patronage in the project at one of the levels of participation among the plurality of levels.

In another aspect of the present invention, a method of managing a right in a creative work is provided and may include collecting information on a plurality of creative works, each creative work having one or more corresponding rights for sale or license, storing the information in a searchable database, offering individuals an opportunity to purchase at least one of the one or more right in at least one of the creative works of the plurality of creative works and purchasing the one or more rights.

In another aspect of the present invention, a system for generating capital for a project of an artist is provided, where the project may include one or more creative works. The system may include a database for storing information related to a plurality of creative works where each creative work having a respective owner. The system also includes a server hosting an application for presenting an offer from the owner of a respective creative work to an interested party. The offer may be for an entitlement related to the creative work in exchange for capital for the project. The server communicates with a client for presenting the offer to the interested party.

In another aspect of the invention, a method of creating capital for an artist, for example, is provided and may include registering, by at least one artist, with a centralized database, at least one or more of a completed creative work and/or one or more of an uncompleted creative work. The method also may include offering, by the at least one artist, an entitlement related to the at least one of the completed creative work and/or the at least one of the uncompleted creative work in exchange for capital, for example, for a project of the artist or other party, where the project may include at least one or more second creative works. The method further may include searching, by an interested party, the centralized database, for the least one artist, registering, by the interested party, with the centralized database, accepting the offer, by the interested party, for the entitlement, forwarding of the capital to the artist and receiving the entitlement by the interested party.

In yet another aspect of the invention, a system for creating capital for an artist or other party is provided and may include a server having one or more application programs operable from a remote client for registering, by at least one artist, with a centralized database, at least one or more of a completed creative work and/or one or more of an uncompleted creative work, presenting an offer, by the at least one artist, to an interested party for an entitlement related to, for example, the at least one of the completed creative work and/or the at least one of the uncompleted creative work in exchange for capital for a project of the artist, the project comprising one or more second creative works. The application programs may also be operable to present a query interface for allowing a search, by an interested party, of the centralized database, for the least one artist, registration, by the interested party, with the at least one artist found in a query of the centralized database and/or a second database of interested parties and accepting of the offer by the remote client, by the interested party, for the entitlement.

In another aspect of the present invention, a web page for generating capital for a project of a first artist is provided and may include an advertisement for the project of the first artist, the project comprising at least one creative work of the first artist and a link regarding an offer for an entitlement related to the first artist in exchange for capital for the project, wherein the link allows the interested individual to accept the offer and provide the capital.

Other aspects of the invention include computer application programs and computer readable media, for performing one or more of the methods recited in the above-noted aspects, as well as web pages and the like for presenting the various aspects of the invention over the Internet (for example).

These and other advantages, objects and features of the invention will be apparent through the detailed description of the embodiments and the drawings attached hereto. It is also to be understood that both the foregoing general description and the following detailed description are exemplary and not restrictive of the scope of the invention.

BRIEF DESCRIPTION OF THE DRAWINGS

FIGS. 23B-42 are block diagrams illustrating attributes one or more web pages and/or one or more links for public web pages of the ArtistShare system according to an embodiment of the present invention.

DETAILED DESCRIPTION OF THE PREFERRED EMBODIMENTS

Figure 1:
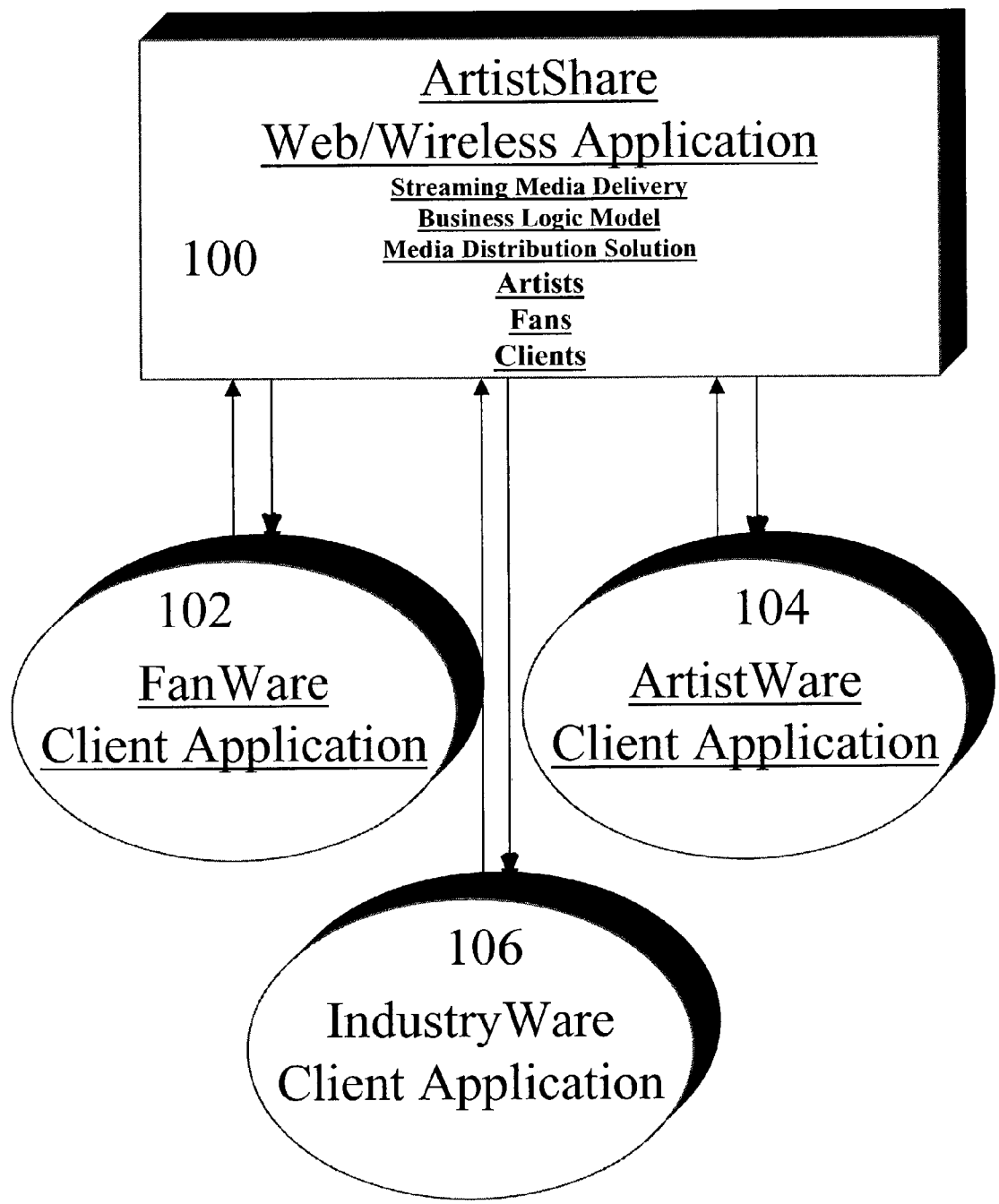
FIG. 1 is a diagram depicting an overview of the ArtistShare system according to the invention.

The invention will be described with reference most times to the musical recording industry and musical recording artists. However, the present invention has much broader application to industries related to creative works in art, writing, film, photography and any other creative project or work and corresponding industry.

Terminology:

An Artist may be, but is not limited to, an author, musician, composer, painter, sculptor, filmmaker, actor/actress, software engineer, architect and any other individual(s) who authors or creates a new work.

A Fan may be, but is not limited to, a consumer, admirer or follower, mentor and any other individual(s) interested in the Artist's work.

A Patron may be, but is not limited to, a fan (a consumer, admirer or follower, mentor and the like) that registers with ArtistShare and/or contributes to or purchases an Artist's project, work or the actual Artist.

An Investor may be, but is not limited to a patron or group of patrons, corporations, private companies, and any individual(s) interested, for example, in IP investment, corporate branding through advertising, partnership or any other business relationship with an artist or an artist's work.

An Industry individual of entity may be, but is not limited to investors, record companies, publishers, movie production companies, retail outlets, product distributors, and the like, or any individual(s) interested in financing, marketing, advertising, selling, licensing or distributing an artist's work.

Overview of Some of The Embodiments The Invention

The invention may be directed to the following embodiments which may be inter-related and may be used separately or may be used to complement one another to form a systematic and comprehensive system for funding, marketing, purchasing, licensing and distributing creative works and talent.

Group I. In a first grouping of embodiments, methods and systems are provided which may allow artists to raise capital for funding a project (e.g., song, album, etc.), or market an existing work (or service) to fans and users (industry professionals, other artists, and the like) through an Internet (for example) portal.

In some related embodiments of Group I, a system and method for lesser-known artists or artists of different genres for increasing their exposure is provided. This allows the lesser-known artist or an artist of a different genre to build a larger fan base. Specifically, this embodiment may allow an artist of any level or genre (preferably artists of a higher or more diverse profile) to advertise or recommend on a home page of the artist (or other web page) another artist to their existing fan base in exchange for a percentage of each sale generated by the recommendation. The sales are tracked by one or more variables contained in one or more links to the associated artist. Thus, any artist big or small can enjoy increased exposure and/or revenue by advertising or recommending fellow artists from any genre and collecting referral fees for each sale generated through the system.

Group II. In a second group of related embodiments, the invention may include an industry portal where industry professionals including, for example, retailers, wholesalers, distributors, producers, industry executives, corporate management, investors and the like, or other interested parties may browse and shop for talent, available creative content and associated rights thereto for purchase or license directly from the artist or an owner of the right. The associated rights may include manufacturing of compact discs and other media for playing the finished recordings, distribution of the media, publishing rights, merchandising rights, as well as the copyright, trademark and/or other IP right in the creative work.

The rights may be outright sold or auctioned according to any online/offline auction system. This group of embodiments may thus allow users (individuals, corporate entities and the like) to peruse a database of artistic creations (old, new and existing, finished and unfinished) to find particular works to purchase or license any one or more of the associated rights. For example, a movie producer may search the database to find songs to license for use in an upcoming movie. A record distributor might want to obtain the distribution rights to a song for distributing through a retail outlet. A book publisher may review a database of fiction to obtain the rights to distribute the book (e.g., Barnes and Noble, Inc., Simon Schuster, etc.).

Group III. A third group of related embodiments is directed to a distribution system (kiosk) for retail establishments, for example (shopping malls, grocery stores, and the like) and/or wholesale distributors. The kiosk may be a computer-based system, which may access completed artist works (or works in progress) for purchase/licensing by a patron or client. The system may be linked to a master database of artists' works, in which a patron can select and receive the work through any means of distribution offered. For example, the patron can have a CD custom made to his or her individual tastes. A record outlet could feasibly eliminate inventory and print CD's to order for their customers. Moreover, the kiosk may be used by fans/patrons/other individuals to participate in projects.

Overall System

As shown in FIG. 1, the ArtistShare system invention may include four main components: ArtistShare 100, a network (internet) server based system to which artists may post creative works and other projects, ArtistWare 104, which may be a client based application for authors and artists to interact with ArtistShare, IndustryWare 106, preferably a client based application for industry personnel, for example, including executives from the designated industries associated with various creatively produced products, and FanWare 102, a client application for fans and patrons. One skilled in the art will appreciate, however, that invention may only include the ArtistShare component to which artists, fans and industry can access and interact with through an Internet portal using, for example, a web browser.

Figure 2:
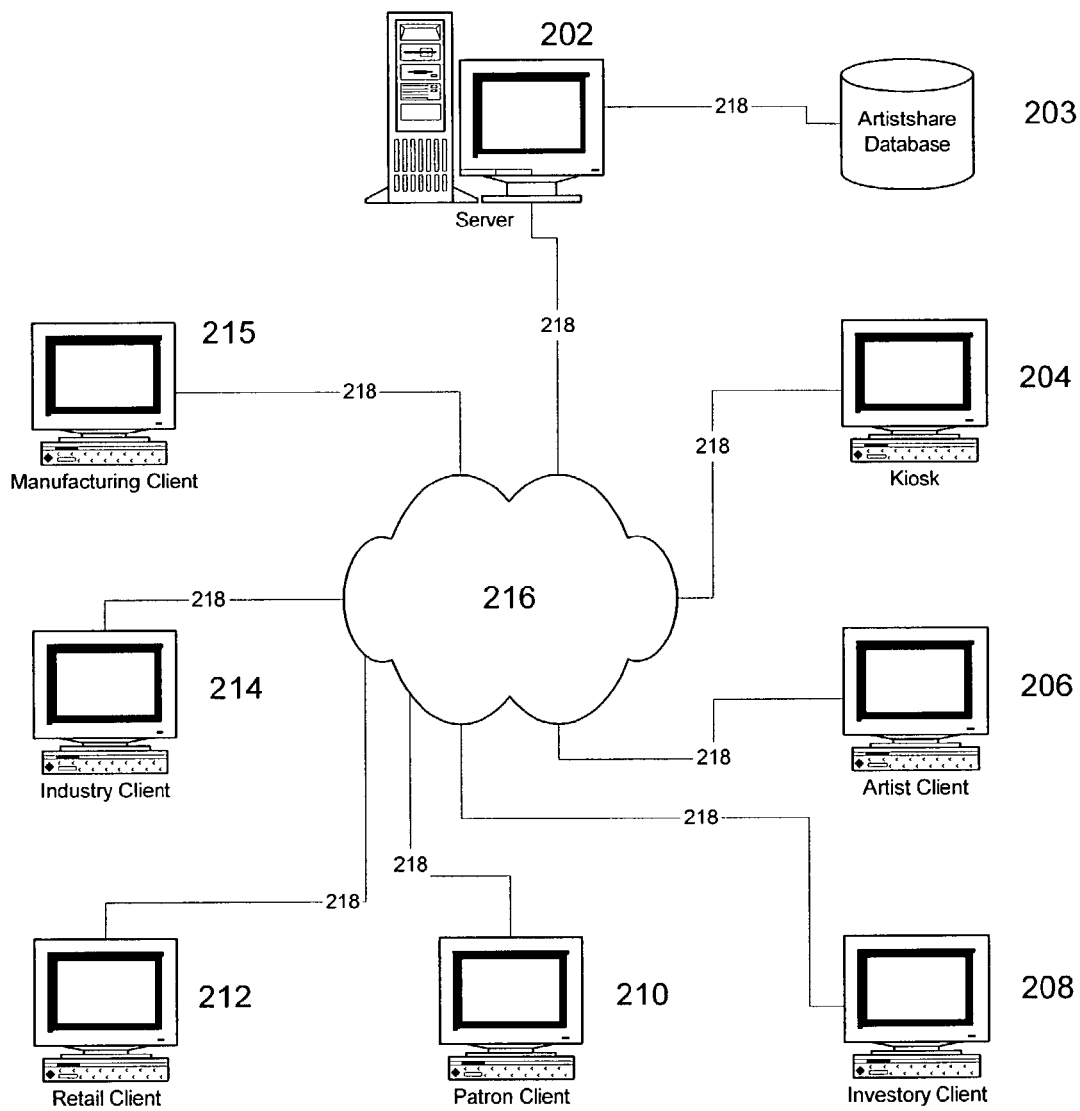
FIG. 2 illustrates an exemplary computer system operational for performing the methods and process according to embodiments of the invention.

FIG. 2 illustrates a system which may be used for operating the methods according to the various embodiments, and may follow, for example, the client/server network architecture. Examples of client/server network architecture may be seen in U.S. Pat. Nos. 6,397,253 and 6,466,937, for example, the disclosures of which are herein incorporated by reference. As shown, a centralized ArtistShare system includes a host 202 in communication with one or more databases 203. The database may be provided with the host or may be a separate database and database management system in communication with the host either directly or via a network. The host may be in communication with any one or more of a client computer 204 of an artist, a client computer 206 of an Investor, a client computer 208 of a fan (patron), a client computer 210 of a retail establishment, a client computer 212 of an Industry Professional (individual, entity, or company) and a client computer 214 of a manufacturer (compact discs for example). Each of the clients may communicate with the host via a computer network which may comprise the Internet. Communications 218 between the various clients and the Internet may be of any wired or wireless protocol familiar to one of skill in the art. Moreover, the clients may be any wired or wireless device including but not limited to telephones, personal digital assistants (PDAs), an email device (e.g., Blackberry device), personal computer, kiosk, television, any future means of communication and the like.

One of skill in the art will appreciate that the computer systems outlined above which may be used with any of the embodiments of the invention, may include various hardware and operating software, familiar to those of skill in the art, for running software programs, browsing the Internet, communicating and/or operating with any device, including, for example, a printer, a display, a keyboard, a mouse, a modem, a phone, a wireless device, the Internet, a computer network, a sound system, and any other internal or external device. Such computer system may also include RAM memory, ROM memory, at least one hard-drive, other storage media, and other internal and external components which may be used for carrying out the operation of the computer and embodiments of the present invention. Moreover, such computer systems may include one or more processors for processing and controlling the operation of the computer system, thus, embodying the processes of the various embodiments of the present invention. To that end, the processor, associated hardware and/or communications may be a means for carrying out the various method embodiments.

The ArtistShare system may provide products and services to any one or more of artists, fans, patrons, investors, industry (retail outlets, distributors, recording companies, corporations, and the like) or other interested parties. The interaction among these groups enables each of the groups either separately or collectively to create, finance, sell, buy, distribute and invest in new creative works (music, film, photography, paintings, books, software and the like).

Figure 6:
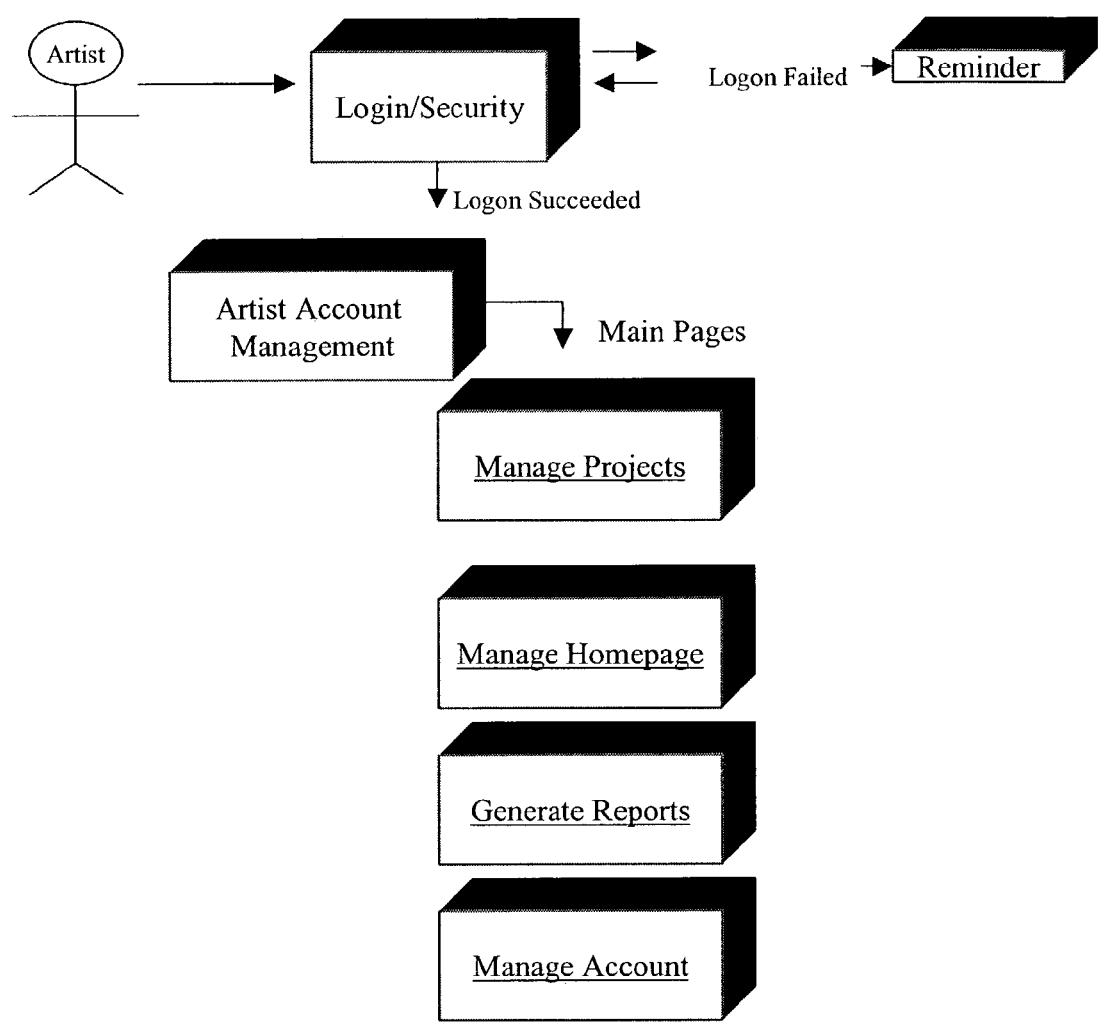
FIGS. 6-22 are block diagrams illustrating attributes of one or more web pages and/or one or more links for managing an artist account in an embodiment of the present invention.
Figure 62:
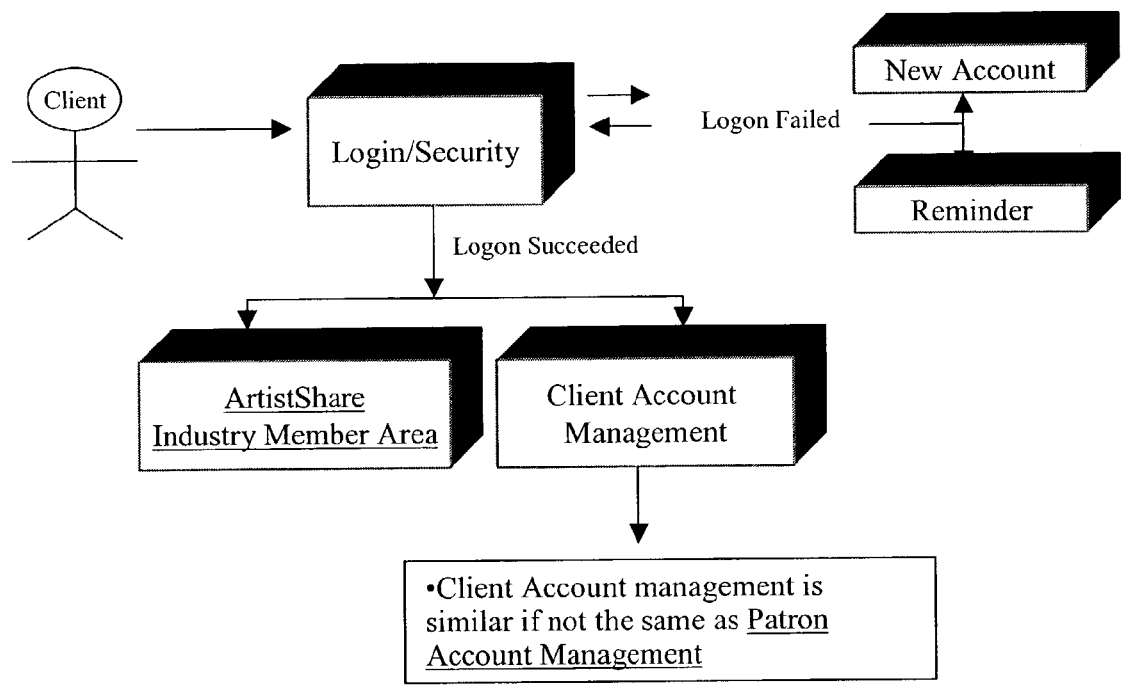

The ArtistShare system may be setup and run on the World-Wide-Web, thus using a plurality of websites and web pages, using, for example, html, xml and java programming, to establish the system according to the invention and perform the methods according to the embodiments. Overviews of web pages for these embodiments are shown in FIGS. 6-62, and the associated written description included below. Using such websites and associated web pages and services, the respective users of the system may register a respective account with the ArtistShare host to access content of Artists, for example. However, public web pages and web services of the ArtistShare system, which may not require an account, may be available so that an individual can peruse publicly available material of artists. This public material allows the individual to make a determination on whether they should register an account with an artist. In some embodiments, for example, fans may create fan accounts, industry professionals may create industry accounts, and artists may create artist accounts and the like. Each account may be type specific, in that services offered by one account are only available to that type of account. For example, artist accounts may only allow projects to be posted for funding. Fan/Patron accounts may only allow purchasing of patronage to artist websites associated with the ArtistShare system and the purchase of associated goods. Industry accounts may only allow access to web pages for investing, licensing, purchasing of rights to created works. Information entered on the web pages or through web services for each account is tracked and stored in one or more databases.

Each of the client-based applications may also include an audio and video file management system/software (AV system) which may be used in conjunction with or operate complimentary to the ArtistShare system. The AV system allows for creation of streaming and downloadable media in any available or future format including MP3, WindowsMedia, WAV, AIRR, AVI, MPEG, and Flash (for example), from files and from audio CDs. The AV system for ArtistWare, for example, may also allow uploading of media from an artist directly to an artist account on the ArtistShare system. ArtistWare may also manage a locally stored database of the artist's creations, which, though additional features such as CD burning capabilities, may be archived and physically distributed.

Group I Embodiments

The computer system utilizing a client-server architecture, as outlined above, may be used in the embodiments of Group I to operate application software for presenting offers to users on a client computer, for entitlements and/or patronage levels from the artist in exchange for capital for a project of the artist. The capital may be used to fund the project, where the project may include one or more creative works of the artist (or other artists). Entitlements may be any product, service and/or benefit conferred from the artist or other party to the user. The users, through the client computer, can accept (or reject) the offer, thereby sending data back to the server for such acceptance. The server application then processes the acceptance, thereby the capital may be provided from the user via the client by using a credit card, debit card, check, wire transfer, or any other Internet payment method familiar to those of skill in the art. The entitlement may be provided at any time dictated by a specific offer—thus, it may be provided at a predetermined times, or at various predetermined intervals. Accordingly, these embodiments (along with other embodiments) are detailed below with reference to a web-based system for providing the offers for different entitlements to clients.

Figure 3:
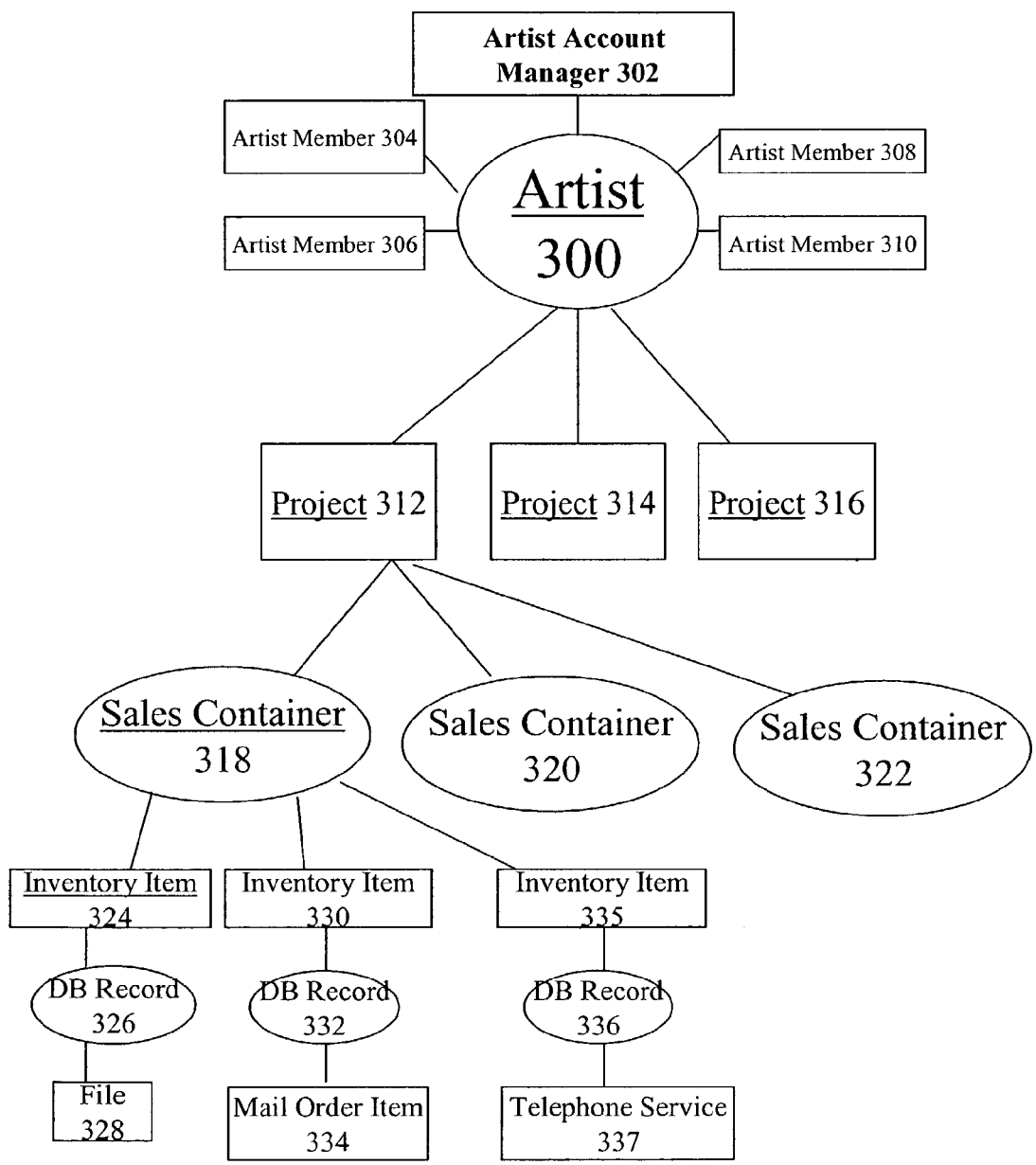
FIG. 3 illustrates a business logic diagram of ArtistShare system according to one embodiment of the invention.

To that end, the various components of the ArtistShare system allow for a business paradigm that focuses on the artist. Accordingly, as shown in FIG. 3, an artist account 300 may include an artist account manager 302, and one or more artist members 304, 306, 308 and 310. The artist may comprise a single person (musician, writer, actor, educator, programmer, artist, manager, and the like) or an entity (such as a band). In addition, the artist also preferably designates at least one individual (Artist Member) to be an Account Manager who acts as an Administrator on the account. The Account Manager may create artist Member accounts of people associated with the artist. Artist Members may be anyone authorized by the artist or the Account Manager to manipulate the artist account.

A project may be private (for Artist Members) and may be public (for Fans/Patrons/Industry/Investor), and preferably, a combination thereof. In that way, the artist may use the private portion to organize his thoughts and goals (both creatively and financially), and either allow the public to see this process or keep it private.

The artist may create one or more projects 312, 314 and 316, each representing a creative work or works being developed or promoted by the artist. It is these projects for which the artist may seek to either finance or market to fans, industry professionals and like. Each project is preferably owned outright by the artist and may include, for example, one more sales containers 318, 320 and/or 322, which may represent products and services which may be sold or licensed to interested parties. These products and services may also be included as entitlements to a user. The cost of a product or service (i.e., entitlement) may be used then to fund a project.

Sales containers, which may include but are not limited to:
auction containers,
sales item containers,
subscription series containers,
subscription access containers,
pay-per view containers,
licensing containers, and
patron sponsorship containers, which may be used to organize and present artist works and entitlements to interested parties.

Each sales container may include a core set of information describing the offering, the pricing structure, as well as any additional attributes specific to the container type. The products and services offered in the sales containers may be comprised of one or more inventory items 324 and 330, for example. The completed sales container becomes the product.

For example a subscription series container may include services which deliver news, information, products and services to an individual on a regular basis. Accordingly, song bytes, video bytes, press-releases, and other assorted artist information may be delivered to an individual daily, weekly, monthly, and quarterly, for example.

A sales item container, for example, may include a combination of inventory items such as downloadable songs, sheet music for the songs and a one hour telephone lesson by the artist on songwriting techniques which is purchased once and delivered to the patron both immediately (download songs and scores) and at a later date (scheduled time for telephone lesson).

Inventory items may include two parts: an inventory record (database) 326, 332, and an associated physical item (computer file, page, actual physical item that can be delivered to the customer through any means available). In the database each inventory item may be associated with a given sales type. A sales type may be, for example, available item (the item already exists) or pre-sale item (the item does not yet exist).

Thus, as shown in the figure, inventory items may include (for example) downloadable files 328 (such as an MP3 file of a song the artist has produced or a text document on a chapter of a novel if the artist is a writer). An inventory item may also be a physical product 334 such as a compact disc or work of art, which may be delivered via courier to the individual making the purchase. An inventory item could be a service 337 offered by the artist such as a private lesson over the telephone or a personalized birthday phone call.

To create an inventory item, for example, a first step may be to create an inventory item record in an inventory database by an artist. The database may include respective fields for the inventory item including a sales type, the name of the item, the description, the copyright information, product category, delivery method, item availability date, and a shipping size and weight, if required (for example). Next, the artist may upload an associated inventory file (for a product concerning a file download, streaming media or any other computer based delivery method).

Moreover, each inventory item may be obtained either freely (for promotion), or may be purchased as specified by the artist (for example). Accordingly, a shopping cart feature is preferably incorporated with the ArtistShare system for fans to purchase such inventory items via sales containers from the Artists.

Accordingly, embodiments of the invention center around the ArtistShare web-based application. As briefly described earlier, ArtistShare is an application which allows artists to list projects to solicit financing and/or market to their fans, industry professionals, investors and/or the public at large. By registering an account with ArtistShare, an artist may set up projects (the authored works), for fans/patrons to contribute financing and/or set up access for currently available projects. Registering with the ArtistShare application may also include other features for an artist including, for example, facilities and processes for designing and implementing a website/home page (and associated web-pages) for the artist for fans and the public to view. Fans and the public may be able to view such artist home pages upon registration with the ArtistShare system. Registration allows administrators of the network to collect data on the individuals viewing the site so that operators/owners of the ArtistShare system, as well as the artist, industry professional and other interested parties can gain useful demographic, marketing and other information.

Figure 5:
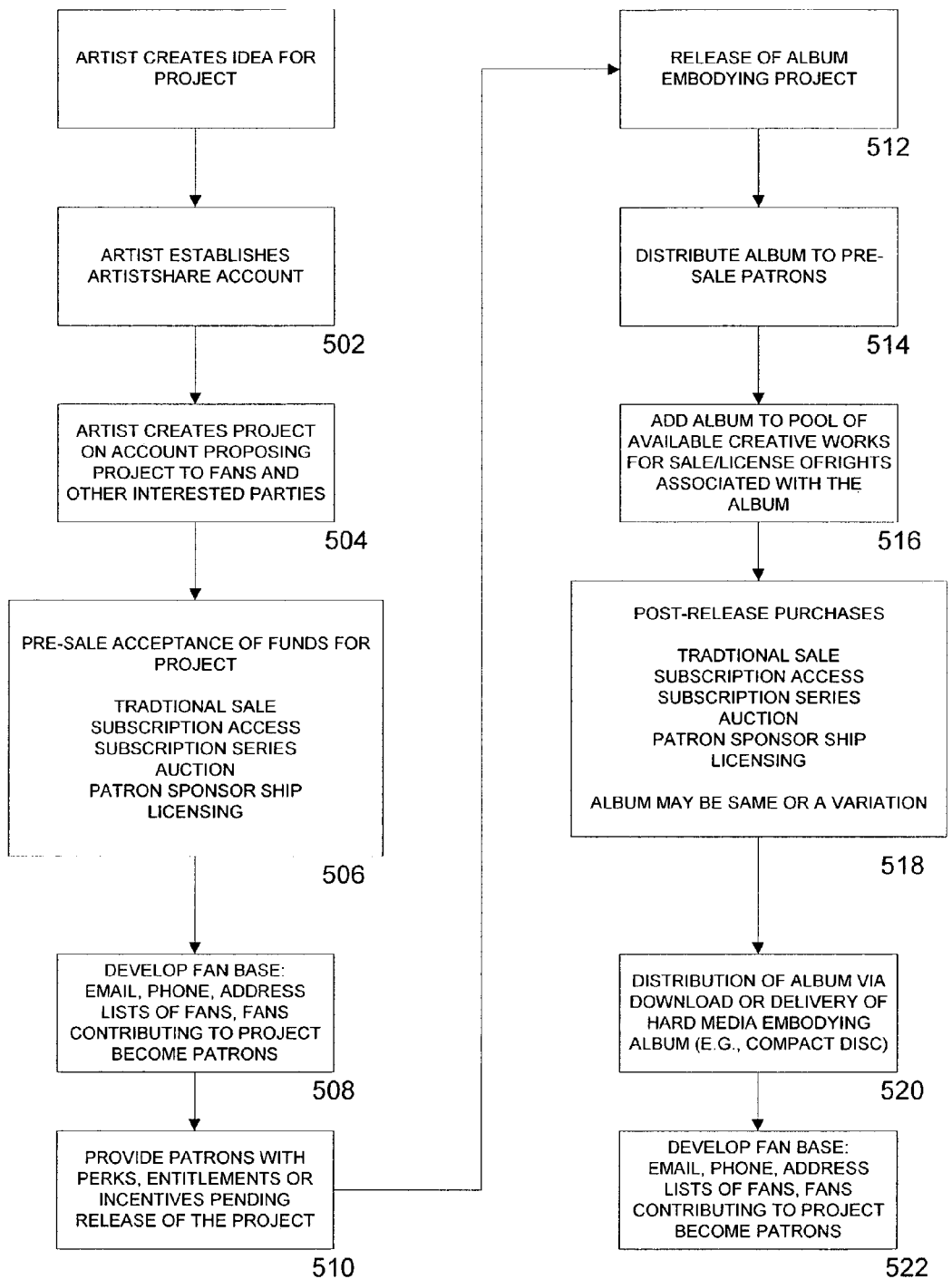
FIG. 5 illustrates a flowchart of a process flow for an artist promoting and funding a project.

The basic flow of an artist raising capital for a project is illustrated in FIG. 5. Using this system, a musical artist (for example) having an idea for creating a new musical work 501 for registers with ArtistShare and obtains an artist account 502 so that he may raise the capital for financing the new work through his current and future fans. With his ArtistShare account, he may create a new project for his idea 504, and present it to fans. For the new project, the artist may devise a plan for financing the new work. He may create one or more levels of participation for a fan to contribute money for the project. For each level of participation, the artist may also create corresponding entitlements for the fan in exchange for the contribution. Alternatively, the artist may have already produced the musical work, and has instead listed the completed work as a new project for fans to purchase.

With regard to a project not yet produced, an artist may accept funds in a "pre-sale" 506 environment (i.e., prior to the musical work being completed and ready for distribution to the public). The pre-sale contributions may be a traditional sale, where a predetermined cash amount is contributed, or the sale may be a subscription service, where the fan pays for access to, for example, recording session videos, jam sessions and the like. Such subscription access may be a subscription series where there are a series of media about the production of the work which the fan may be able to review at different points in the development/production cycle.

Entitlements 510 may also be auctioned off to fans. For example, a "day in the studio" with the artist may be sold or auctioned to the highest bidder. Or, tickets to the artist on his next tour, an autographed "limited edition" digital disc, and the like, may all be auctioned for obtaining the resulting capital that an artist wishes for the particular project.

Other methods of raising the capital may include patron sponsorship, where for a predetermined (preferably a large amount) amount of capital, the sponsorship would enable the contributing fan to be listed as a "producer" of the project of the artist.

The contributions to the project may also be obtained through a licensing model. In such an arrangement, generally, the results of the project, i.e., rights to the recorded work, are licensed, for example, to a record company, a distribution company, merchandising company, and the like.

Additional incentives and perks may be provided to the registered, contributing patrons prior to the release of the project.

Some of the embodiments described above may be used to raise capital and exemplify the many capabilities of the ArtistShare system. One skilled in the art will appreciate, however, that any method of raising capital may be incorporated for use with the invention.

Through the registration of fans, the artist builds a fan database 508, which may include the names, addresses, phones and email addresses of fans. Such a database may be shared/sold/licensed to others artists or third parties.

The released project may be added to a pool of creative work to sell or license the corresponding rights to the work 516.

Upon the completion of the project, the creative idea is brought to fruition and is now a product (e.g., a song or collection of songs—album) 512, which may then be distributed to the patrons who contributed to the project (pre-sale customers) 514. The product may then be distributed post release in at least the methods described for the pre-release sales (i.e., traditional sales item, subscription access, subscription series, auction, patron sponsorship, licensing and the like) 518. The product may be the same as the product that was purchased pre-sale, or may be a different product. For example, the pre-sale product may contain special content for those fans that contributed to the project. Specifically, the special content may be enveloped in a "limited edition" digital disc which includes video footage of the recording sessions, or special tracks not available in the post-release product.

What the present embodiments allows for in this example is the artist to pay for recording, producing and mastering costs, and collect a profit, with only a limited number of products sold. For example, an artist estimates that he will need $30,000 to record, produce, mix, create a master recording and burn compact discs to distribute. He also would like to make a $70,000 profit on the project by the end of the first year of sales. Thus, a total financial goal for the project is $100,000. If the artist used a recording company for the project, in order to recoup the recording and production cost and collect a profit of $70,000, at a rate of $0.45 per CD, the artist would need to sell about 155,555 CDs. However, if the artist used the ArtistShare system according to the invention, the artist would only need to sell about 7,370 CDs to recoup recording and production costs and collect the $70,000 profit. This figure depends only on the sales of CDs alone, and does not take into account other sources of revenue (e.g, subscription services, merchandising) from the project for the artist. To that end, the number of CD sales needed for an artist to profit $70,000 may be far less if the artist takes advantage of patron sponsorships, fan subscriptions, auctions and corporate sponsorship opportunities available through the ArtistShare system.

One of the features of the present invention is a patronage level system. Accordingly, for projects (or other completed works), there may be levels of patronage/sponsorship, with each level of patronage reflecting a minimum/maximum predetermined monetary contribution and corresponding entitlement(s).

For example, an artist having an ArtistShare account decides to embark on a new recording project which they list on ArtistShare using the mechanisms associated with the various web pages described above. Fans/patrons are then allowed to join the project at various levels of participation (to become patrons). For example, for $15, a fan/patron may be guaranteed a downloadable recording of the final project. At higher participation levels, the fan/patron might, say, receive an autographed picture of the artist, or even be invited to attend the recording sessions and participate as an executive producer in the project.

Below is an example of a list of levels of patronage of a project according to an embodiment of the invention. The following examples include possible products/entitlements which an artist may provide to fans in exchange for a preferably predetermined cash amount (or other contribution):

Basic Patron $10—Entitlements may include:
   First to download the artist's latest release;
   A listing on the album page as making the recording possible, personalized correspondence from the band.
   Discounted CDs.
   Auto email notification of artist concerts near you.
Level II Sponsor $20—Entitlements may include:
   Same entitlements as the $10 level, but also include special T-shirt, Cap, Lighter, and Coffee Mug only for patrons of the latest record.
Level III Sponsor $40—Entitlements may include:
   Same entitlements as the $20 level, and also includes limited edition monogrammed CD packaging for patrons with name listed on artist's website. Collector's item quality packaging.
Level IV Sponsor: $60—Entitlements may include:
   Same entitlements as the Level III patron, but also includes listing on artist's home page as sponsor.
Level V Sponsor: $100—Entitlements may include:
   Same entitlements as the Level IV, but also includes two tickets to a concert near the patron.
Sponsorships (corporate/patron or otherwise):
   An individual or entity donating $10,000 (for example) for patron sponsorship may be listed as executive producer. This may be limited to a predetermined number of sponsors.
Contest Entry: $15—Entitlements may include:
   enter to win and spend a day in the recording studio with the artist and be listed as a platinum sponsor;
   access to special section of artist's website where the fan can listen to streamed unreleased live or studio performances;
   view the live 'Studio Cam' to see how the record is going;
   preview new songs before anyone; and/or
   view a video guitar lesson from the band's guitarist.

Still other levels of patron sponsorship may include displaying patron names dynamically on the artist's web page, giving patrons a choice of limited edition album covers, special vinyl releases (which are difficult to pirate), and an album cover design contest.

Money contributed by fan/patron may be placed in an escrow, to protect the interests of both the fan/patron and the artist. If an escrow is used, upon completion of the project and upon the patron receiving the entitlement(s) corresponding to the patronage level, the capital in the escrow account is turned over to the artist. Alternatively, each artist may be established as a merchant, where the sales/contributions/entitlements are managed as the sale of products and services with a, for example, shopping cart feature. Under the merchant sales model, the artist may receive the contribution directly.

For a new project, when the artist has reached his financial goal (for example) for the project, the project may be then produced. Daily updates on the process may be available to patrons of the project, which for this example may include rough mixes from the recording session and video clips. Once the recording, mixing and mastering of the project is complete, the artist may upload their newly finished album to the ArtistShare system. In some embodiments of the present invention, the project may be started prior to completing the artist's financial goal, and/or prior to any patronage to the project.

For this example, Patrons may receive downloadable files of the finished compact discs. Patrons may also receive a file which allows them to burn an enhanced CD/DVD (enhanced disc), containing the complete album plus outtakes, photos, and video. The enhanced disc may only available to those who subscribed to the project (e.g., patrons). Any commercial release of the recording will only contain the music, and thus the enhanced disc becomes something of a "collector's item", although the enhanced version may be released commercially as well.

One of skill in the art will appreciate that an owner and/or operator of the ArtistShare system, in order to operate the network, may collect fees from artists and/or users (fans, patrons, industry, investors, etc.) to use the system. Alternatively, or in addition thereto, a percentage of one or more transactions carried out between users and the artist may be collected by the operator of the ArtistShare account. The transactions may include, for example, the contribution made to an artist by a fan, the license fees for a work paid by the industry professional in distributing the work to the general public in a retail location, promotional material, and whatever else the artist may sell/license to users of the ArtistShare system.

FIGS. 6-62 illustrate, for example, attributes of one or more web pages and/or one or more links for embodiments of the present invention. One of skill in the art will appreciate, that access to some pages may be dictated by registering an account with the ArtistShare system. The registration process may use existing security-logon features, where a user may succeed logging onto the system or fail. Accordingly, such logon attributes are shown in the figures as illustrative and example purposes only, and may or may not be used with the other attributes illustrated in the respective figure.

Accordingly, FIG. 6 illustrates a block diagram of one or more web pages and/or one or more links for management of the artist account according to an embodiment of the present invention. As shown, the artist logs into the account, which may be at the ArtistShare home page. With a successful login, an individual is preferably designated by the artist to have administrative rights for managing the account (Manager).

When the Manager then gains access to the account, the link to the administrative pages may be active. This link may lead the Manager to other links for opening existing projects, creating new projects, managing a home page for the artist, generating reports, managing media that the artist has collected or created, and managing other aspect of the account (e.g., financials, promotion, and the like).

Figure 7:
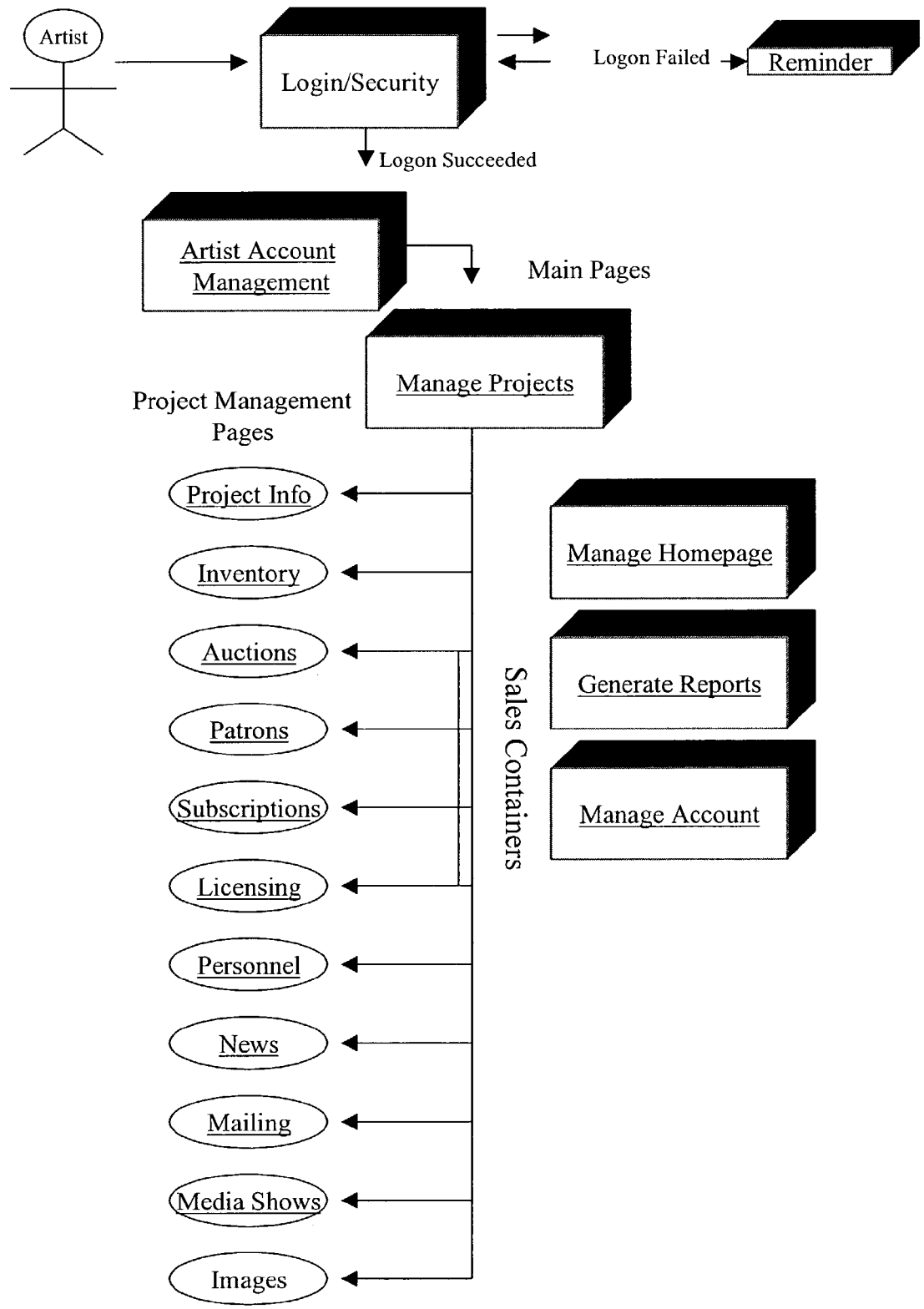
Figure 8:
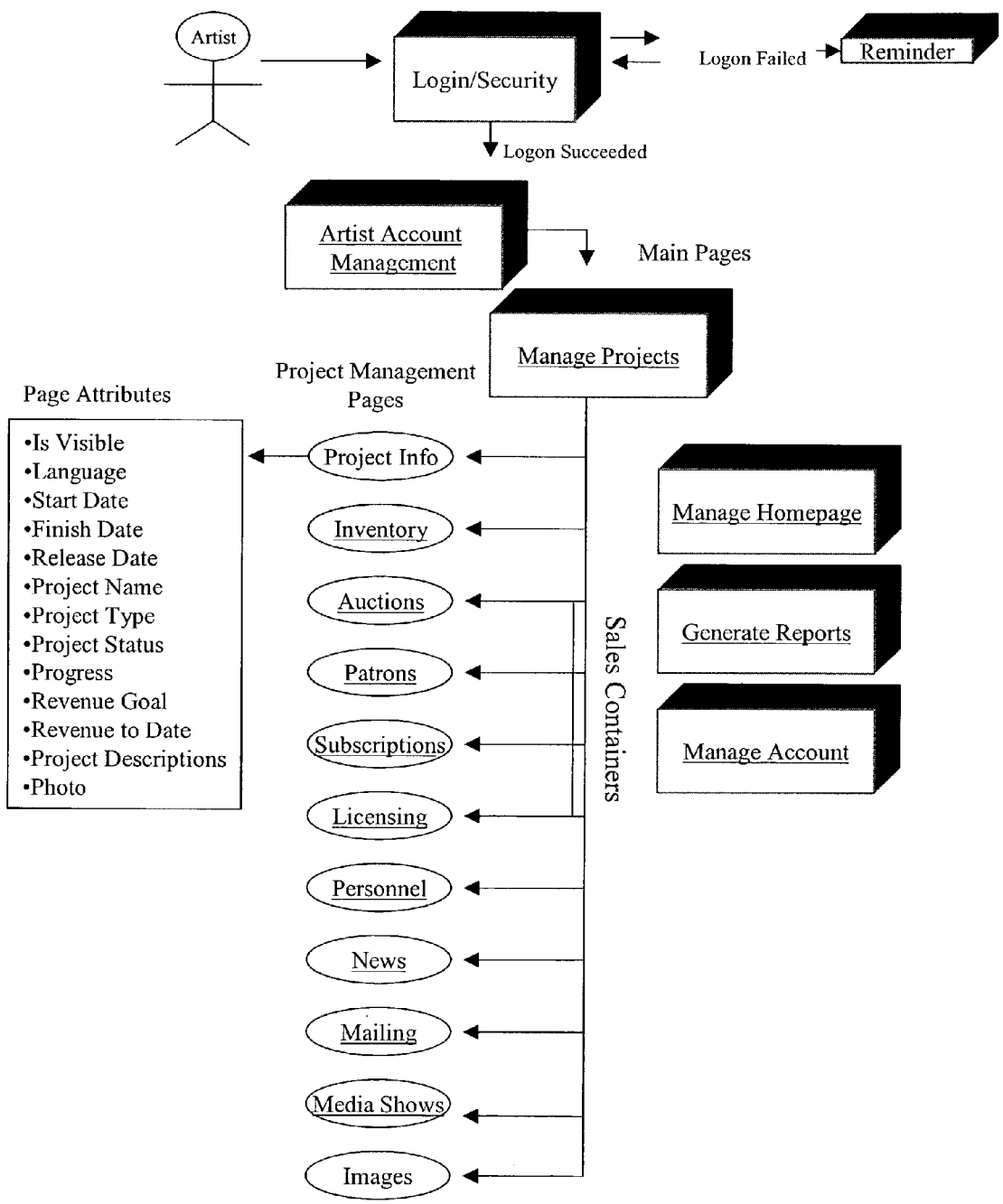

FIG. 7 illustrates attributes one or more web pages and/or one or more links of Open Projects. When directed to the associated web-pages corresponding to this link, the Manager may obtain information such as overall Project Information (FIG. 8) which includes, for example, the project name and type of project the project type (e.g., song, album, book, photo, painting, video, movie), language of the project, project description, start date and estimated completion date, prospective release date, the project status and progress (e.g., a diary of what has been completed/planned), a revenue goal and revenue to date.

Figure 9:
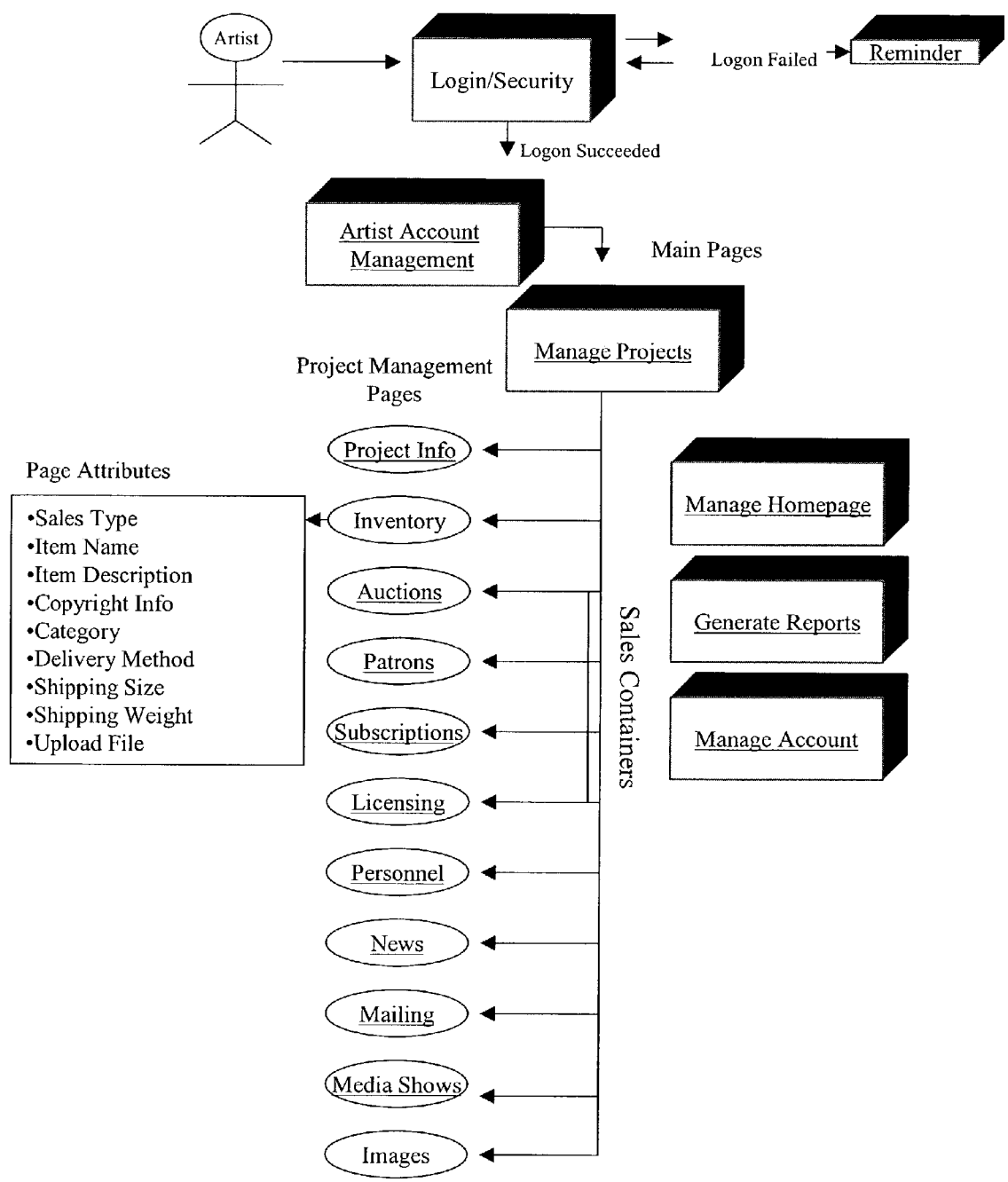

An inventory link directs the ArtistManager to web pages related to the inventory items of the project. As shown in FIG. 9, such web-pages may include identification information for the inventory item (name and description), the sales type of the inventory item (pre-sale, existing item, etc.), copyright information (e.g., has a copyright registration been applied for, who holds the copyright, and the like), the category of the item (e.g., text, mp3, mpeg, pdf and the like), the delivery method for the item (e.g., download, courier, telephone, etc.), shipping information if a directly shipped item (size and weight), and a link for allowing a file (e.g., music, text, photo, video) to be uploaded to the artist's account.

FIGS. 10-13 describe different possible sales containers. With sales containers the ArtistManager can create products to offer by adding selected inventory items to the selected Sales Container type and defining the specific Sales Container attributes. These attributes may differ depending on the type of Sales Container chosen.

Figure 10:
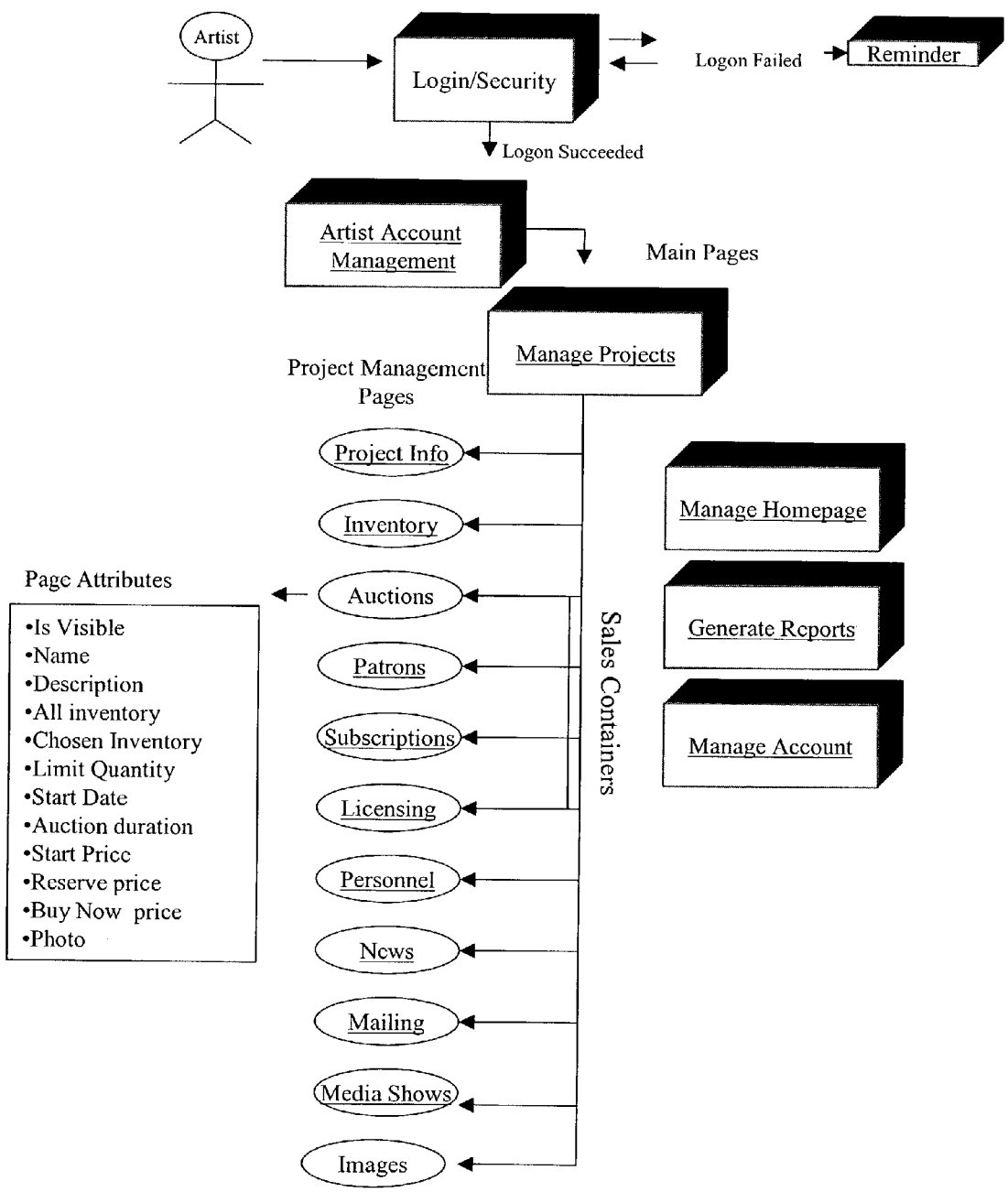

FIG. 10 illustrates the attributes one or more web pages and/or one or more links of the auction sales container link for an open project. Such a web-page(s) may include information such as a name for the auction, description, the inventory item or items involved in the auction, quantities, the starting and ending dates (duration), a starting price, reserve price and instant purchase price (e.g., "buy now"), and corresponding photo/text to be posted for the auctioned item. Any number of currently available online auction techniques may be employed with invention, as well as proprietary techniques and newly developed techniques reverse auctions.

Figure 11:
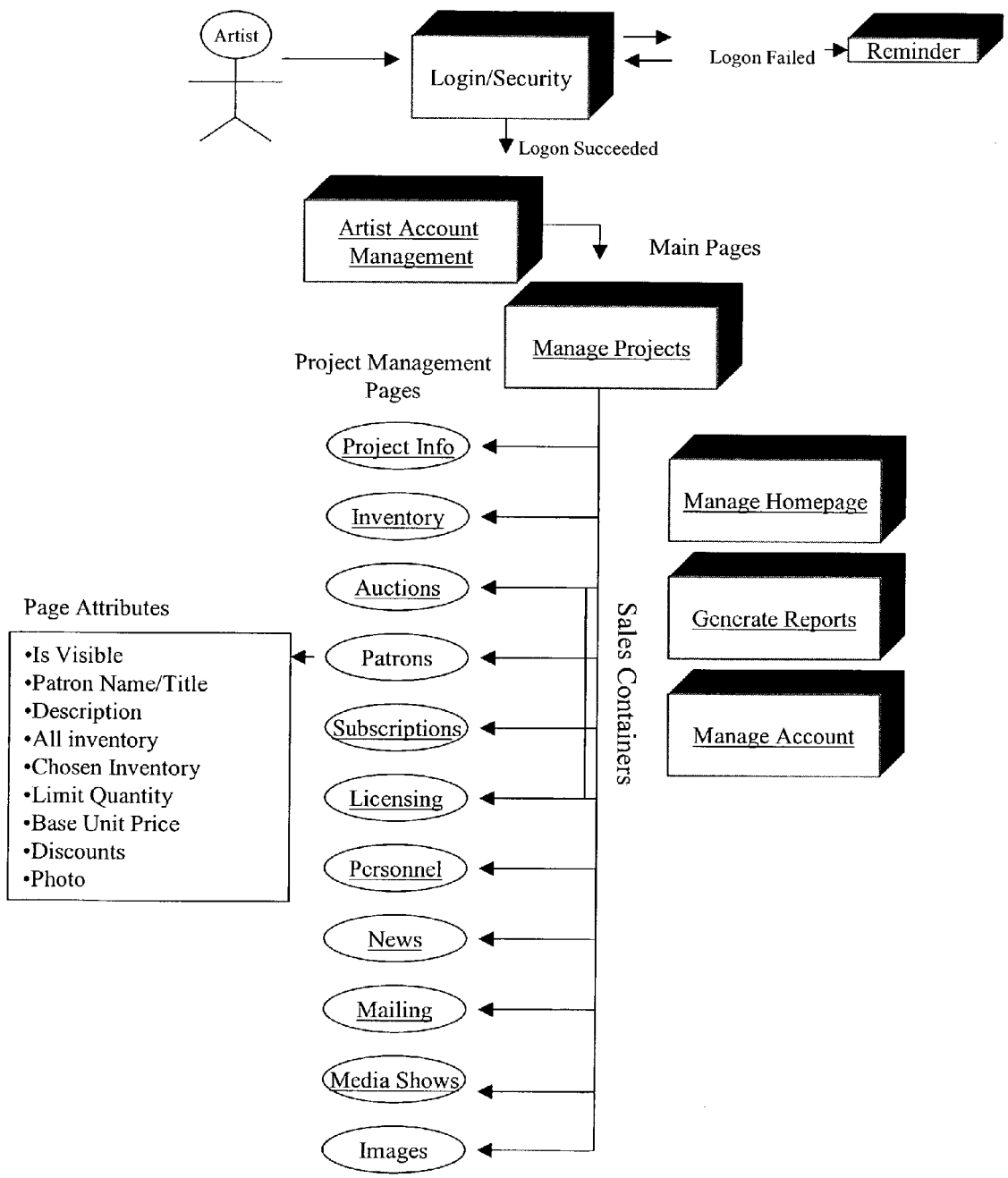

FIG. 11 illustrates the attributes one or more web pages and/or one or more links of the patron sponsor sales container link for an open project. Such a web-page(s) may include information such as a patron sponsor title, a description of the entitlement(s), a list of inventory available to add to the sales container, the quantities, limits, the base unit price, quantity or priority discounts, a photo and the like for the patron sponsor sales container.

Figure 12:
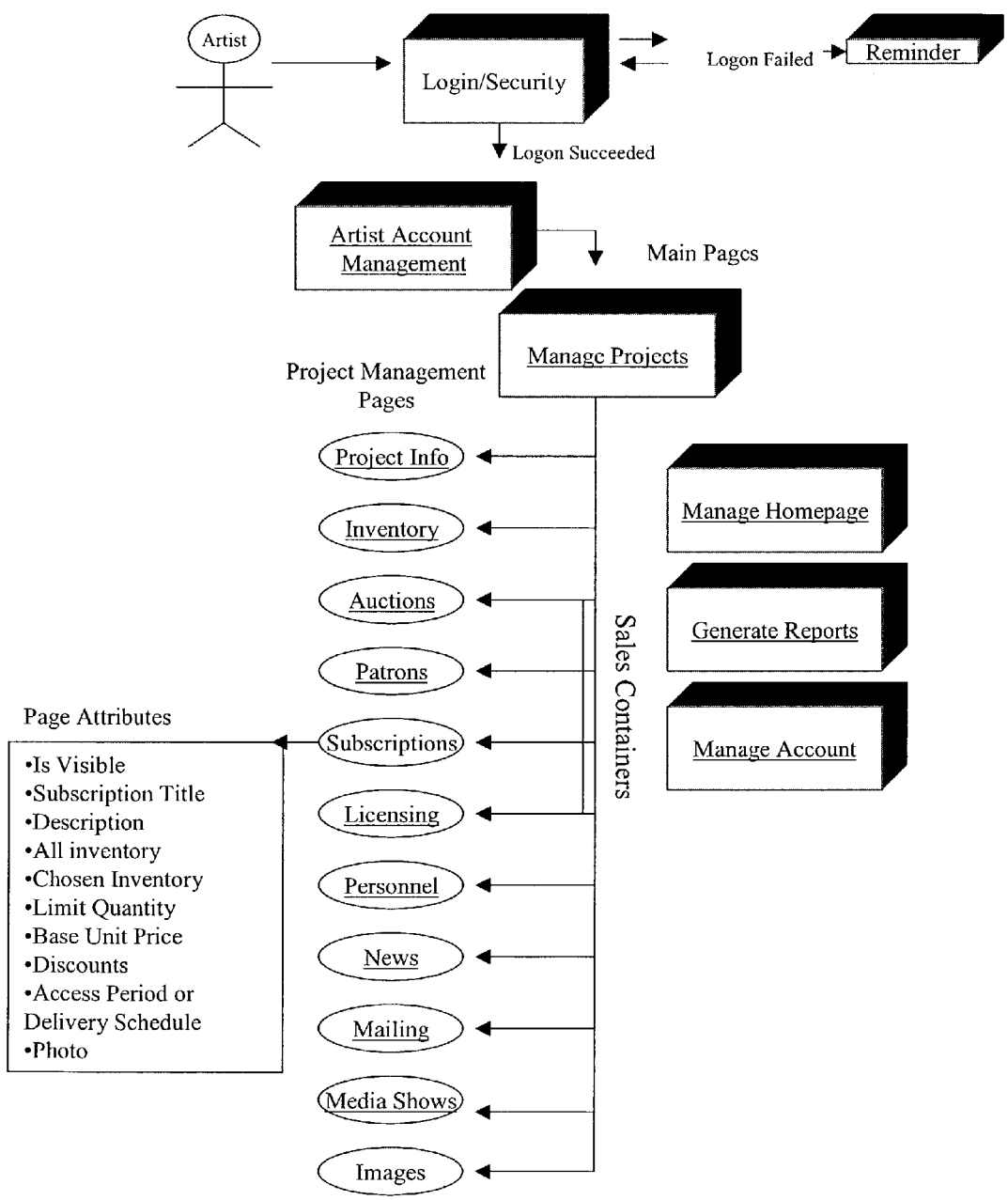

The artist project may also include subscription services for fans/patrons. Accordingly, FIG. 12 illustrates attributes one or more web pages and/or one or more links of information on subscriptions for an open project. Such information generally includes a display name for the subscription, description of the subscription(s) available, inventory available for subscription, the quantities, limits, access times, delivery schedules and the like for the subscription.

Figure 13:
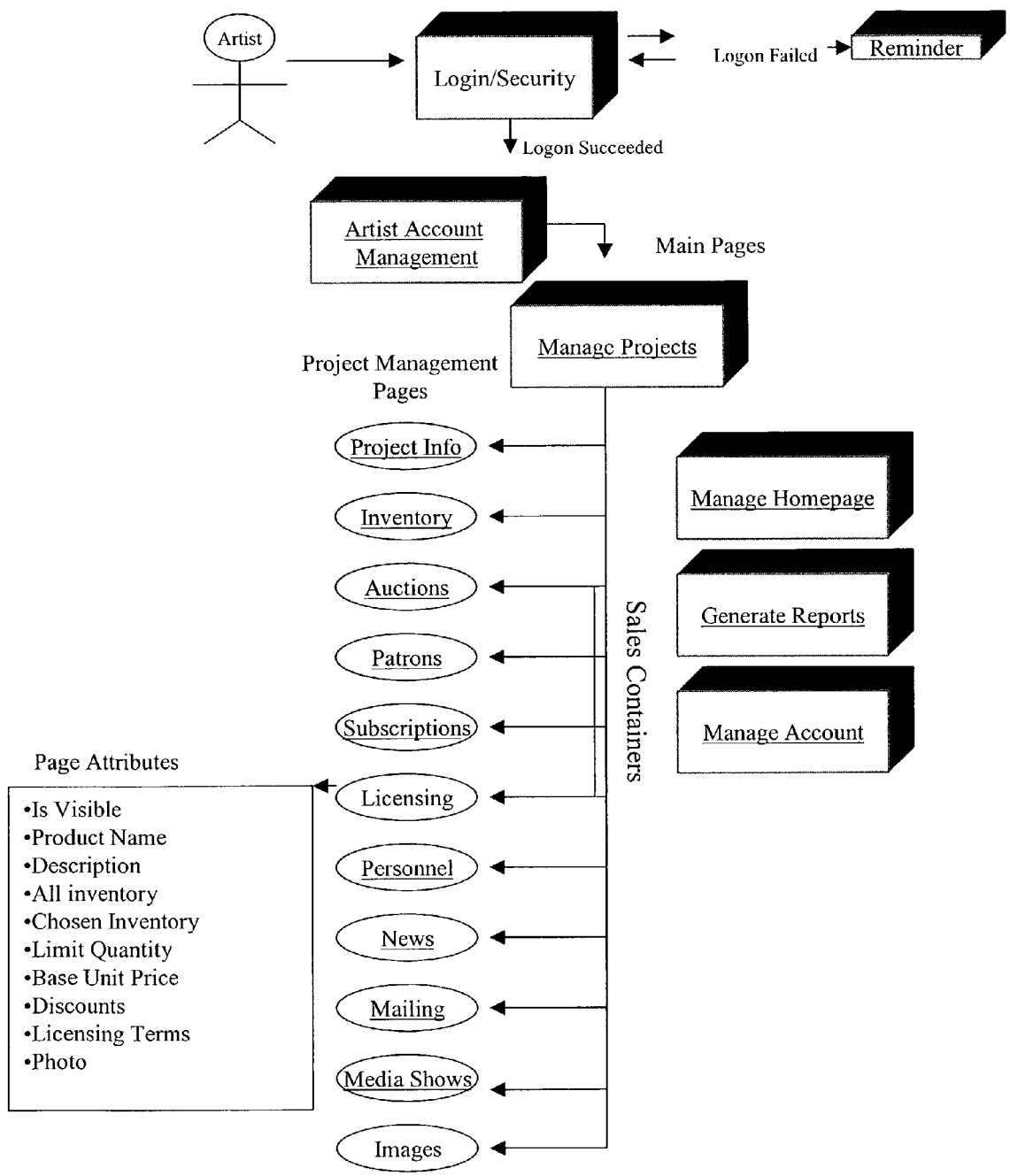

FIG. 13 illustrates the attributes one or more web pages and/or one or more links for the licensing sales container link contained on the open projects web page. Similar to the information available on the other open-project web-pages, the information may include a display name or title, the inventory available to add to the sales container, information regarding all available inventory, and information regarding the quantities, prices, discounts and the like may also be included.

Figure 14:
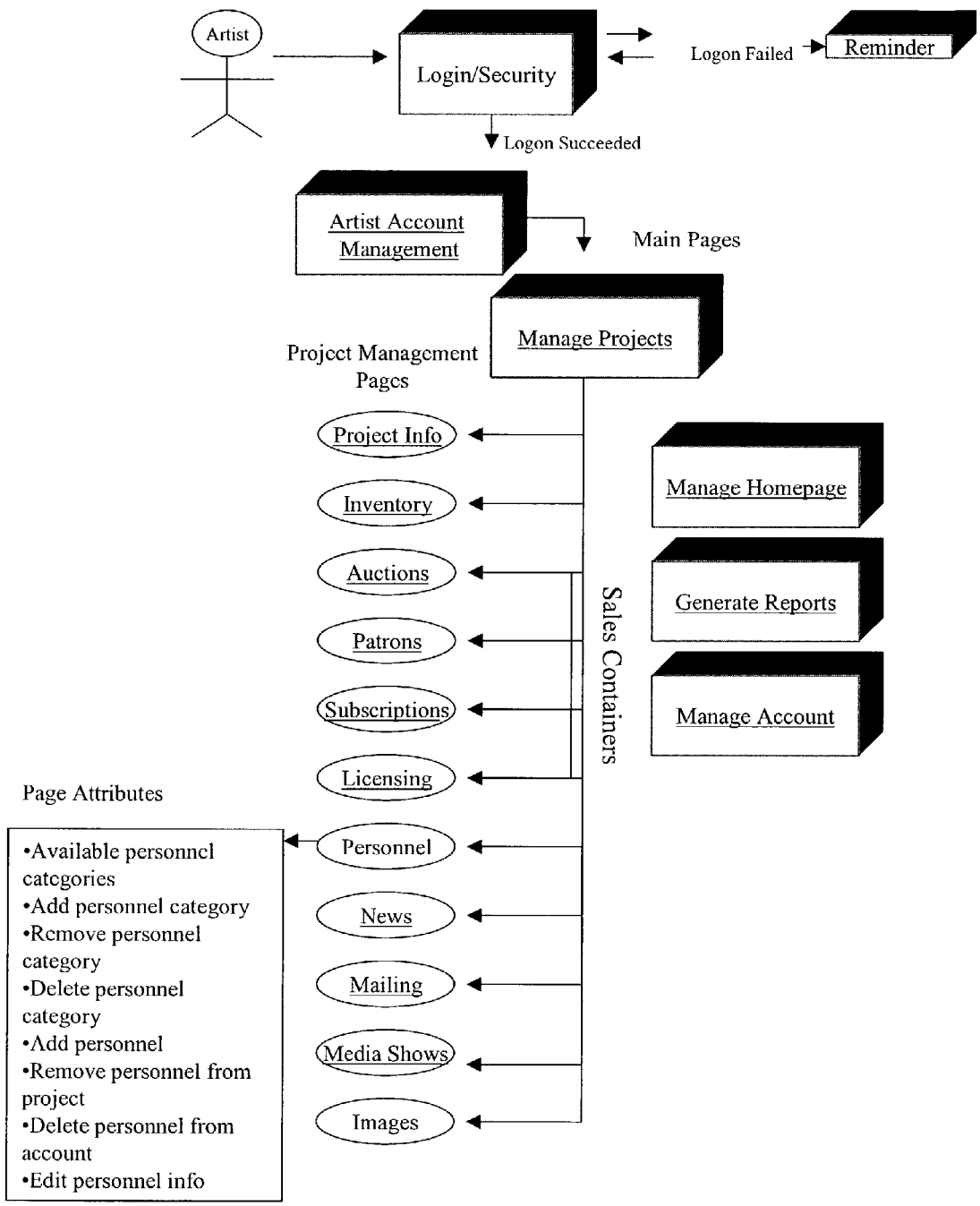

The account Manager may also access and manage personnel for the account (FIG. 14). Specifically, the Manager may add, delete, and edit personnel for the project in one or more categories. Such personnel may include band members of the artist (if the artist is a band), production crew, producer(s), instrument playing personnel, and the like. The Manager may also use this link to add, edit or delete personnel categories.

Figure 15:
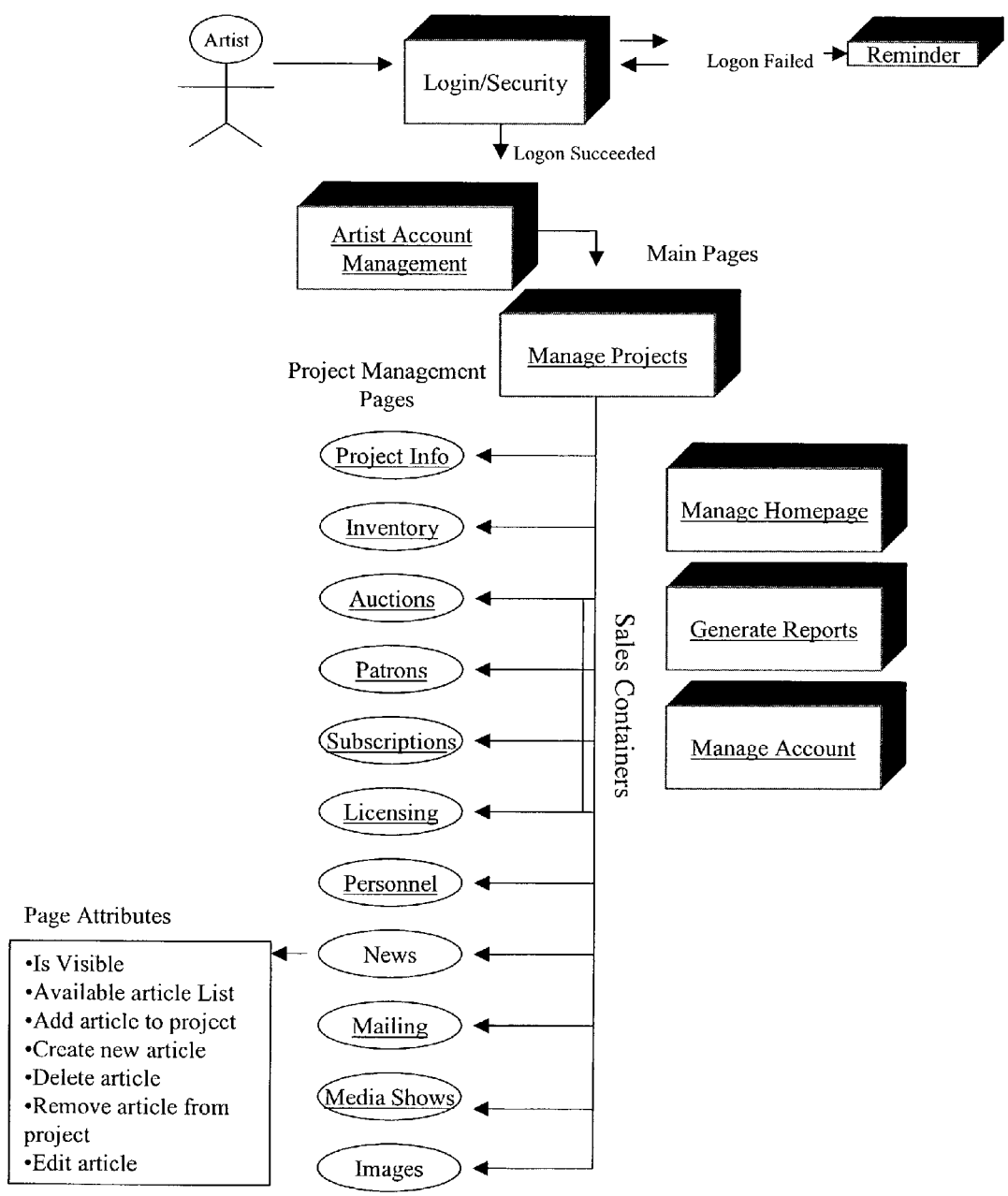

A News link for an open project allows the Manager to manage press releases, the artist's daily journal, and other news information regarding the artist for the project (FIG. 15). Thus, such information may include the available article list (to promote the artist), the ability to added, edit, create, delete and or remove an article from the news section.

Figure 16:
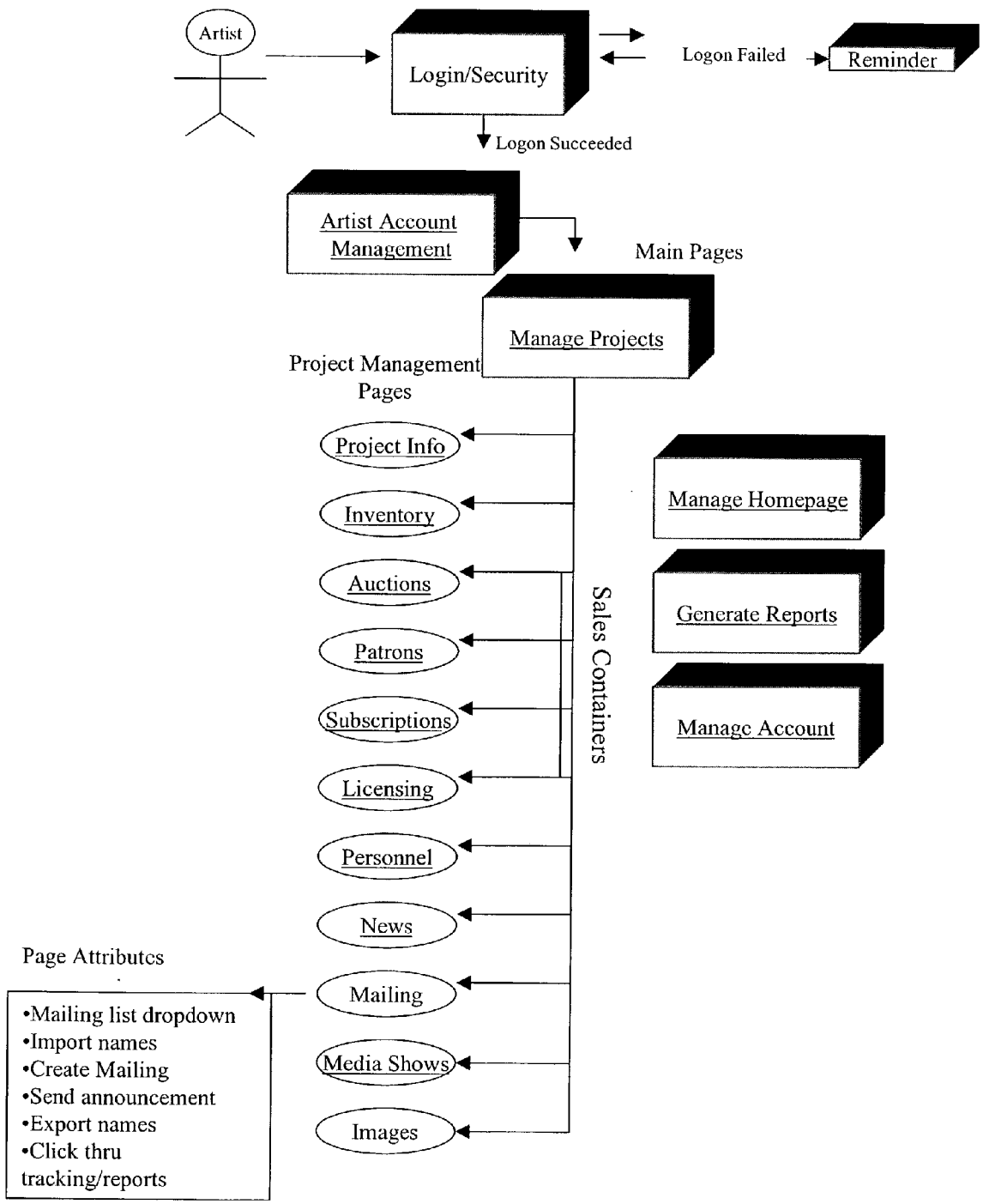

FIG. 16 illustrates attributes one or more web-pages and/or one or more links for mailing list management, where the Manager can import and export names for a mailing list, direct announcements and also create different mail list categories. The ability to manage such information may be performed using dropdown menus and the like. One skilled in the art will appreciate, however, that any method of managing mailing lists may be incorporated with the other features of the invention.

Figure 17:
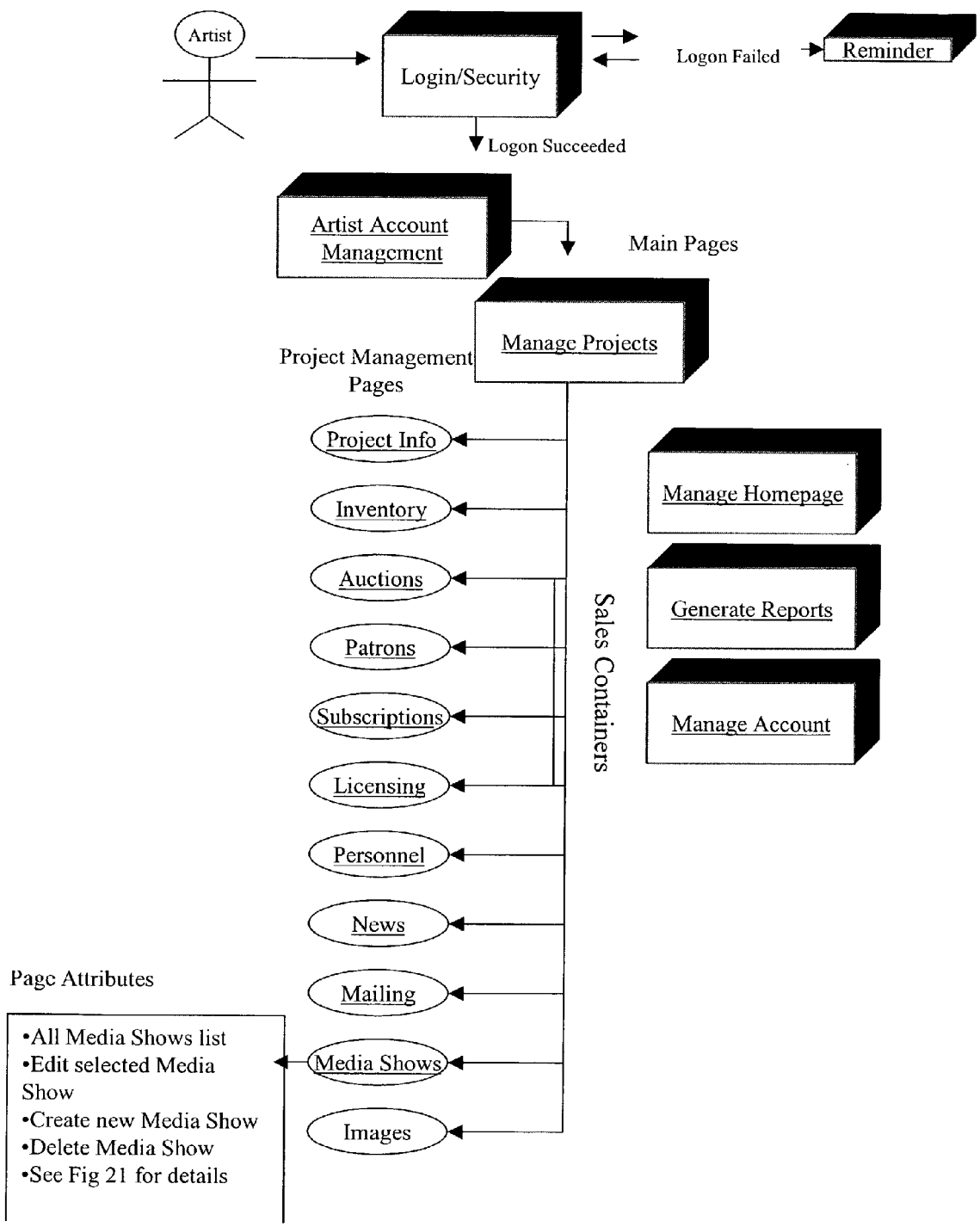
Figure 21:
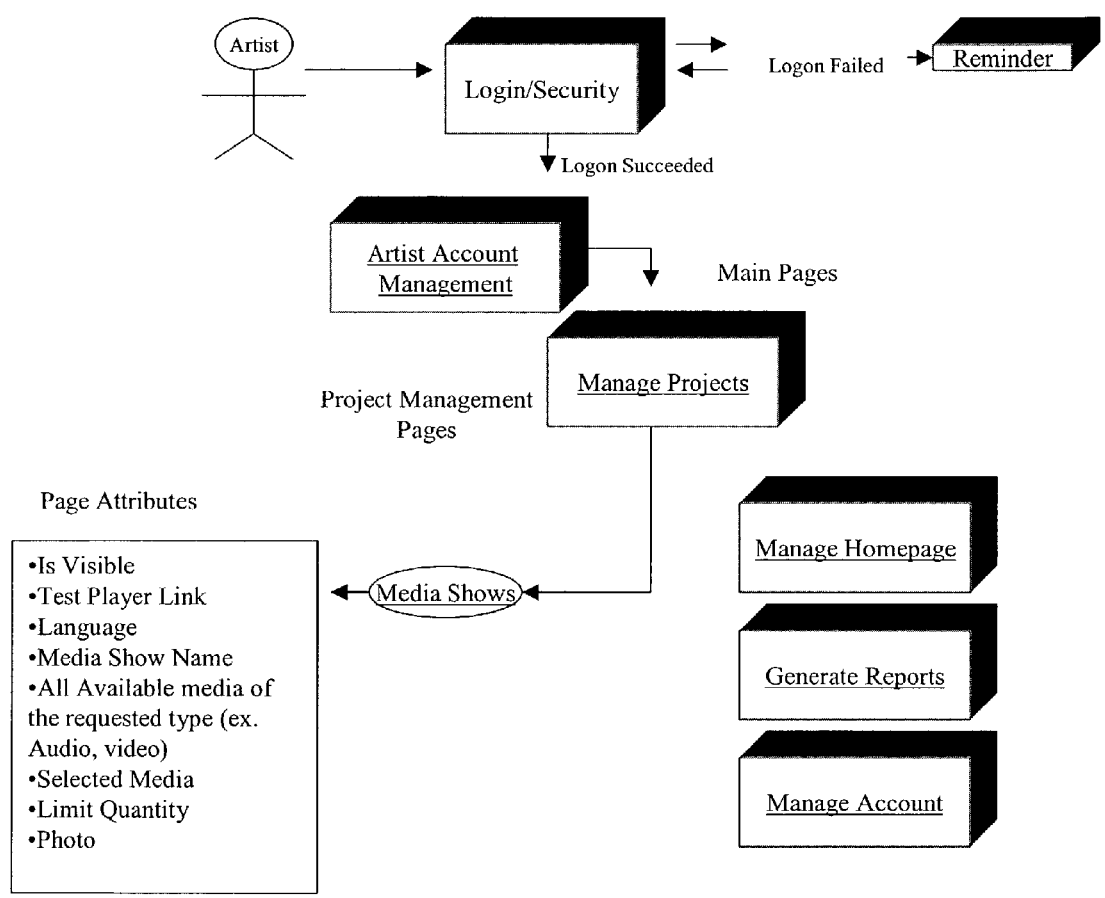

One of the features of an artist account with ArtistShare, is the ability to create, edit and delete media shows (audio, video etc. . . . preferably pre-recorded, but may also be live) which preferably is related to the artist. This, of course, is very convenient for all artists, especially musical recording artists who wish to create Internet radio shows. The overview of the attributes one or more web pages and/or one or more links for a project in this regard is illustrated in FIG. 17 and FIG. 21.

Figure 18:
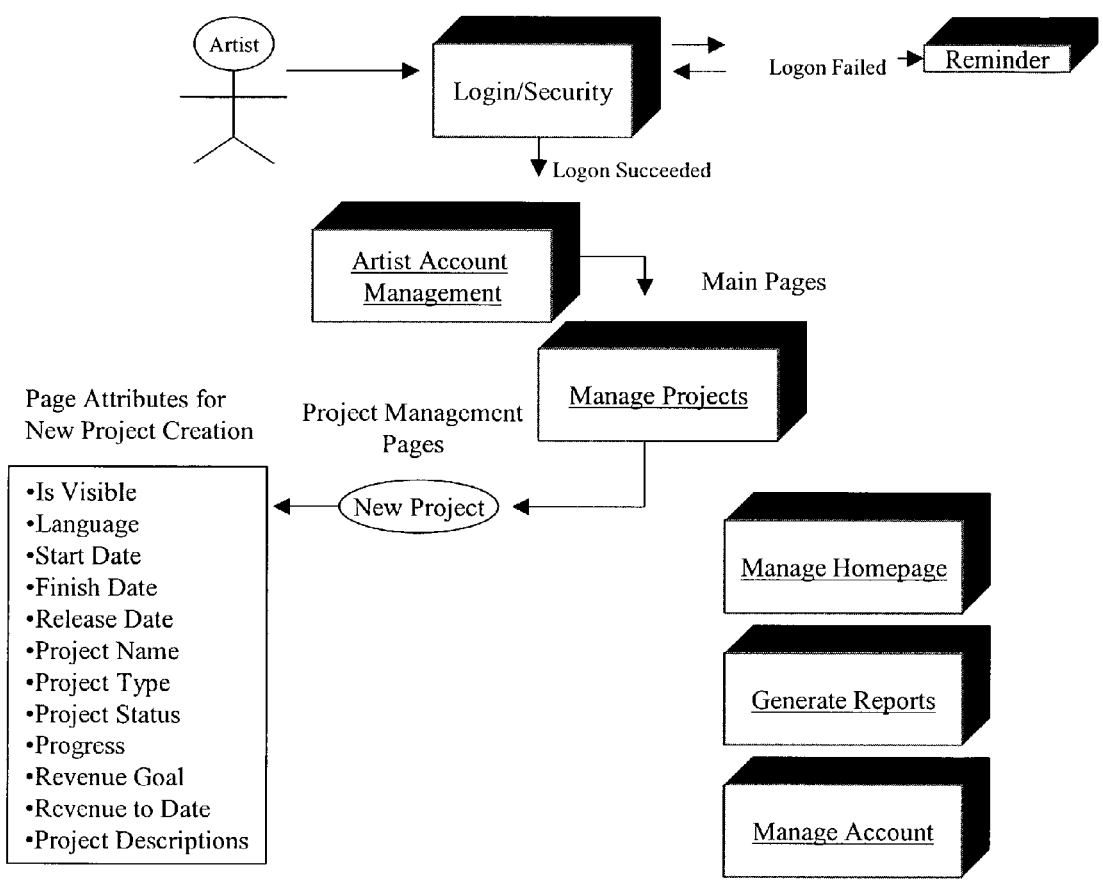

For creating a new project, as shown in FIG. 18, the Account Manager may select a link directing him to a "Create Project" web page. This link may direct the manager to a web page where the Manager may enter information related to a new project's name, description, type, goals, estimated start date, finish date and release date.

Figure 19:
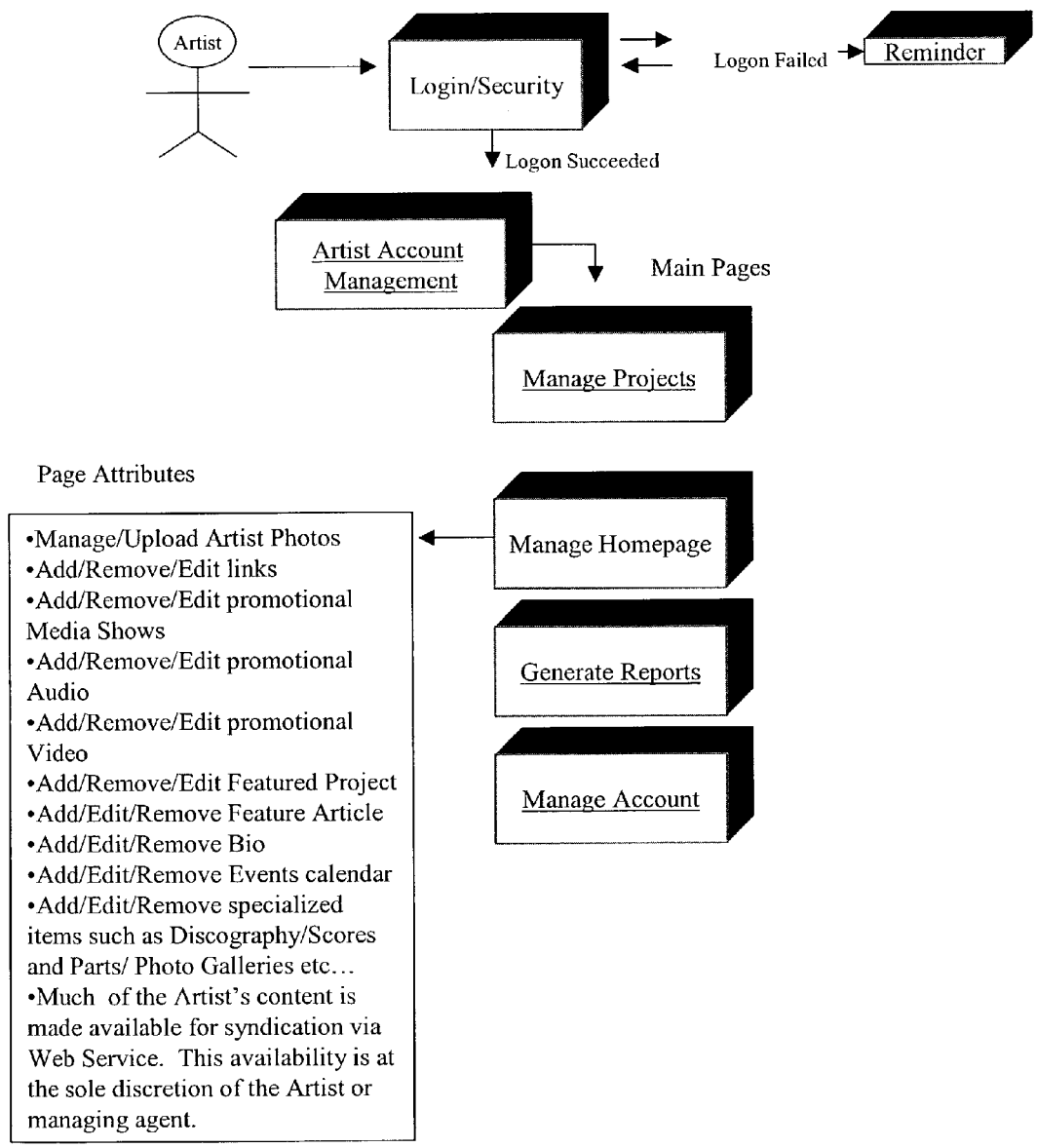

The link for managing a website/home page of the artist is illustrated in FIG. 19. A web-page for managing such information may include attributes for one or more web-pages and/or one or more links associated with guidance for uploading photos, music, video and the like to the artist's web account, and links for adding, editing, and deleting web-links to be included on the artist's home page, and links for adding, editing and removing text, news articles, feature projects, biographical and event information on the artist homepages. This information, for example, could be syndicated via Web Services to provide content other web sites, possibly in a variety of languages, or to the Artist's own pre-existing web site. The Artist Share database may be used as the one centralized location for storing all data relating to an artist.

Other management features include the ability to manage the generation of reports for the various aspects of the account. For example, through the link "Generate reports" on the account management page for the artist, the manager may generate, view and or print reports related to sales of current items, including sales history and the like, personnel reports, patron reports, reports on streaming requests (audio and video), feedback reports, and the like. An overview of the attributes for the one or more web pages and/or one or more links is illustrated in FIG. 20.

Figure 20:
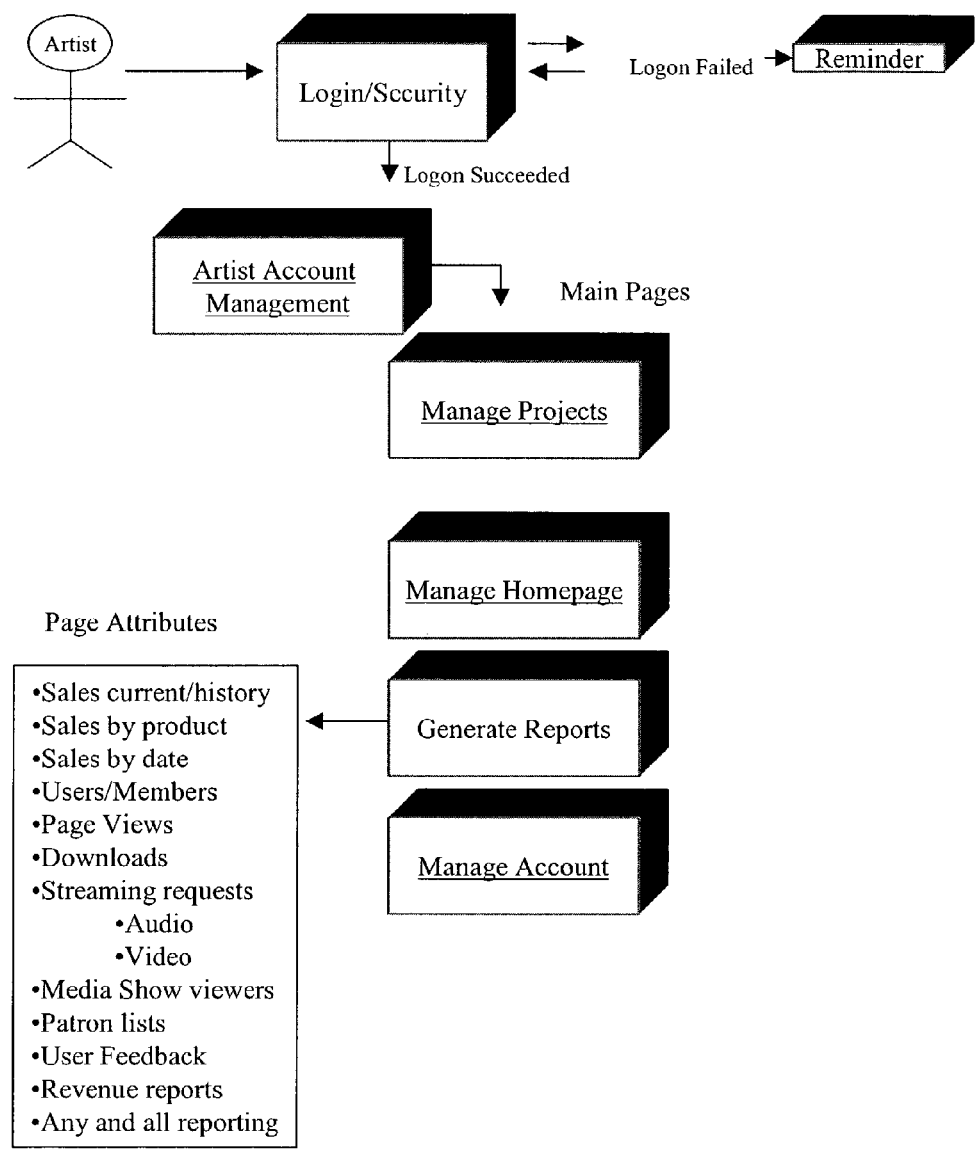

More specifically the Manager may also link to a web page to view information about patrons of the artist (FIG. 20). Patron information may be made available to industry personnel, investors, or other interested parties to determine the popularity, for example, of the artist. Such information generally may include the name and description (age, sex, photo, location) of the patron, inventory to which a respective patron (or all patrons) have selected either through direct purchase of a completed project, or financing the project in some way. The information contained on this page may also include description of all the inventory available to patrons, the ability of the Manager to limit purchased quantities of inventory items, discounts to the patrons.

The Manage Media Shows link may direct a Manager to a web page and/or links (FIG. 21) having attributes where the manager can create, edit, remove and delete media shows created from uploaded streaming media inventory content.

Figure 22:
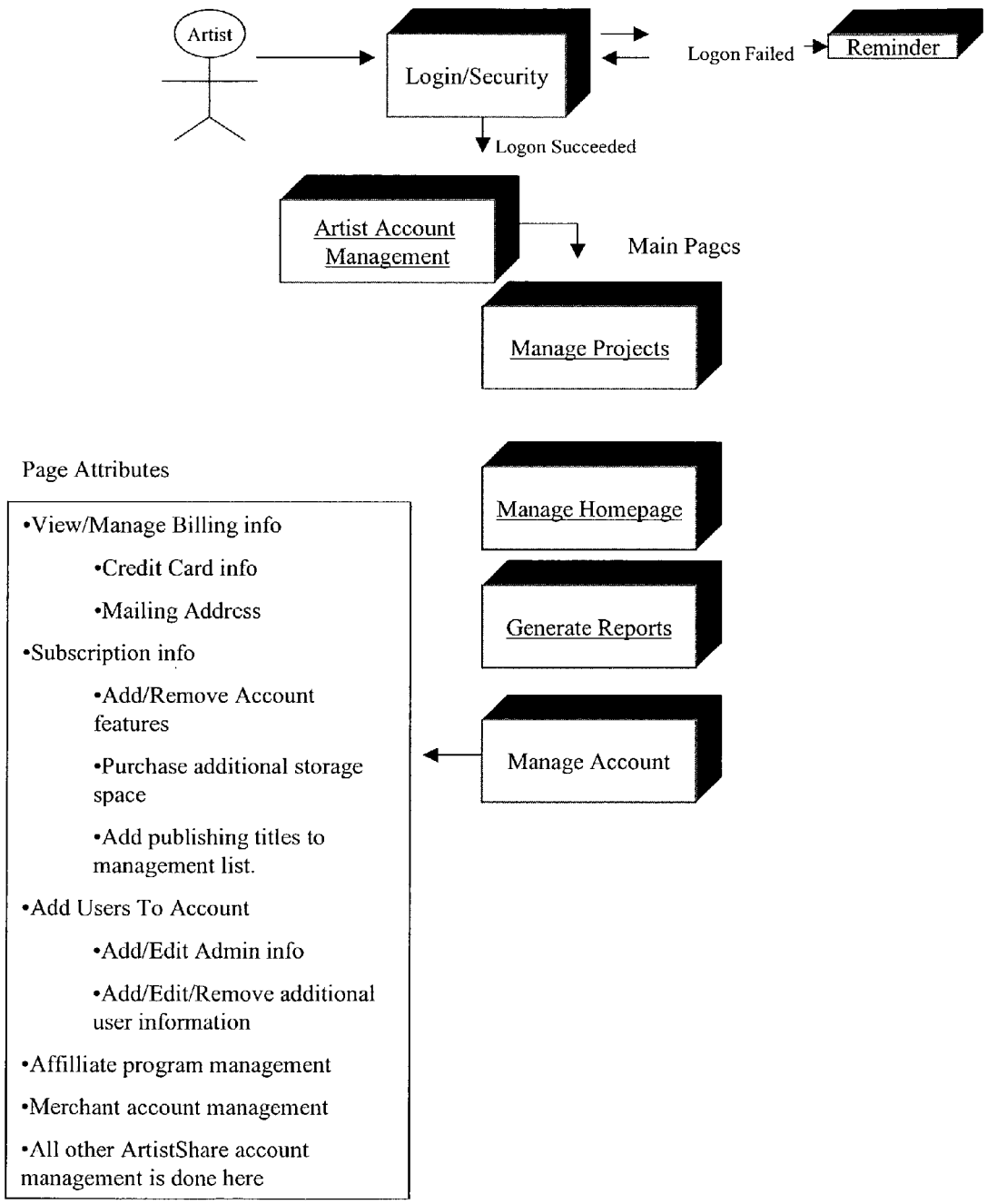

The Manage Account link may direct the Manager to a web-page and/or links (FIG. 22) having attributes for one or more web-pages and/or one or more links for viewing and managing billing information including credit card and mailing address information of the Artist. This page may also include attributes for managing the Artist's affiliate program, as well as the ability to add users to the account (e.g., add/edit administrative information, add/edit/remove other user information). This page may also include attributes to perform any other Artist account management feature.

Figure 23A:
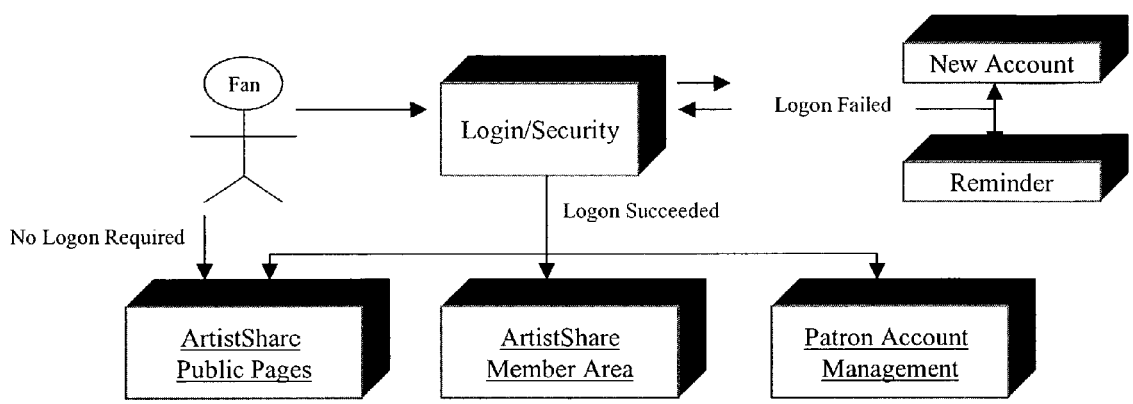
FIG. 23A is a block diagram illustrating attributes of one or more web-pages and/or one or more links for fans accessing the ArtistShare system according to an embodiment of the invention.

FIG. 23A illustrates attributes of one or more web-pages and/or links for patrons and fans who access a home page of the ArtistShare system. Accordingly, a fan can access the ArtistShare home page and view public web pages of the Artists. Upon registration with ArtistShare, the fan, (now a patron) may then access a member area which generally includes more features and content. Patrons, of course, may change their account information or a level of membership upon selection of an account management link which directs the patron to a web page for changing such information (for example).

Figure 23B:
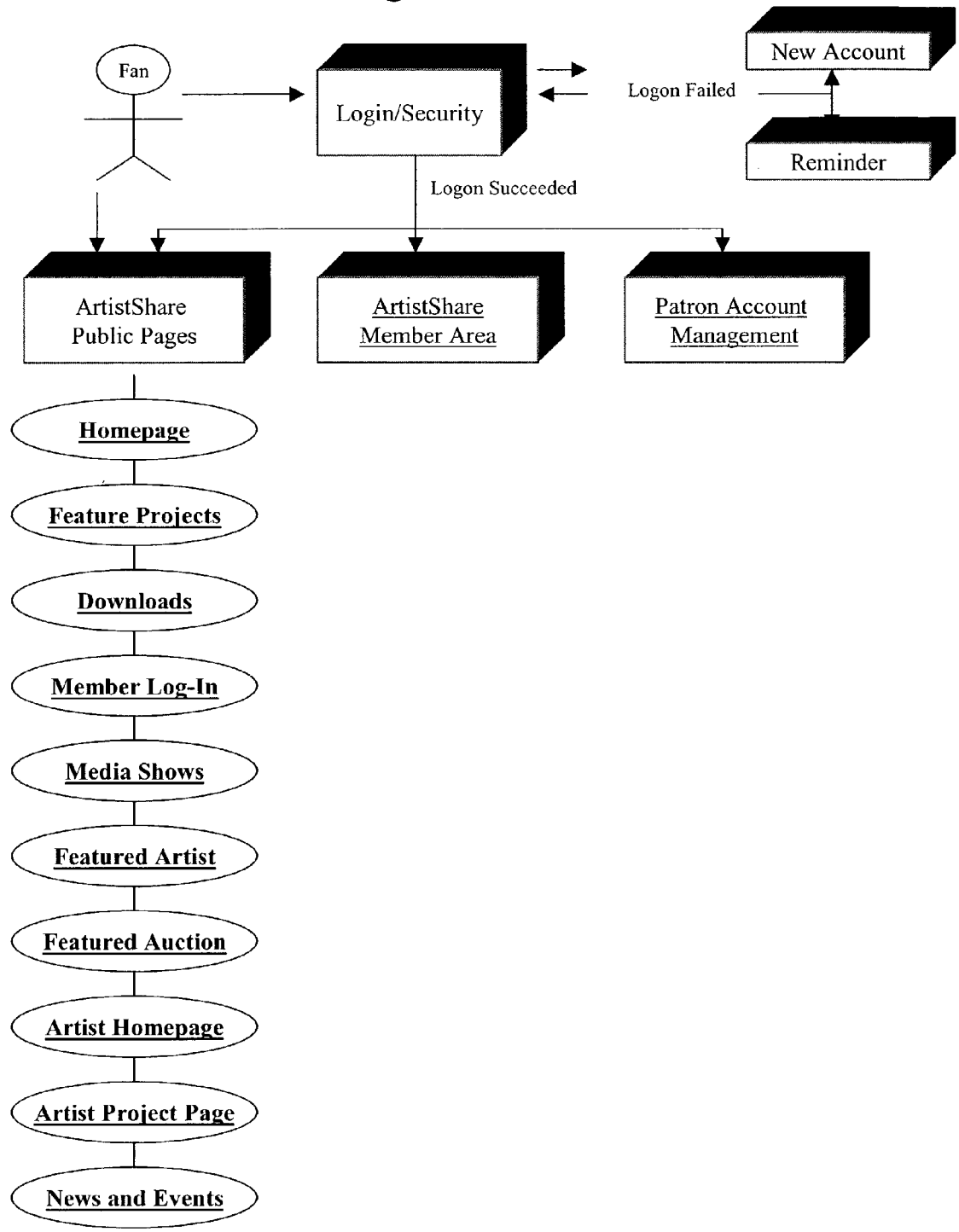
Figure 24:
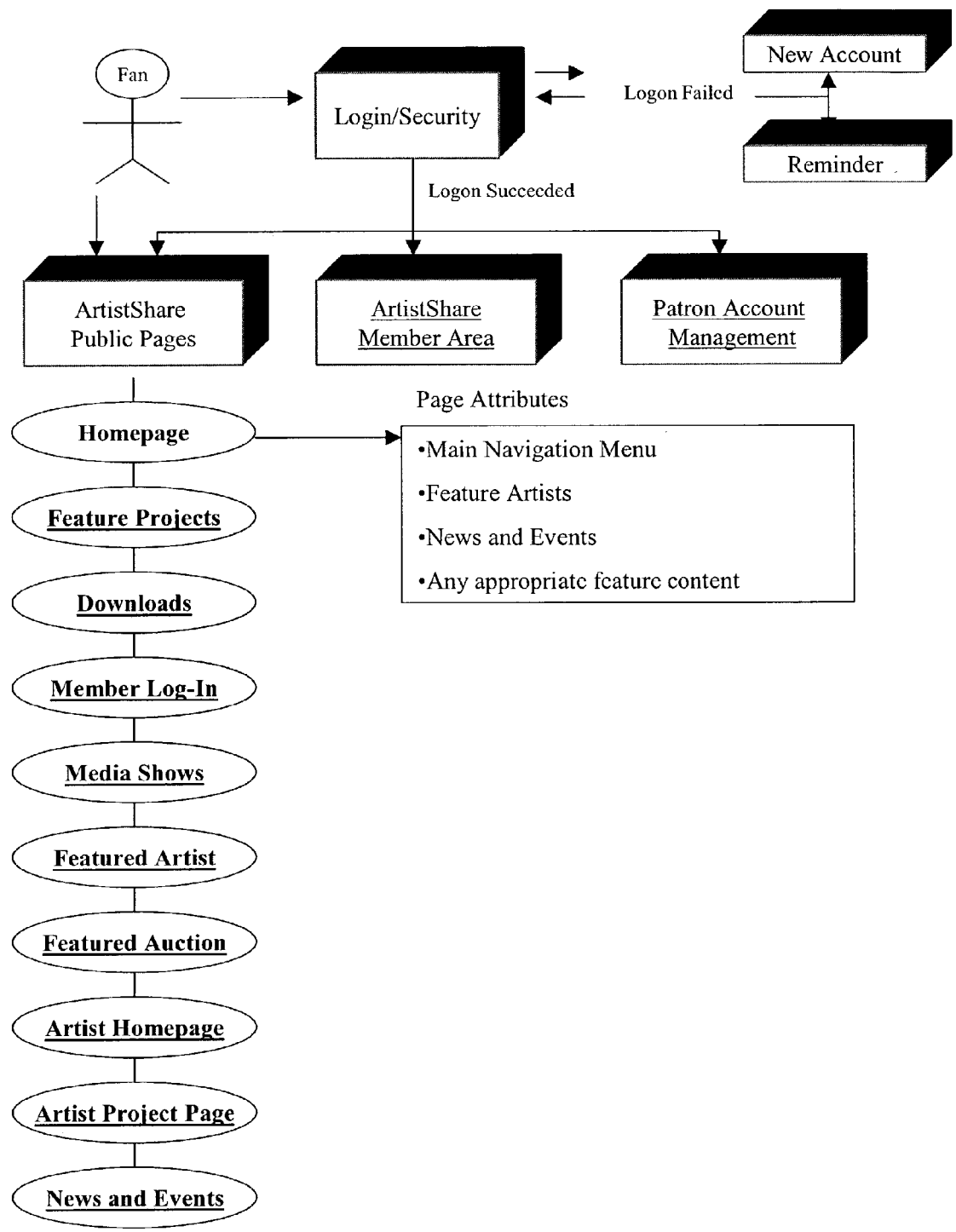
Figure 25:
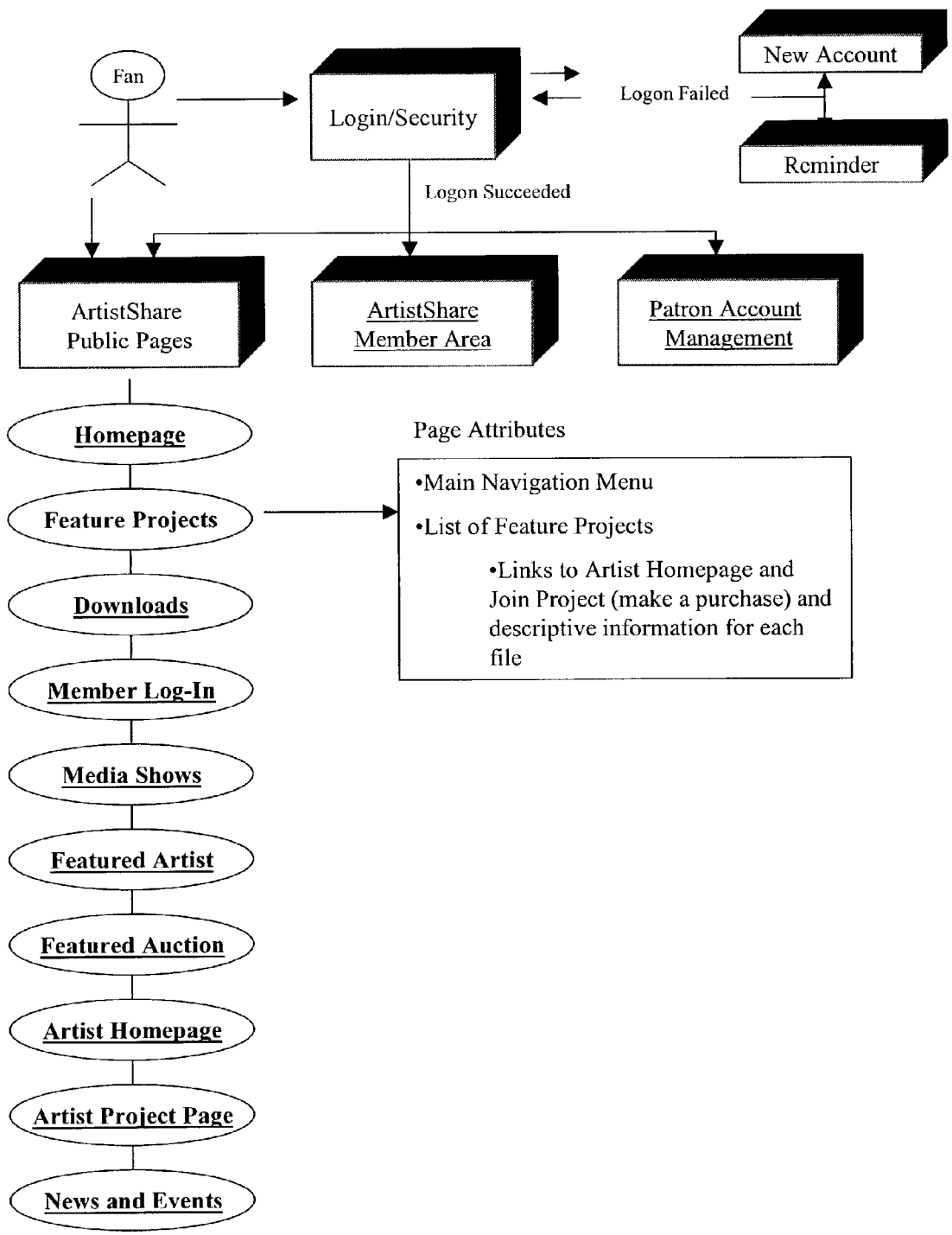
Figure 26:
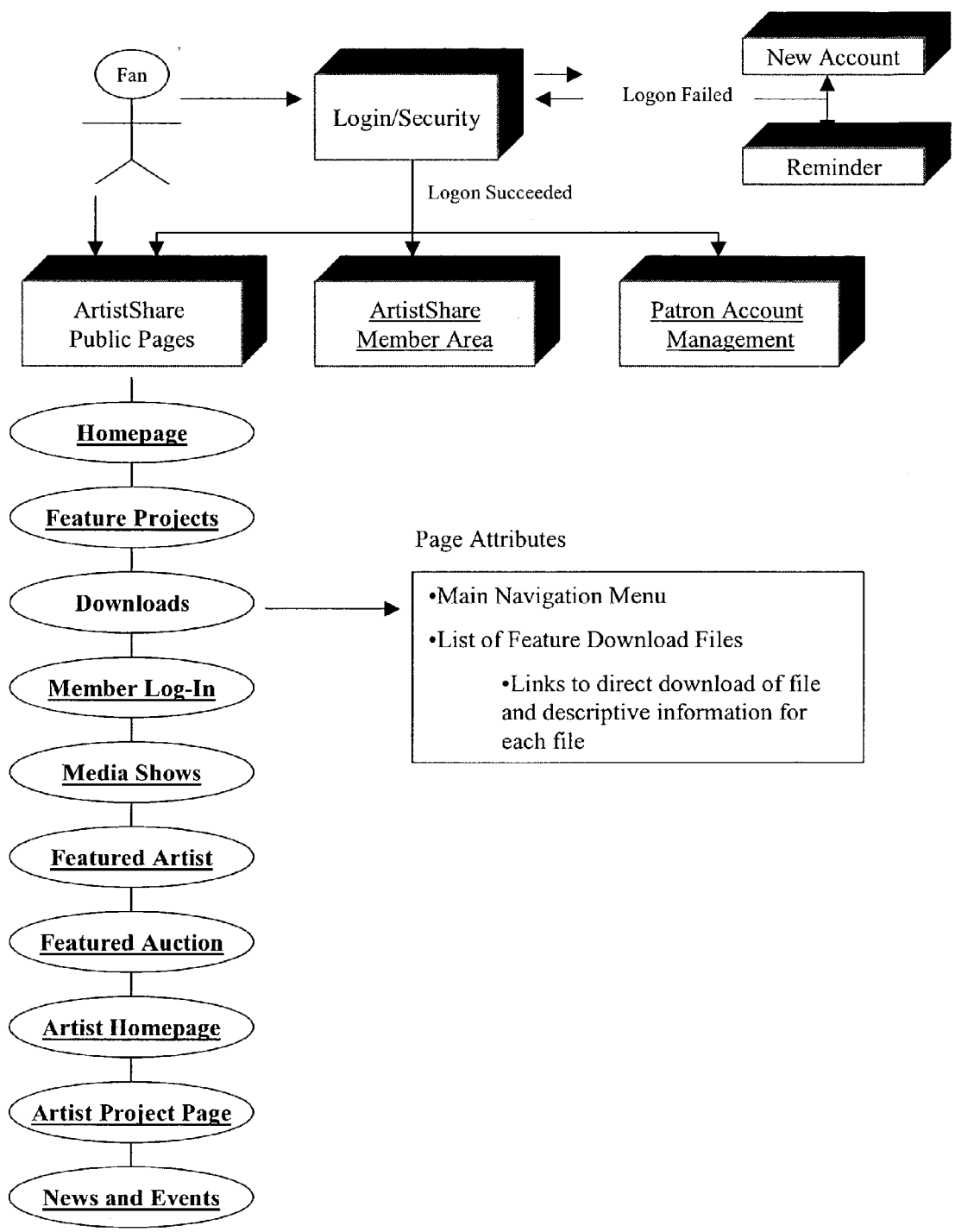
Figure 27:
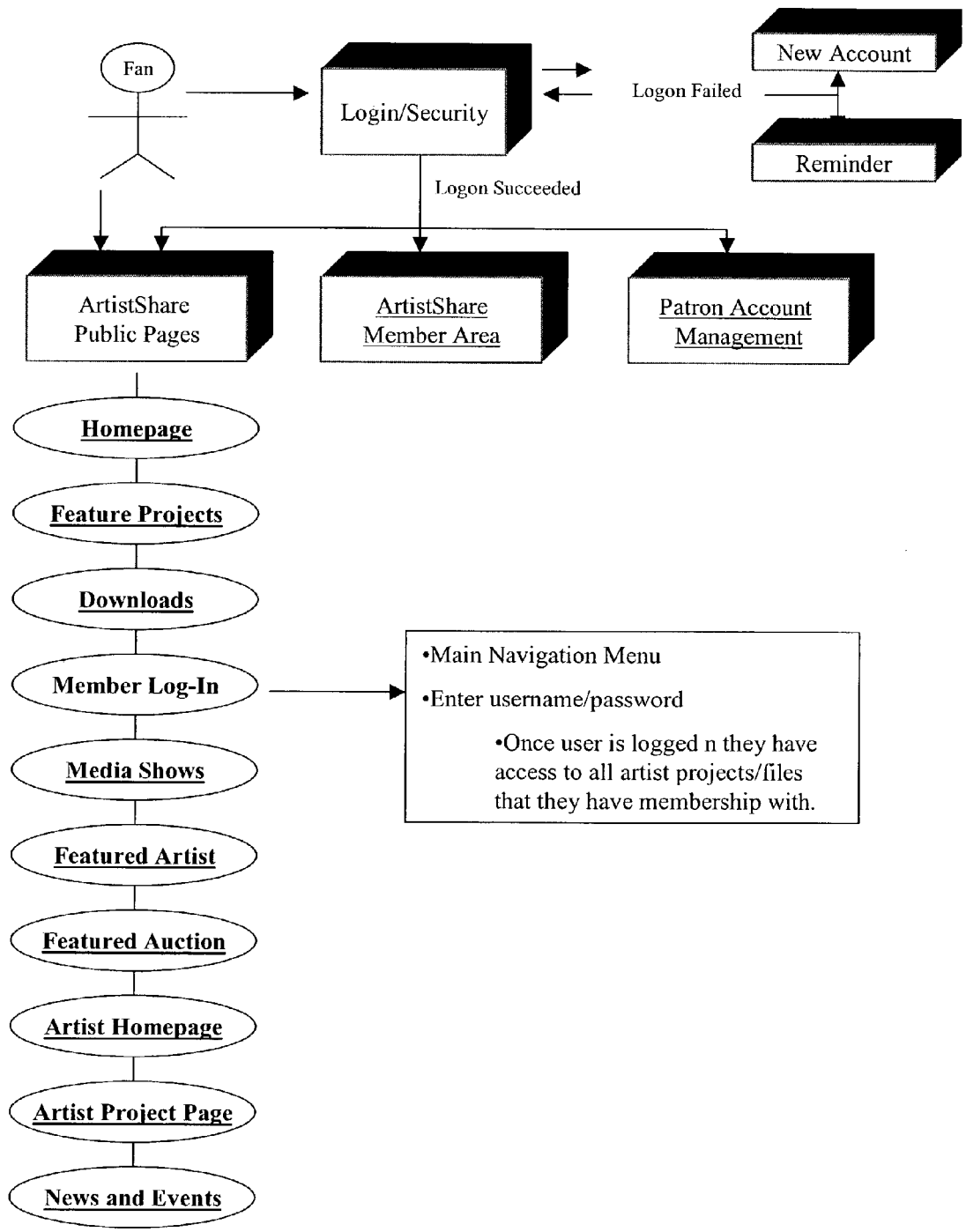
Figure 28:
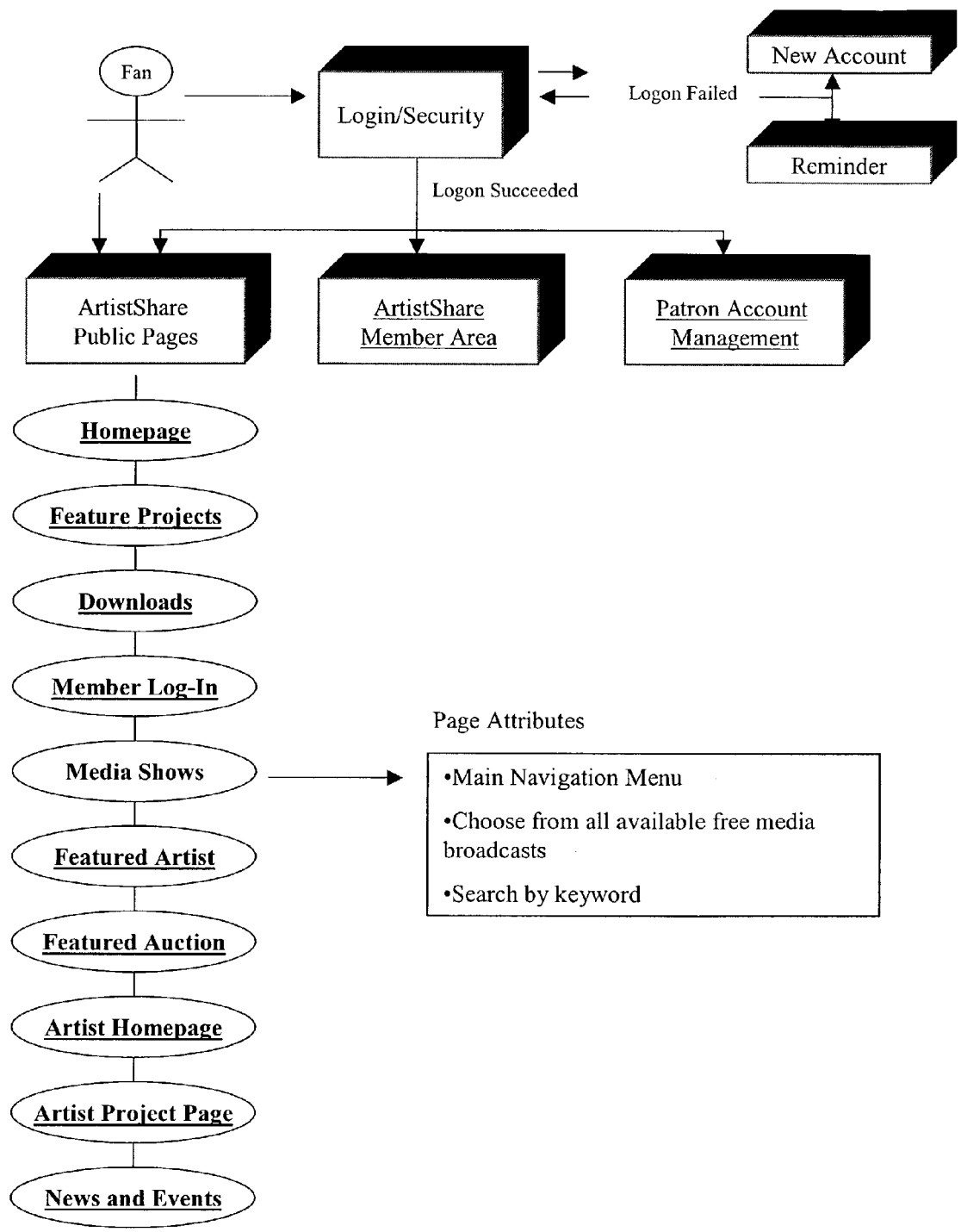
Figure 29:
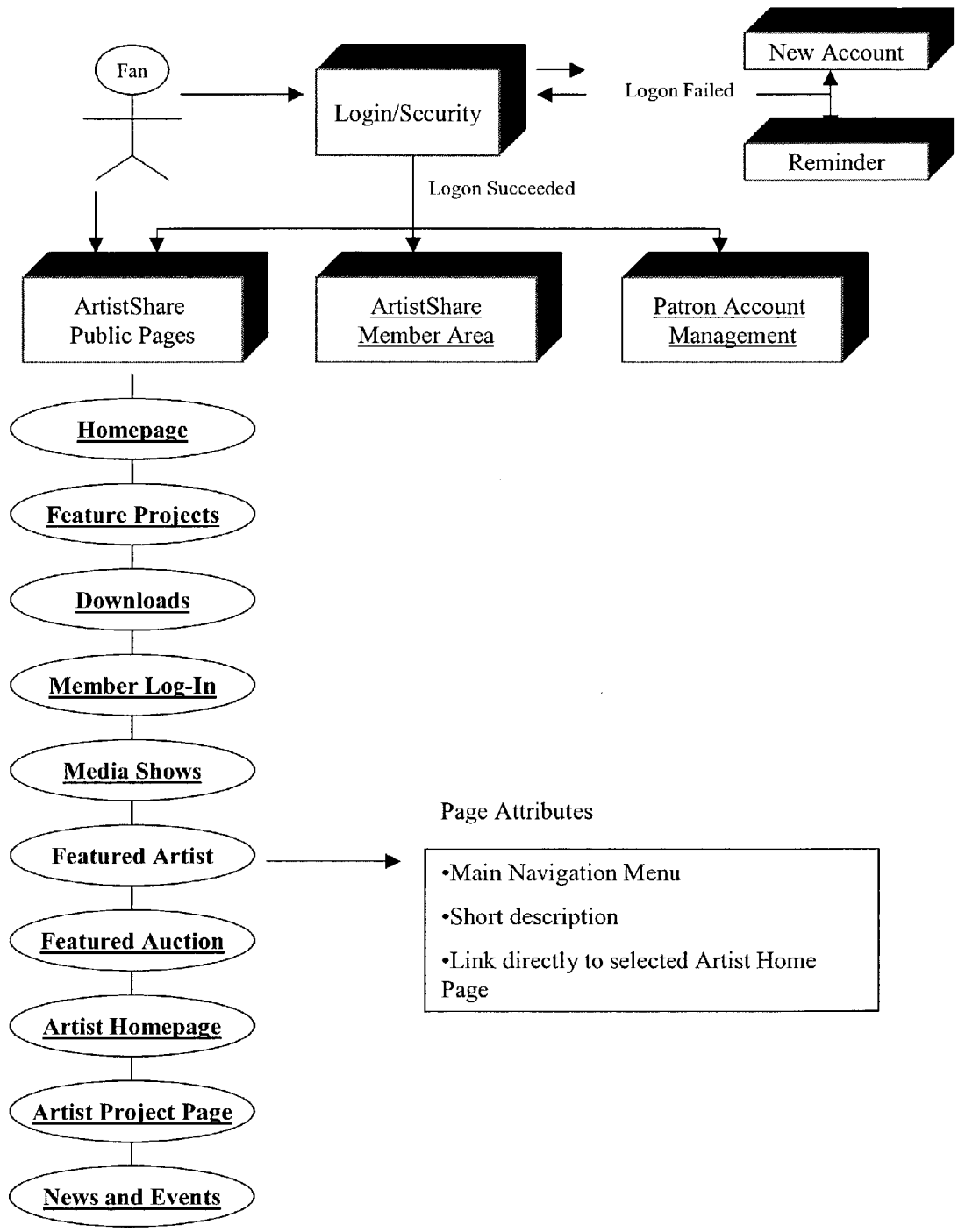

As shown in FIG. 23B, ArtistShare public pages may include a home page, which links to direct the non-member to one or more web-pages including featured projects, downloads, a member login area, media shows, featured artists, featured auctions, artist home pages, artist project pages, and a news and events page. The home page (FIG. 24) generally includes a main navigation menu with the above-described links. The featured project page (FIG. 25) may include a list of links to such featured projects, which may comprise links to the artist's homepage whose project is being featured. The download page (FIG. 26) may include links for downloading various files, with each link including a descriptive component for information about the file (e.g., song, movie trailer). Of course, the login link may direct a user to a login screen (FIG. 27) where a registered member may enter username and password information to login to the ArtistShare member areas. The media show link may direct a user to a menu of links (FIG. 28), or a searchable database, of freely available media shows. Similar to the featured project web page, the featured artist link would direct the user to a web page (FIG. 29), for example, having a listing of links to web-pages of the featured artists; such pages may be the home page of the artist, or other predetermined web-page of the artist.

Figure 30:
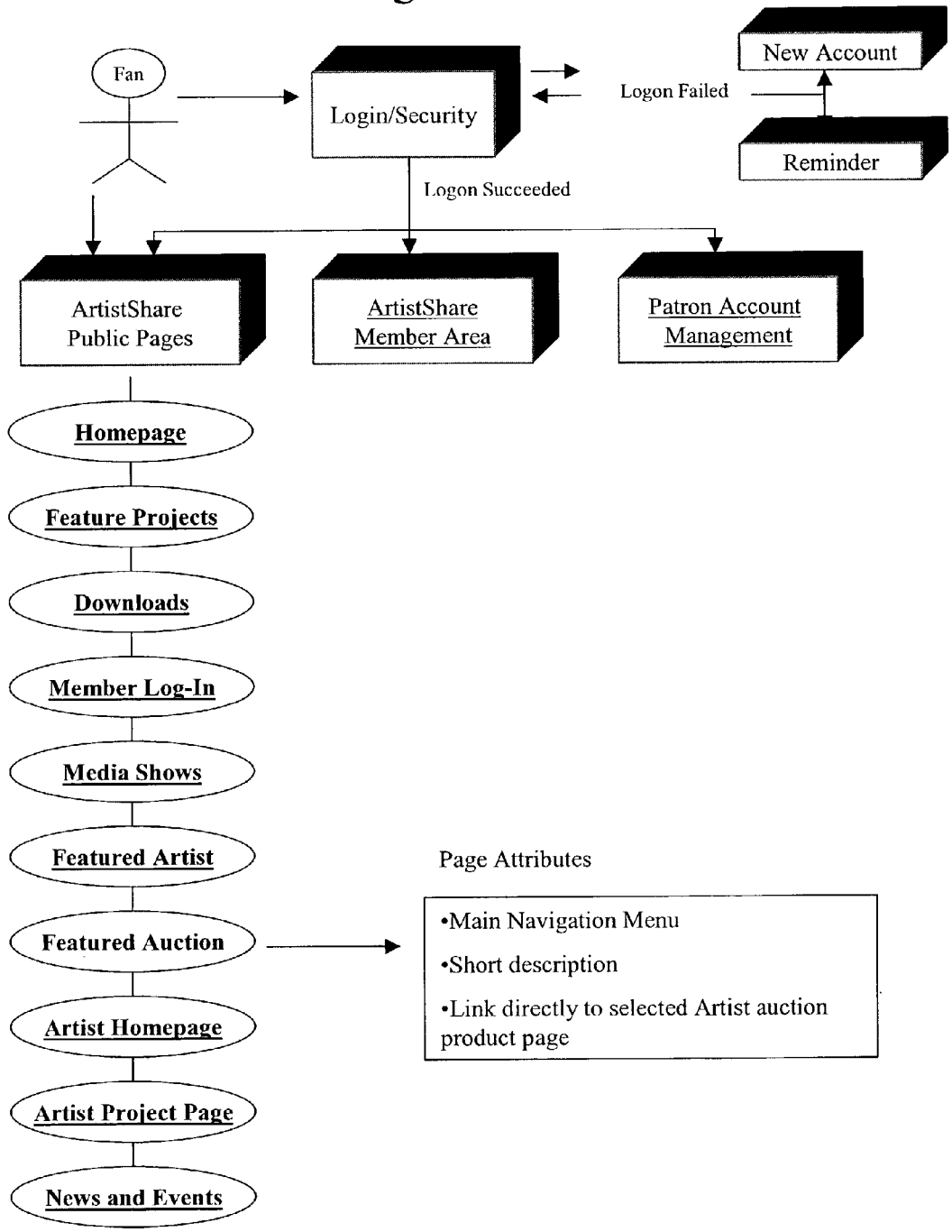

FIG. 30 illustrates attributes of one or more web pages and/or one or more links regarding featured auctions. The attributes may include a main navigation menu, a description/summary of the featured auction, and a link to the auction (e.g., to the selected artist's auction product page).

Figure 31:
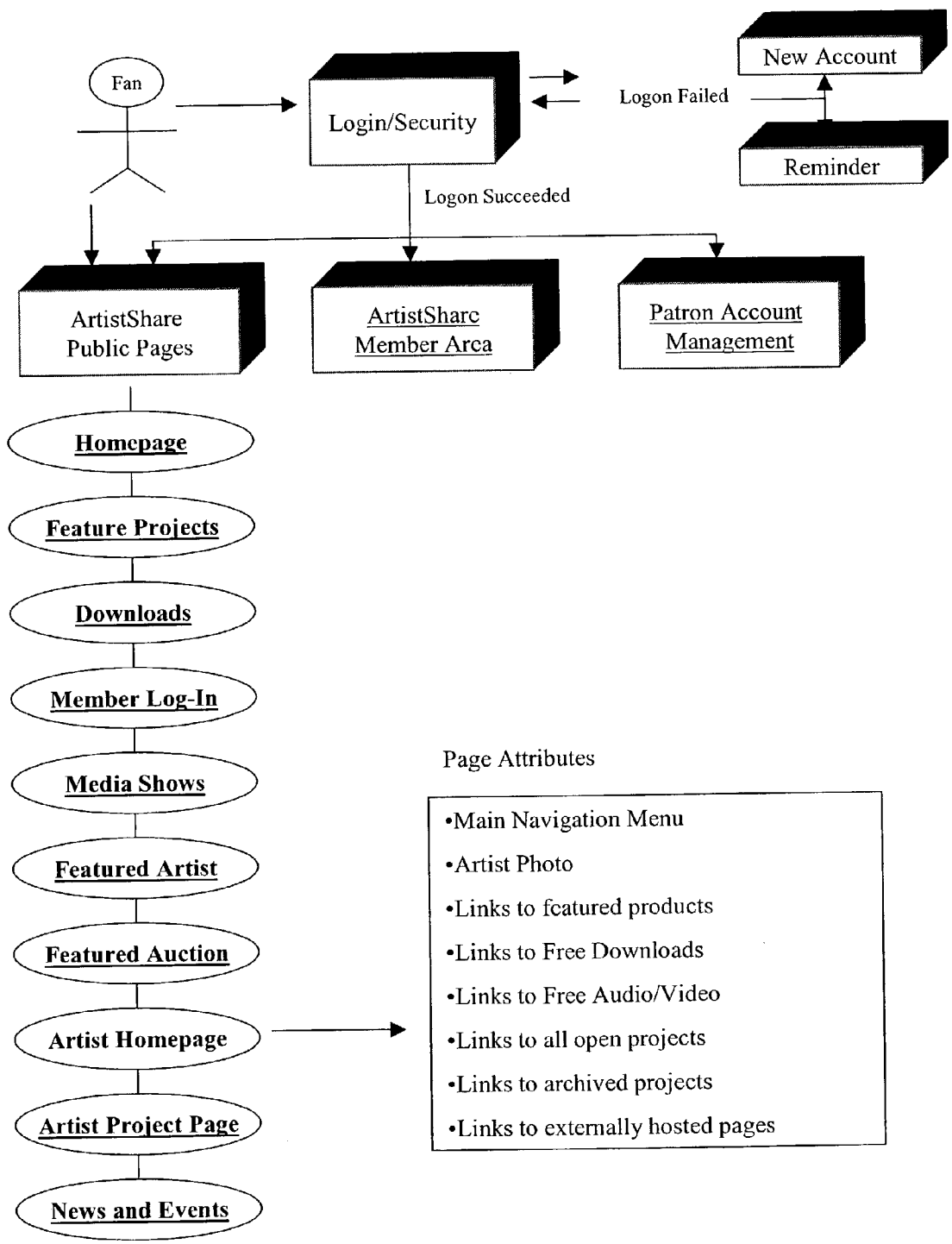

FIG. 31 illustrates the attributes of one or more web pages and/or one or more links to artists' homepages. Accordingly, these attributes may include a main navigation menu, photo of the artist, a link to featured products of the artists, links to free downloads, free audio/video (streaming), links to open projects, links to archived projects and links to externally hosted pages of artists.

Figure 32:
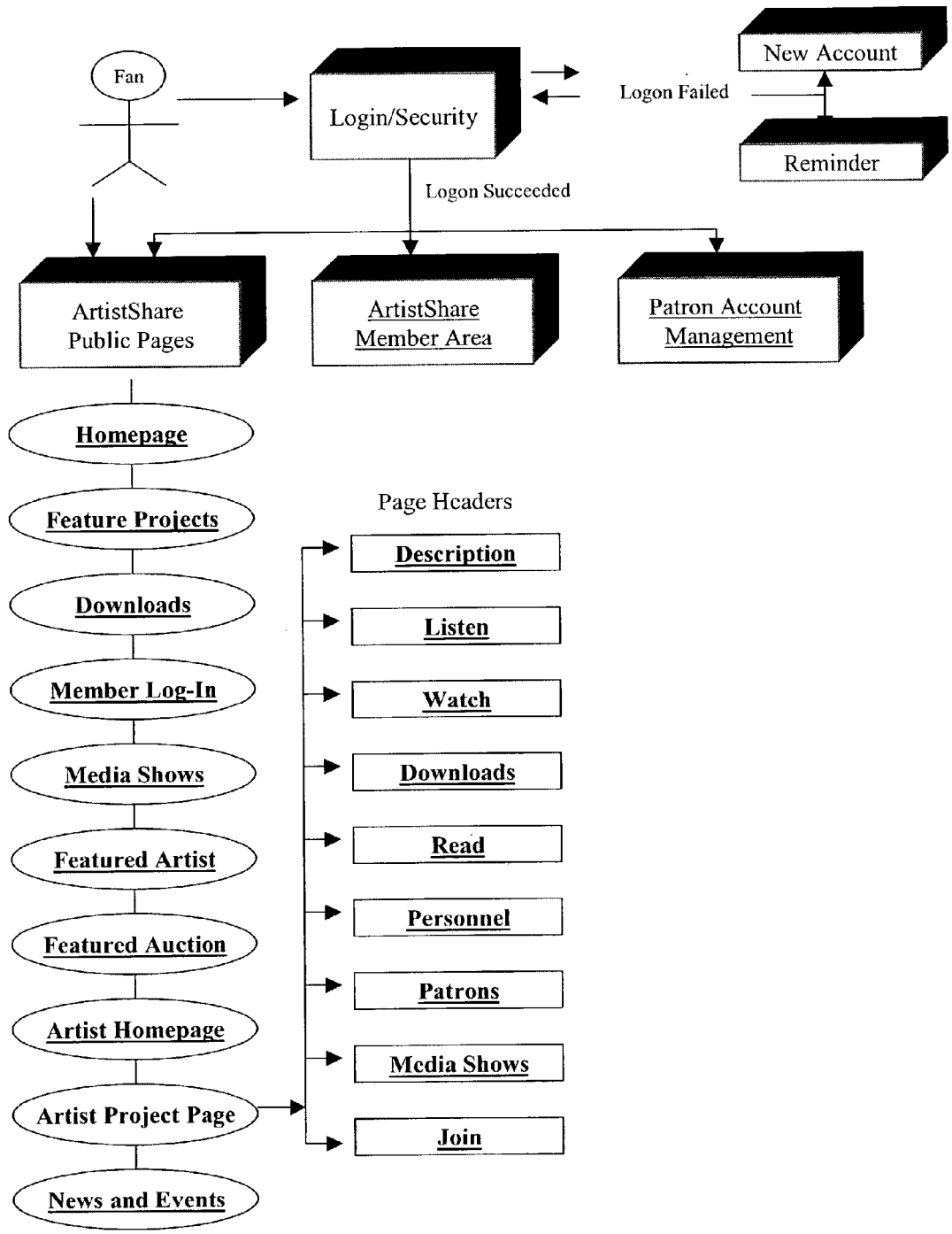
Figure 33:
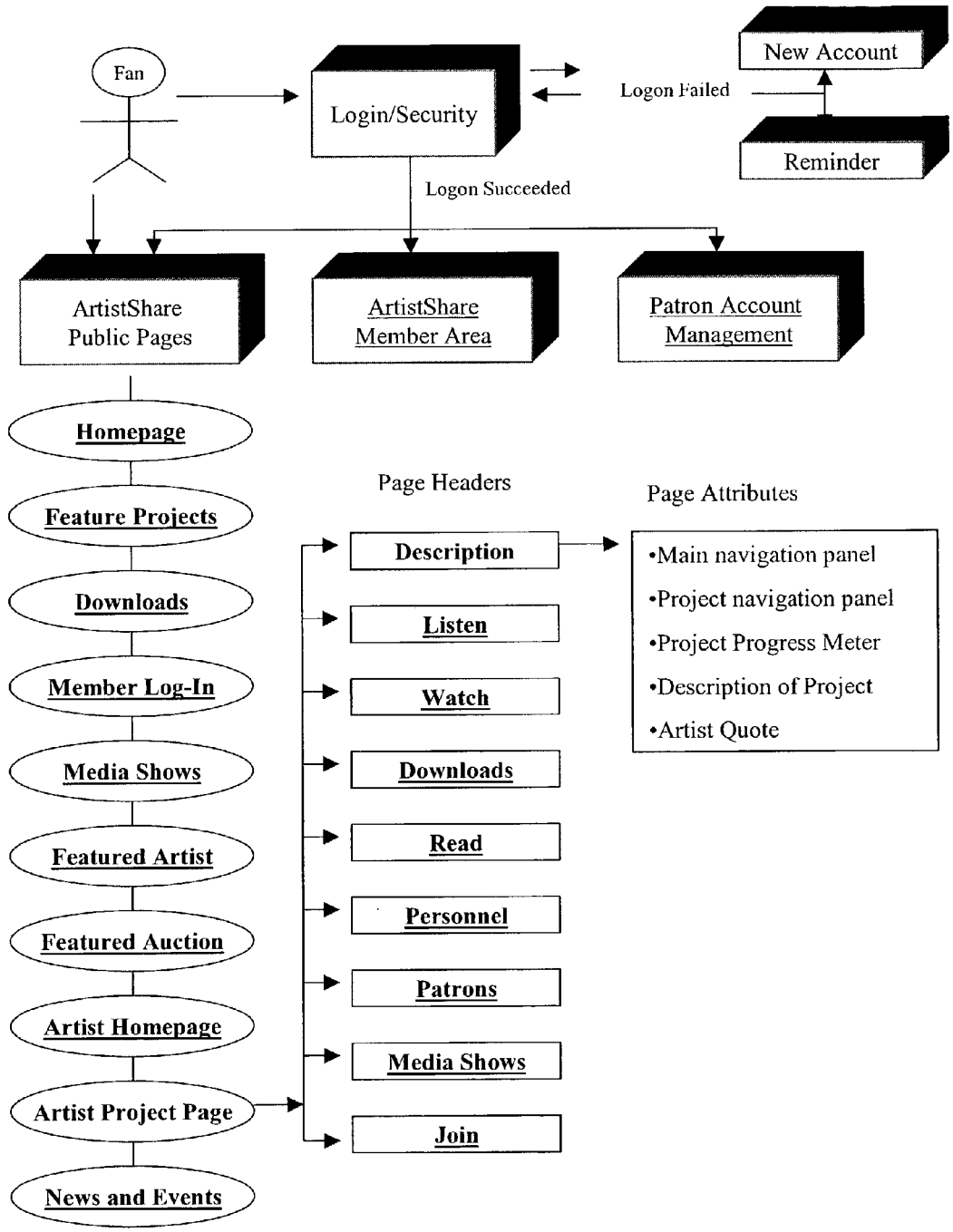
Figure 34:
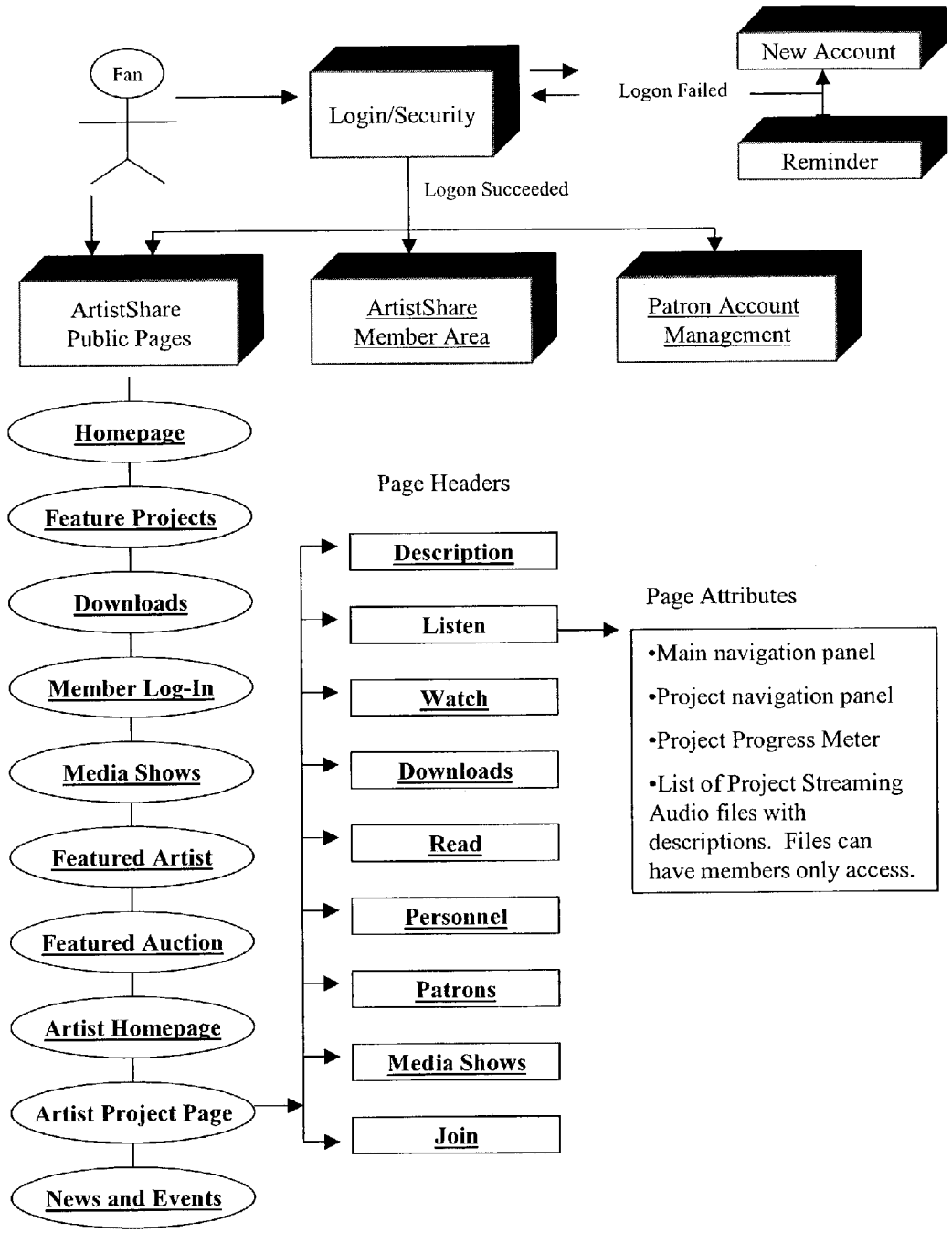
Figure 35:
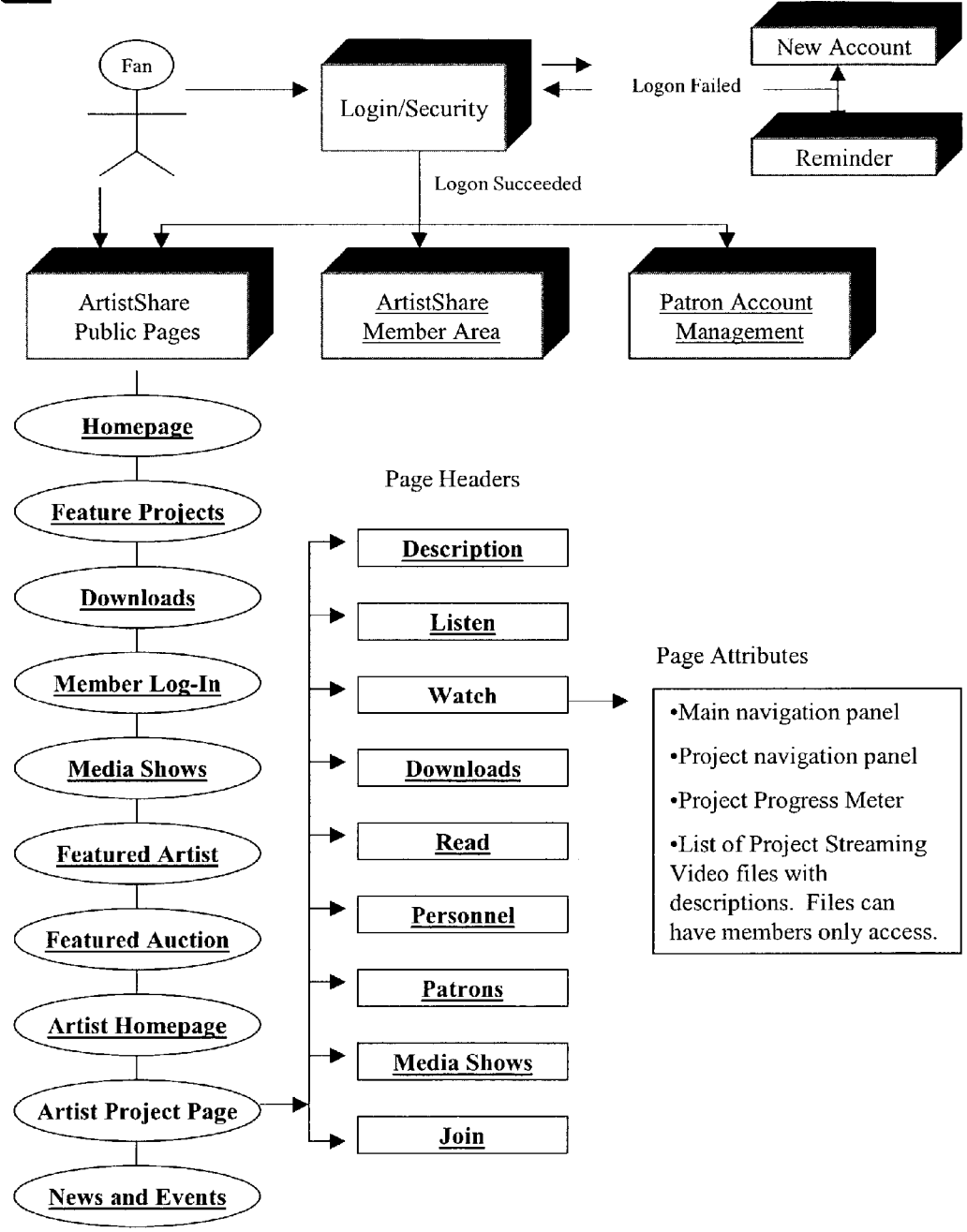
Figure 36:
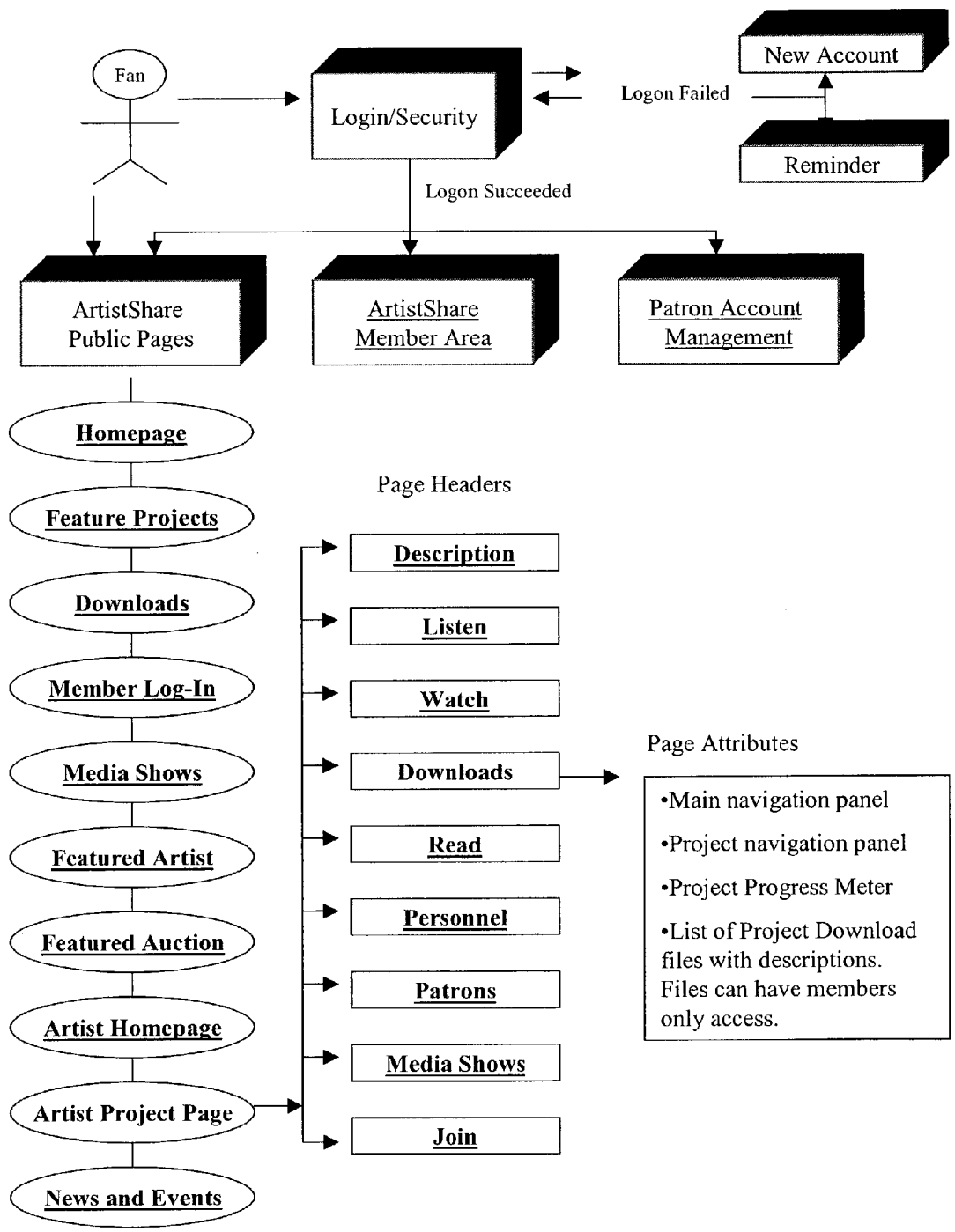
Figure 37:
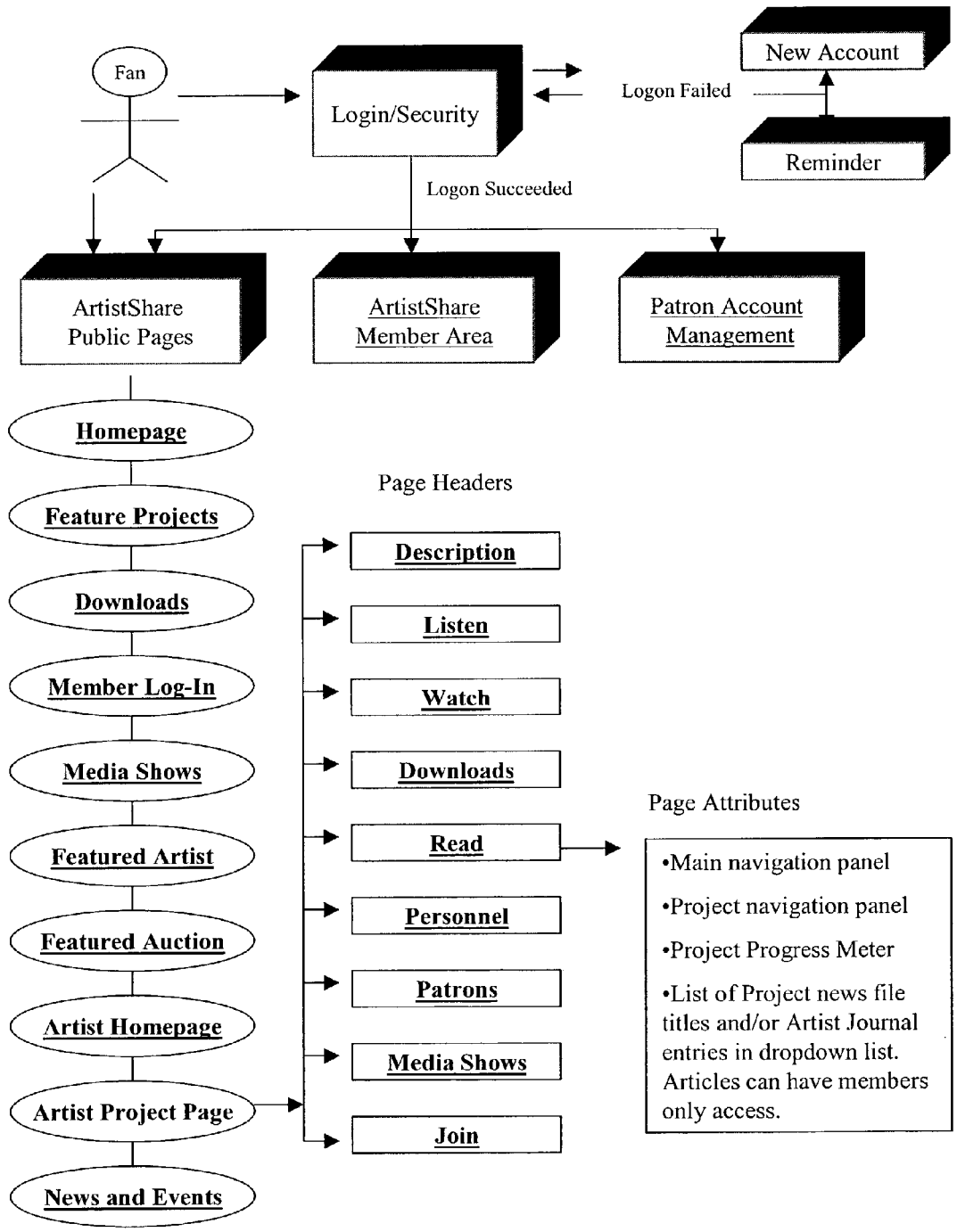
Figure 38:
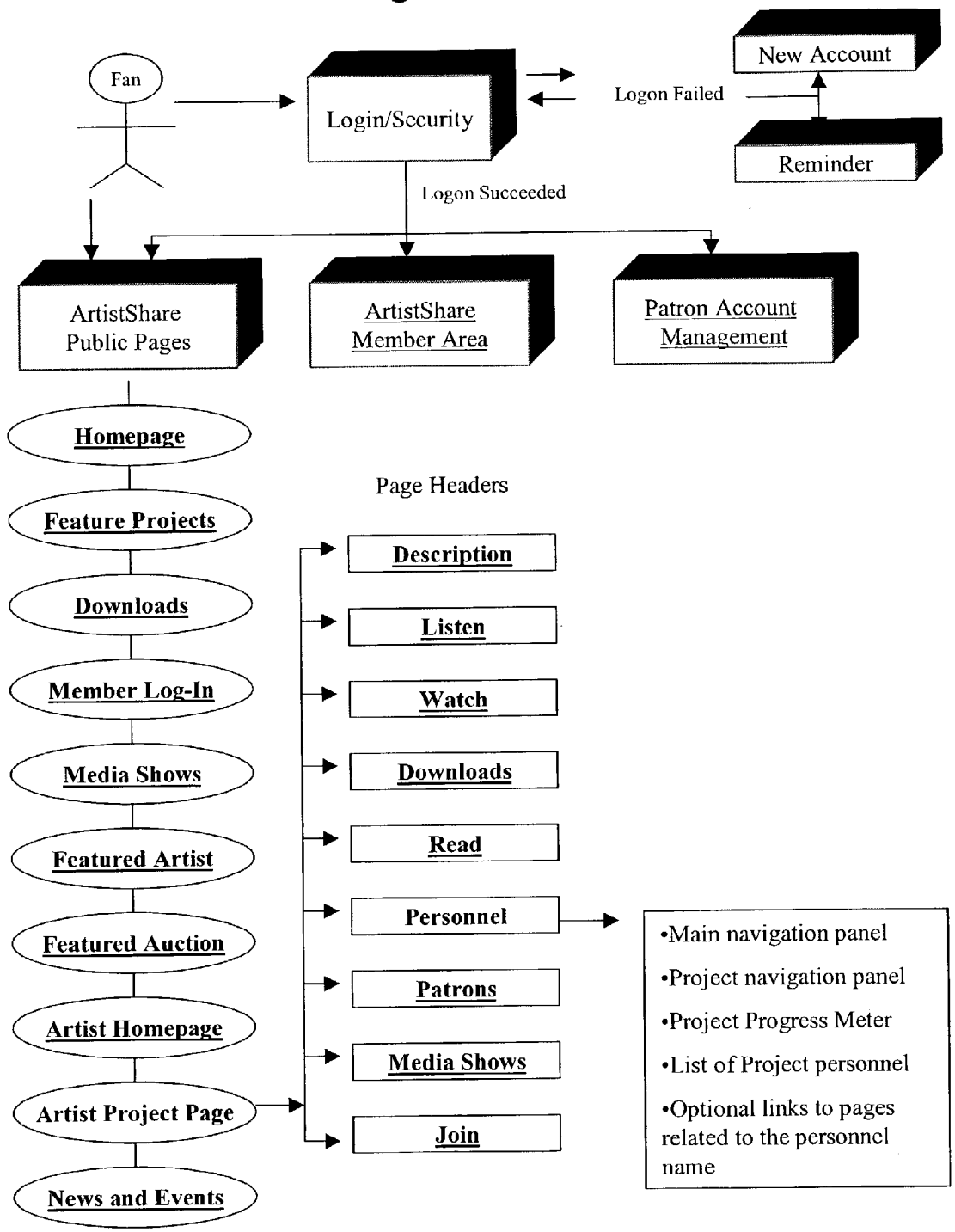
Figure 39:
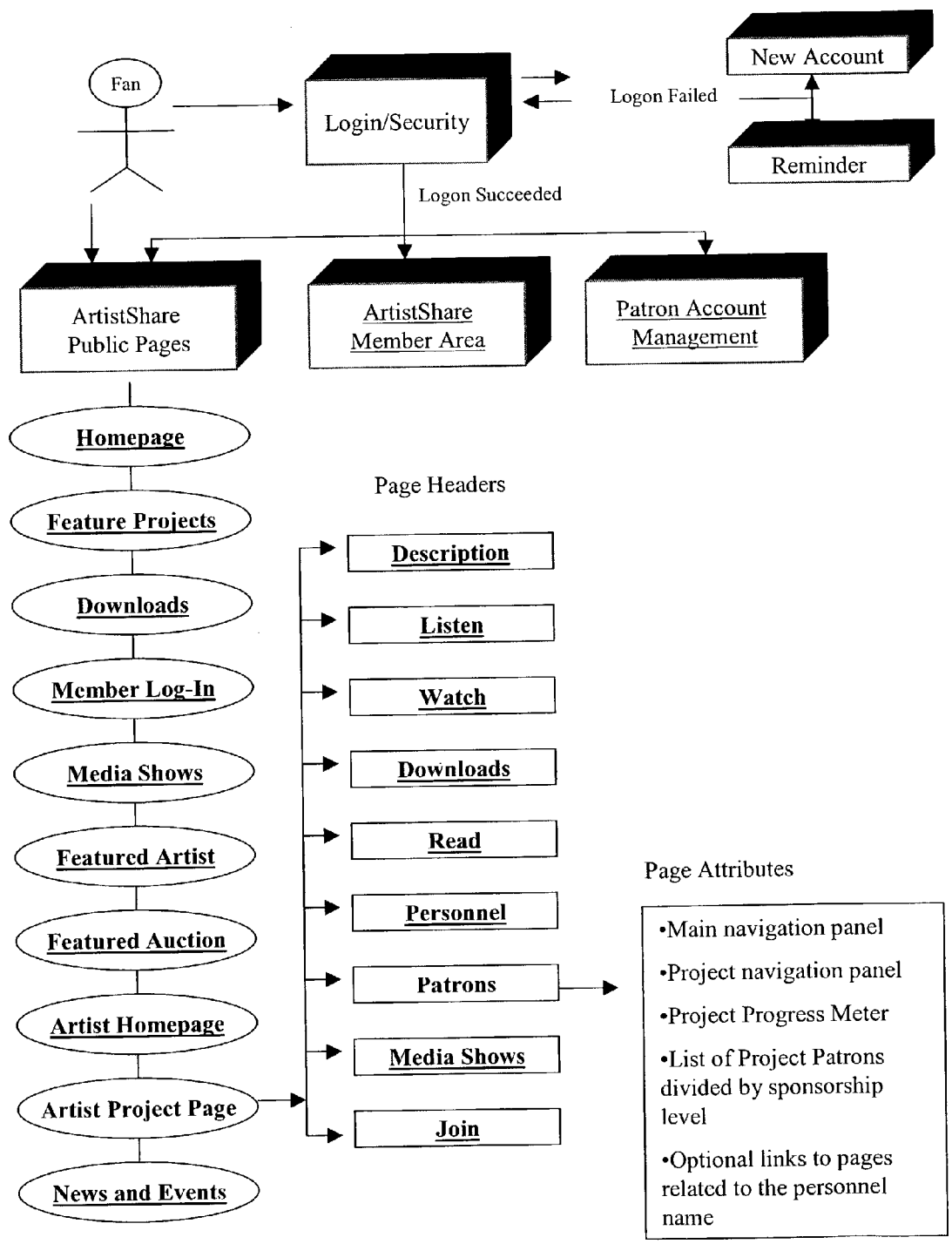
Figure 40:
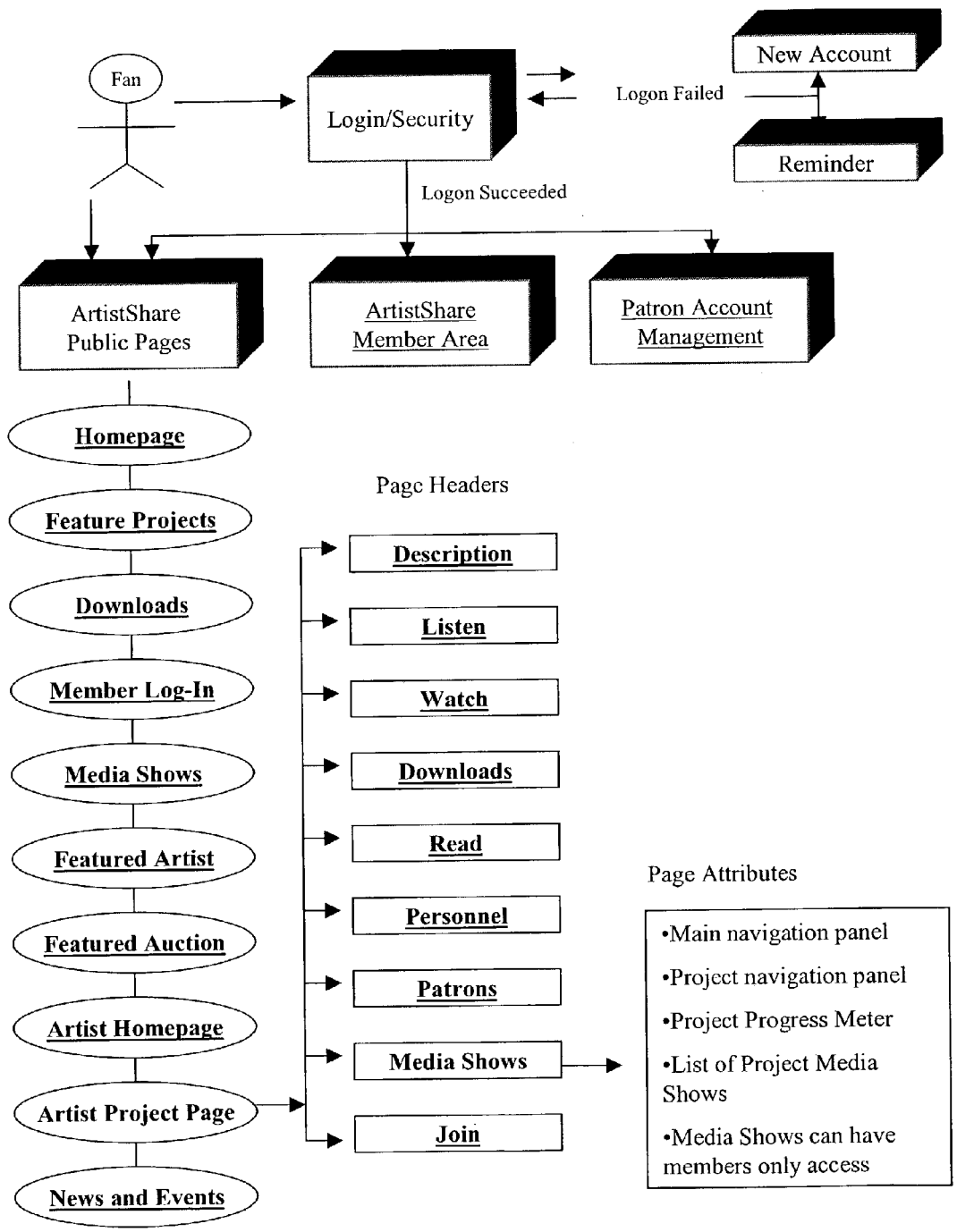
Figure 41:
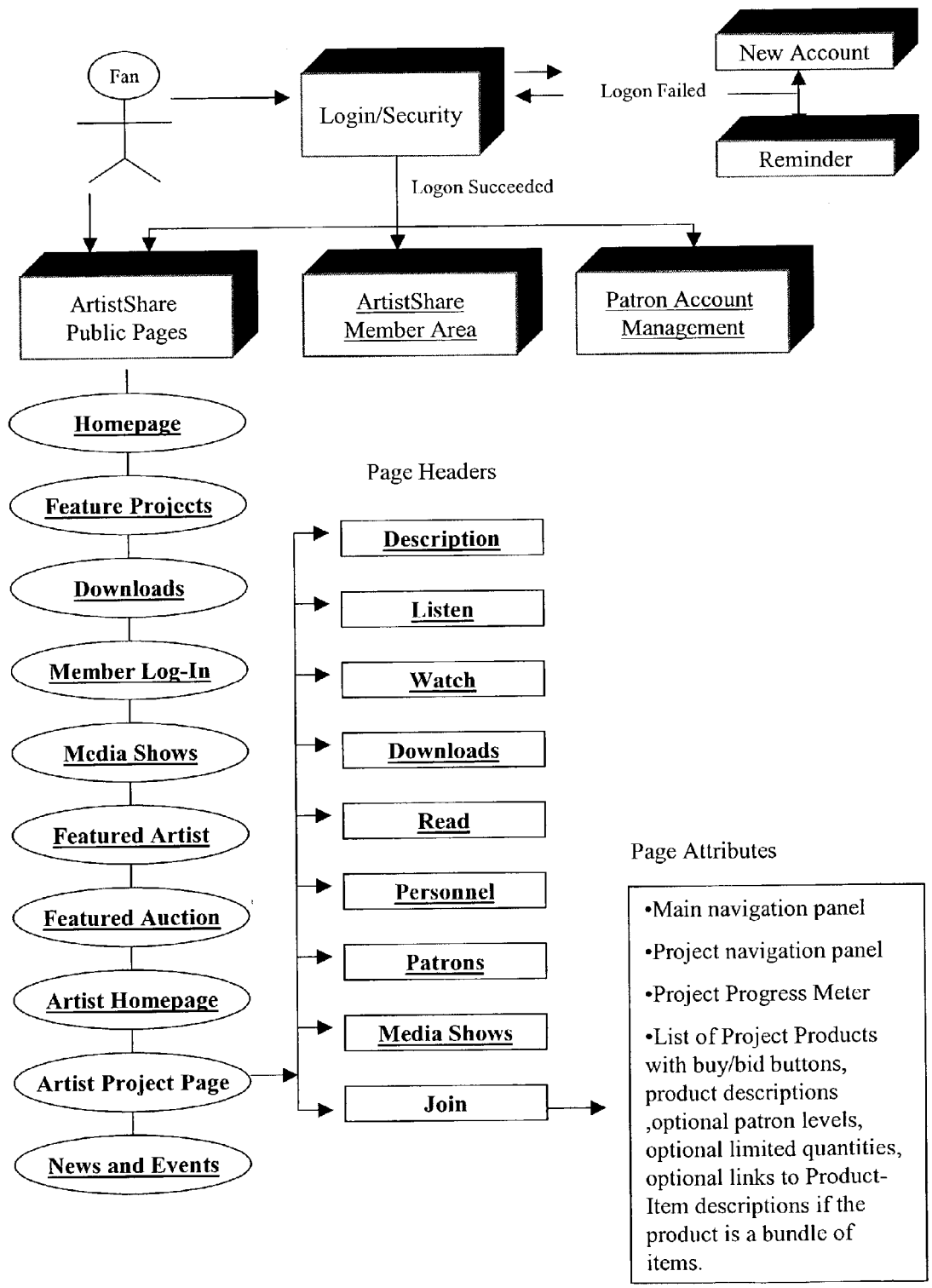

FIG. 32 illustrates attributes of one or more web-pages and/or one or more links to project pages of artists, including descriptions, streaming audio ("Listen"), and video ("Watch"), downloads, news ("Read"), personnel (e.g., band members, collaborators, etc.), patrons, artists' media shows, and to a page for registering with an artist ("Join").

FIGS. 33-41 illustrate the attributes of one or more web pages and/or one or more links to the various web-pages/links associated with the attributes of the artists project pages (FIG. 32). Thee attributes generally include a main navigation panel, project navigation panel, and a project progress meter, for tracking the progress of a project. Other attributes include lists for projects which include: streaming audio (FIG. 34), streaming video (FIG. 35), downloads (FIG. 36), news articles (FIG. 37), project personnel (FIG. 38), patrons (FIG. 39)—including optional links to patron web-pages (which may be part of the ArtistShare system), media shows (FIG. 40), lists of products to purchase/bid on—which may include product descriptions, patron levels and quantities.

Figure 42:
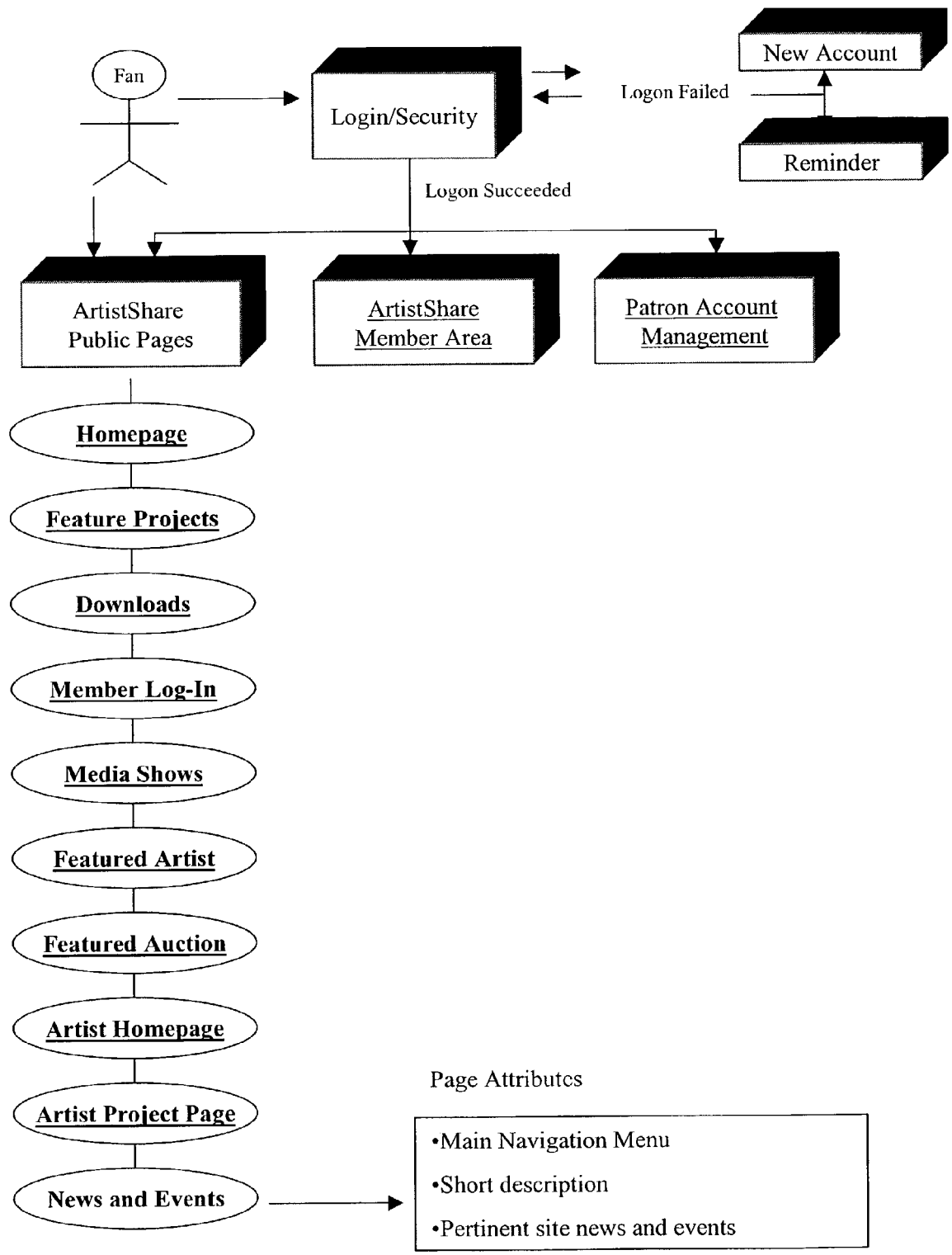
Figure 43:
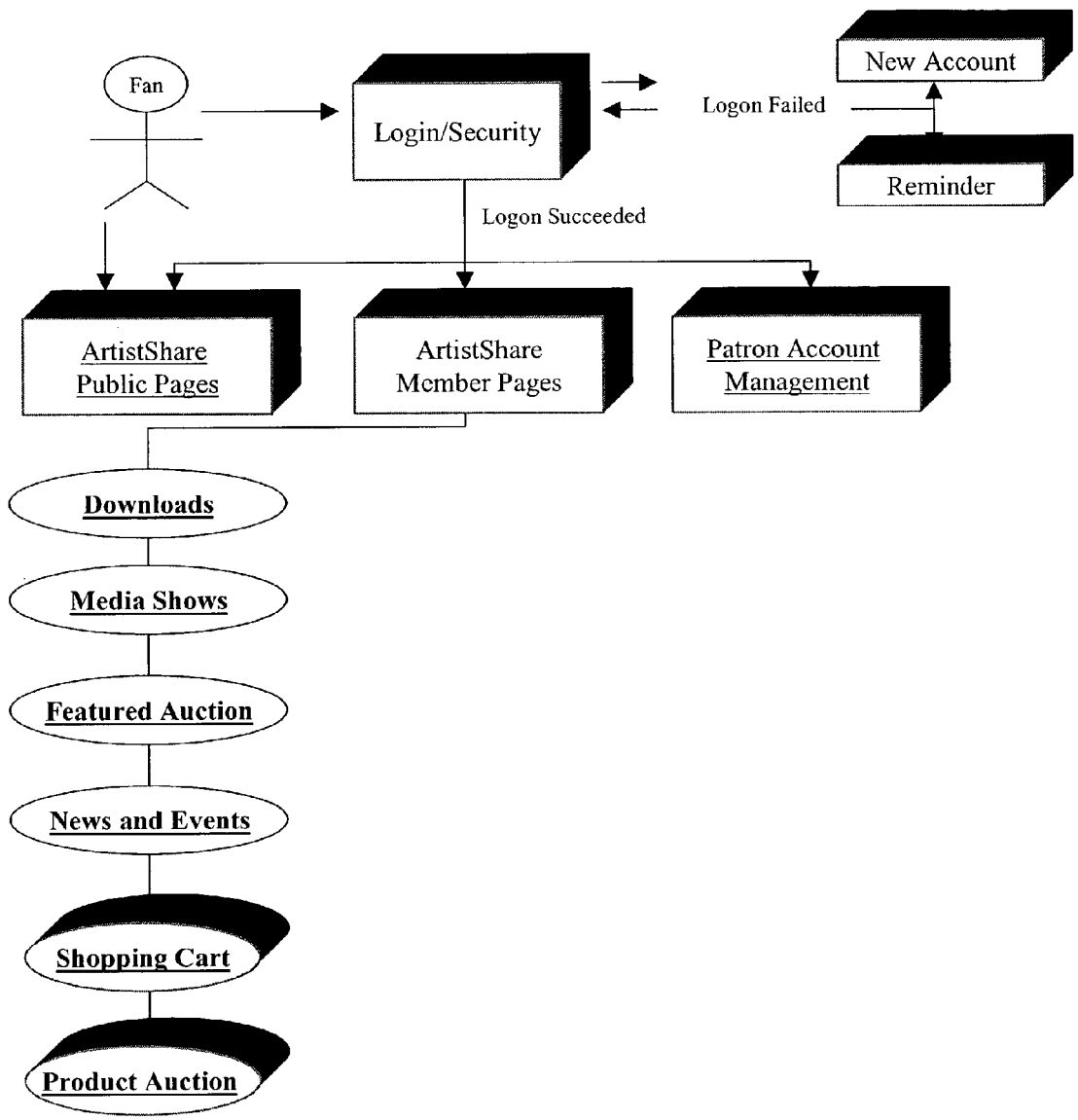
FIGS. 43-49 are block diagrams illustrating attributes one or more web pages and/or one or more links for member pages of the ArtistShare system according to an embodiment of the present invention.
Figure 44:
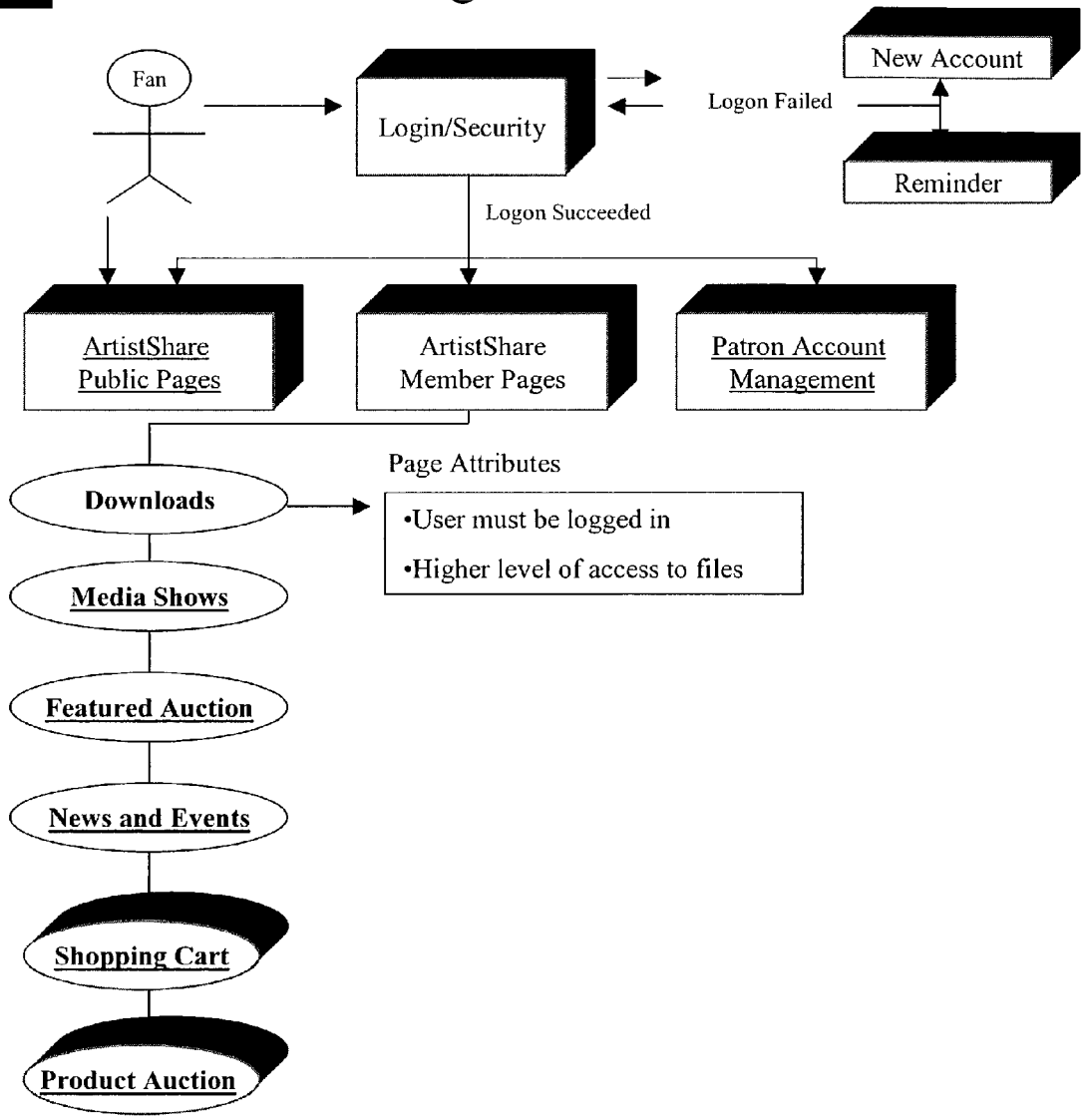
Figure 45:
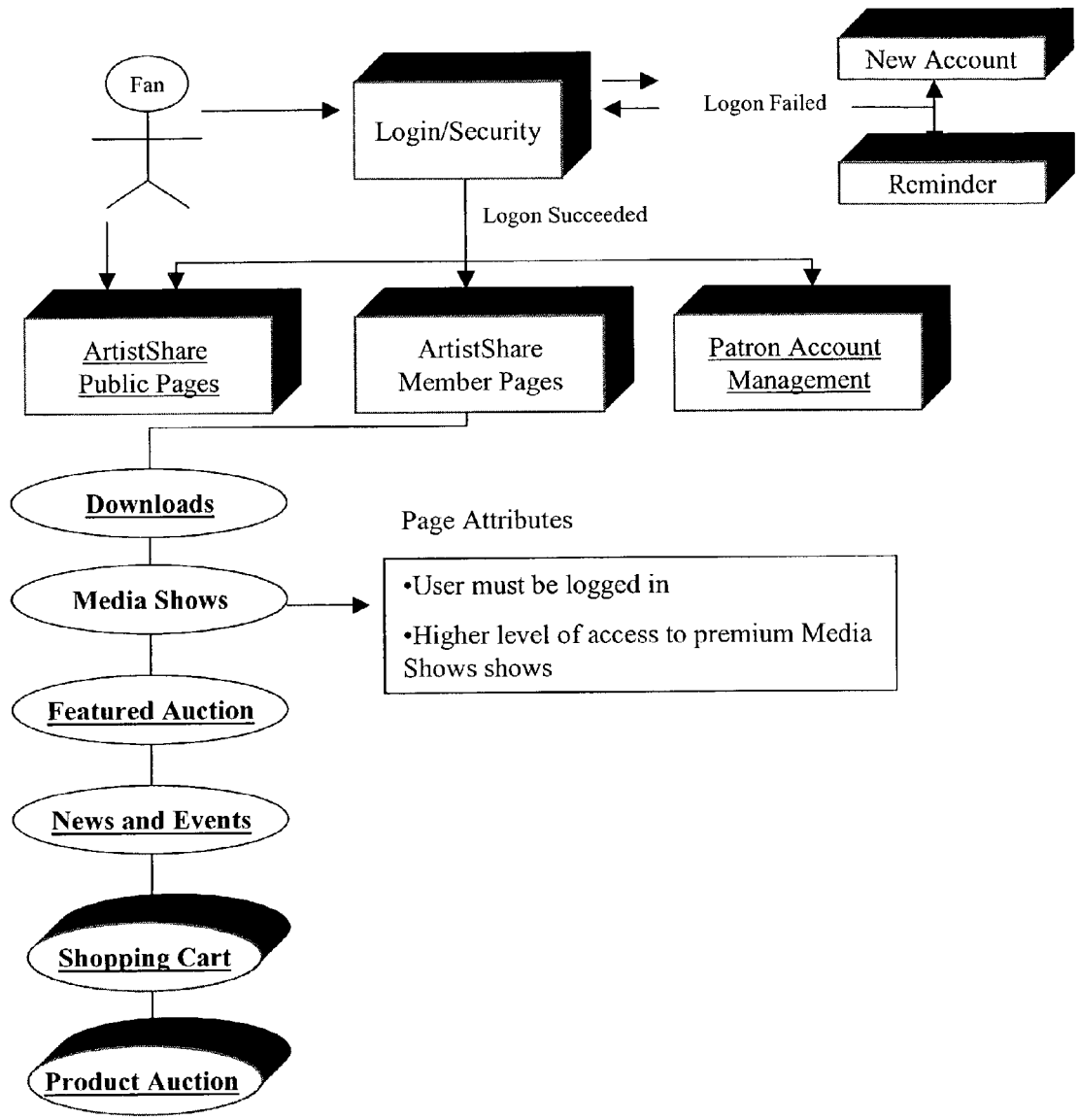
Figure 46:
Figure 46:
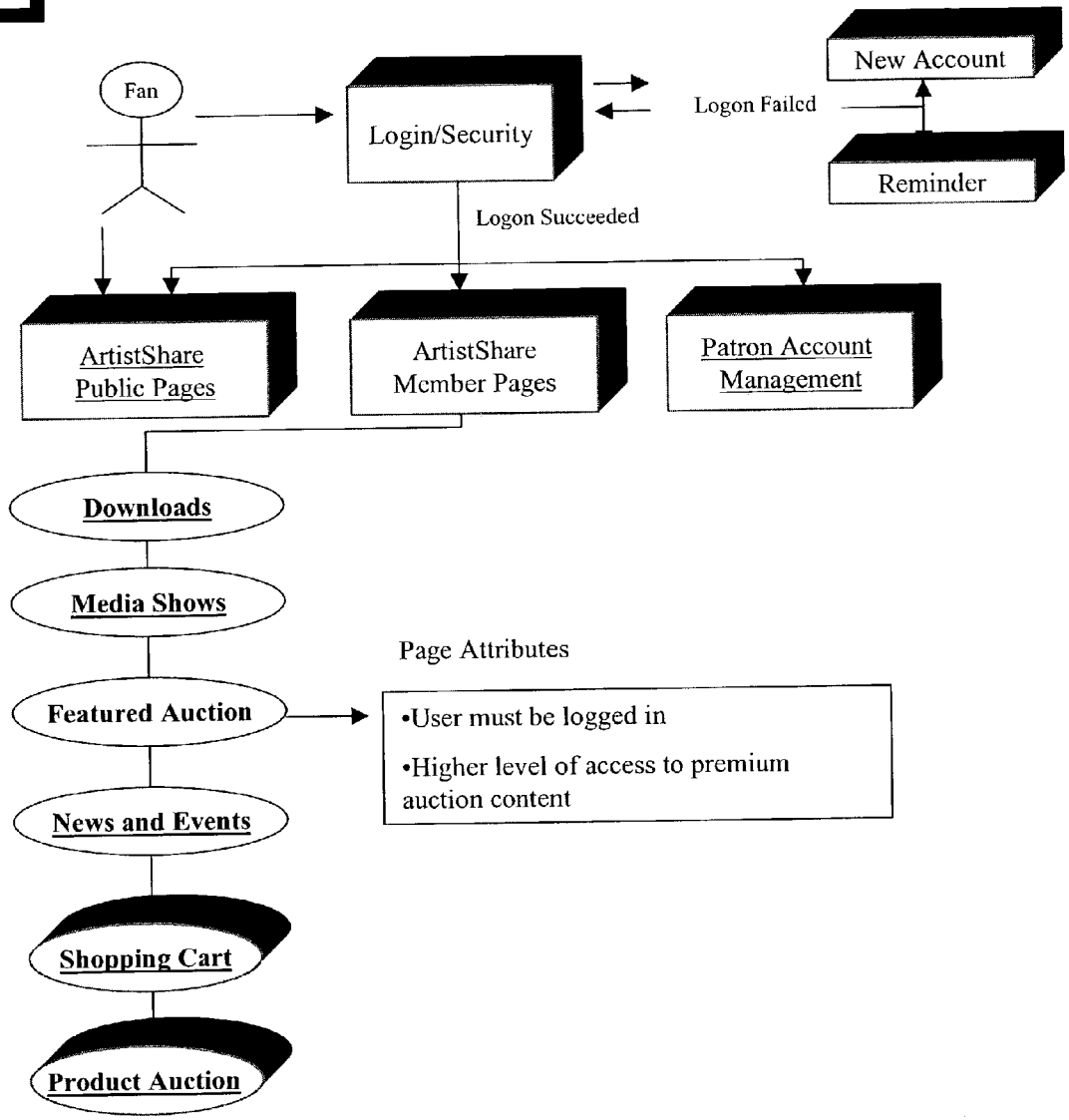
Figure 47:
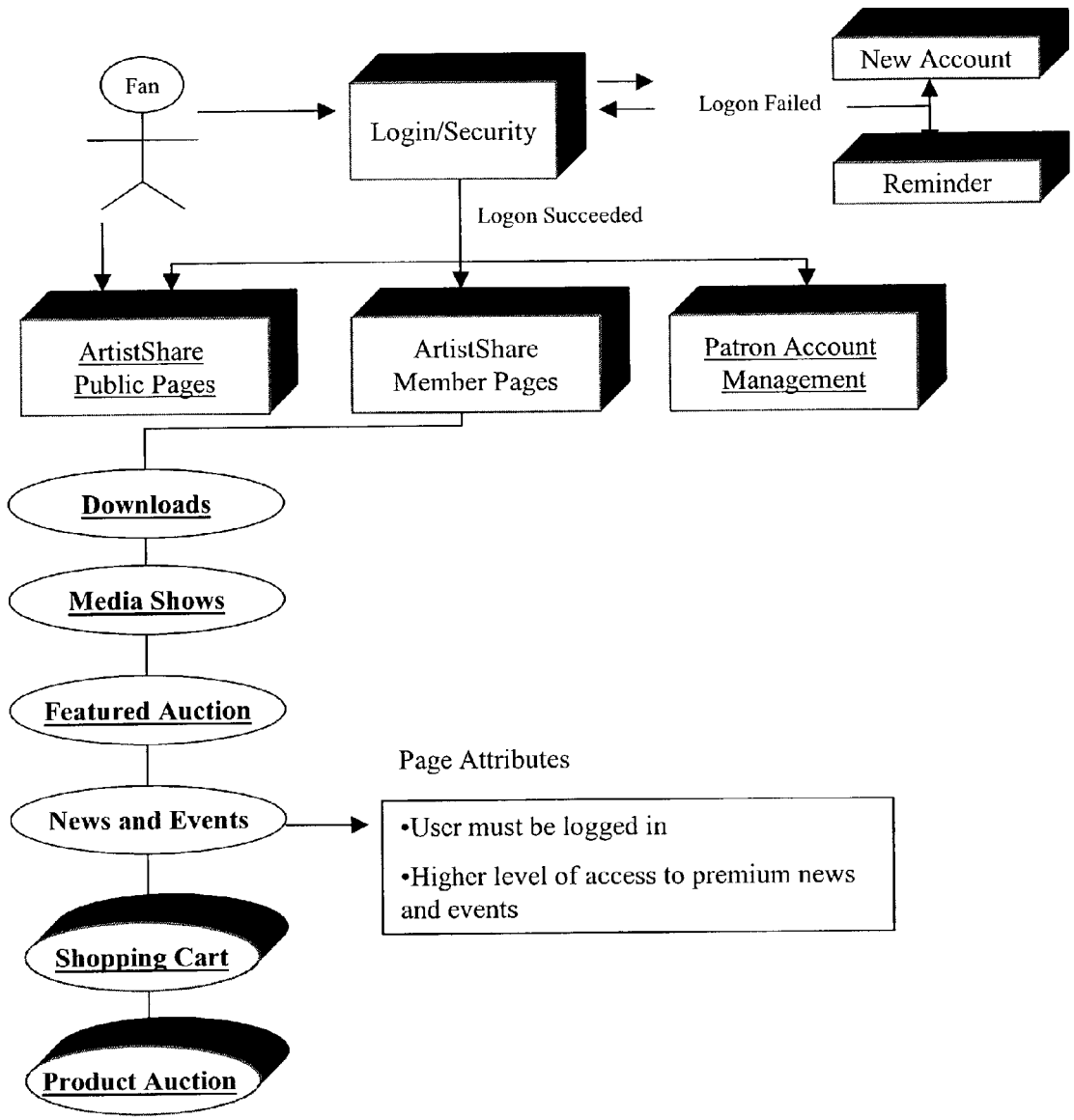
Figure 48:
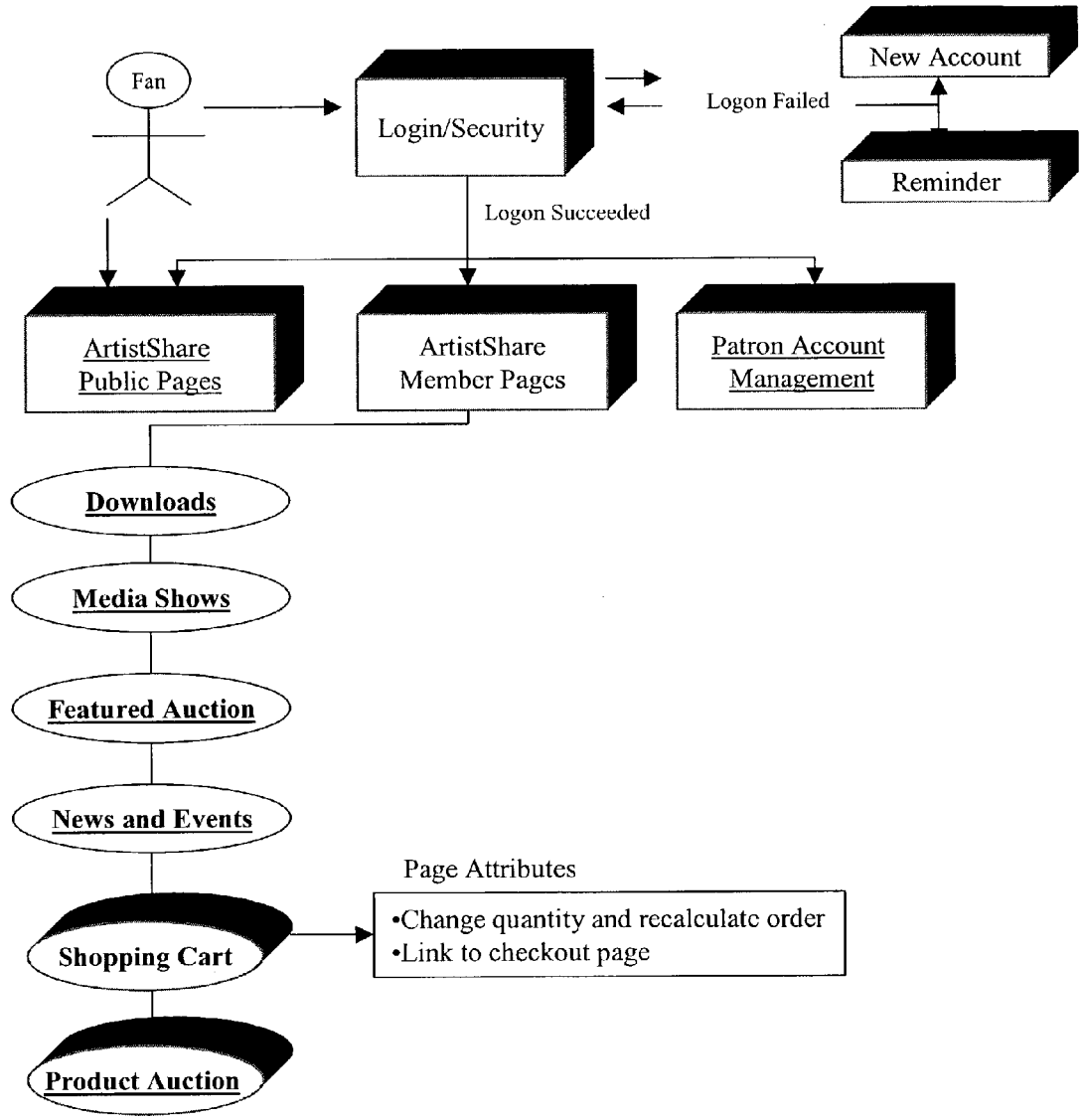
Figure 49:
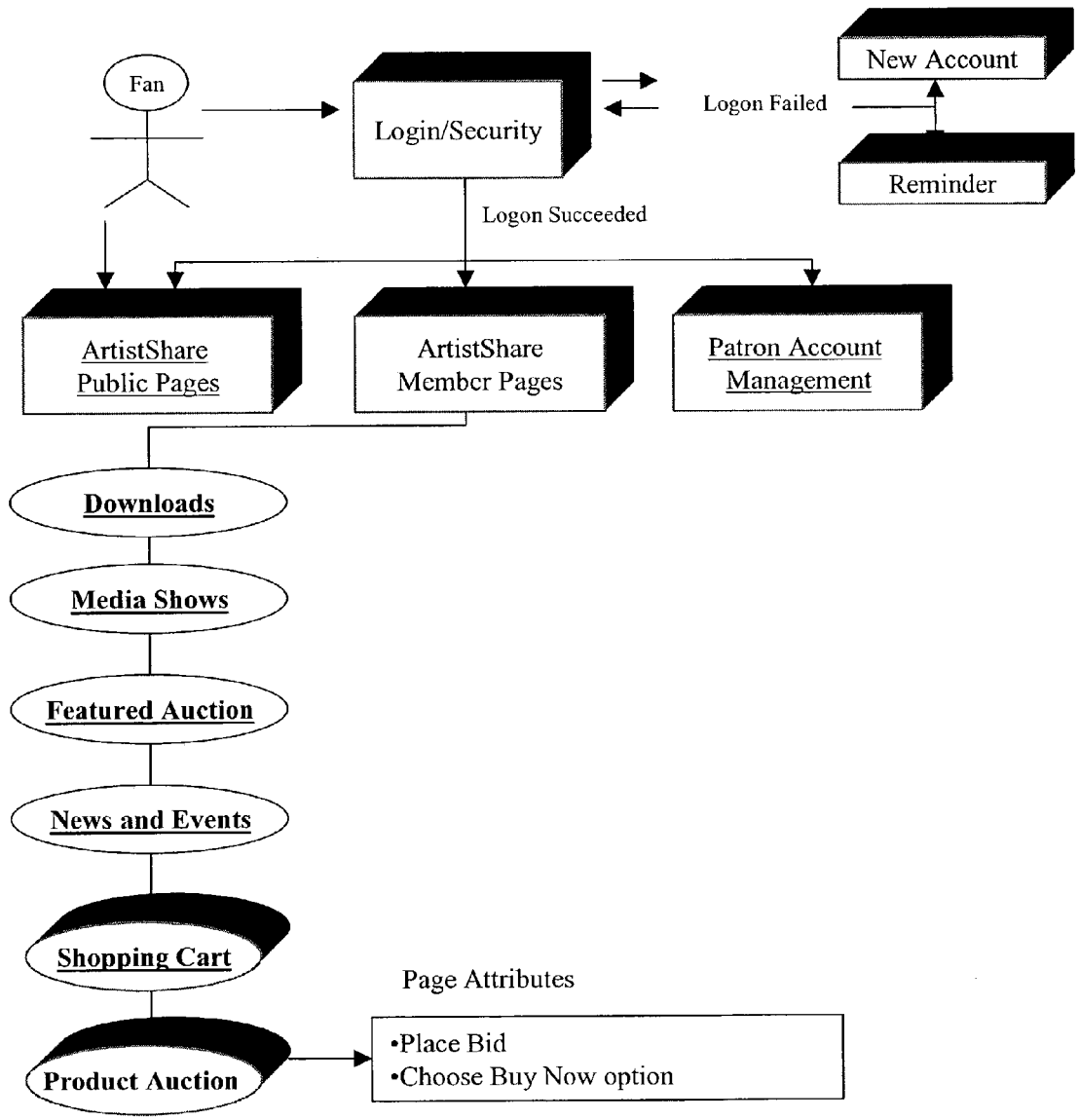
Figure 50:
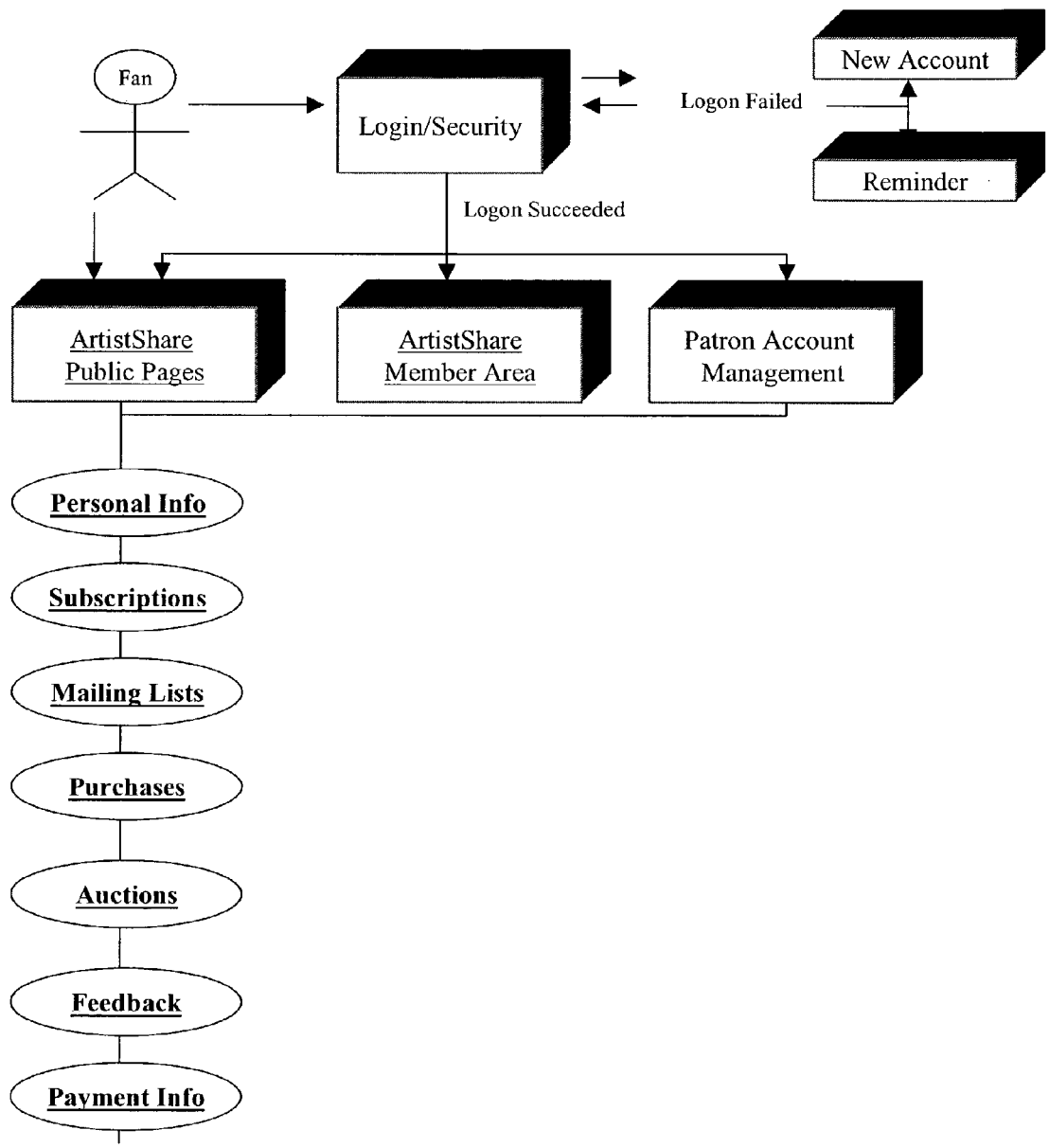
FIGS. 50-57 are block diagrams illustrating attributes one or more web pages and/or one or more links for the management of fan accounts according to an embodiment of the invention.
Figure 51:
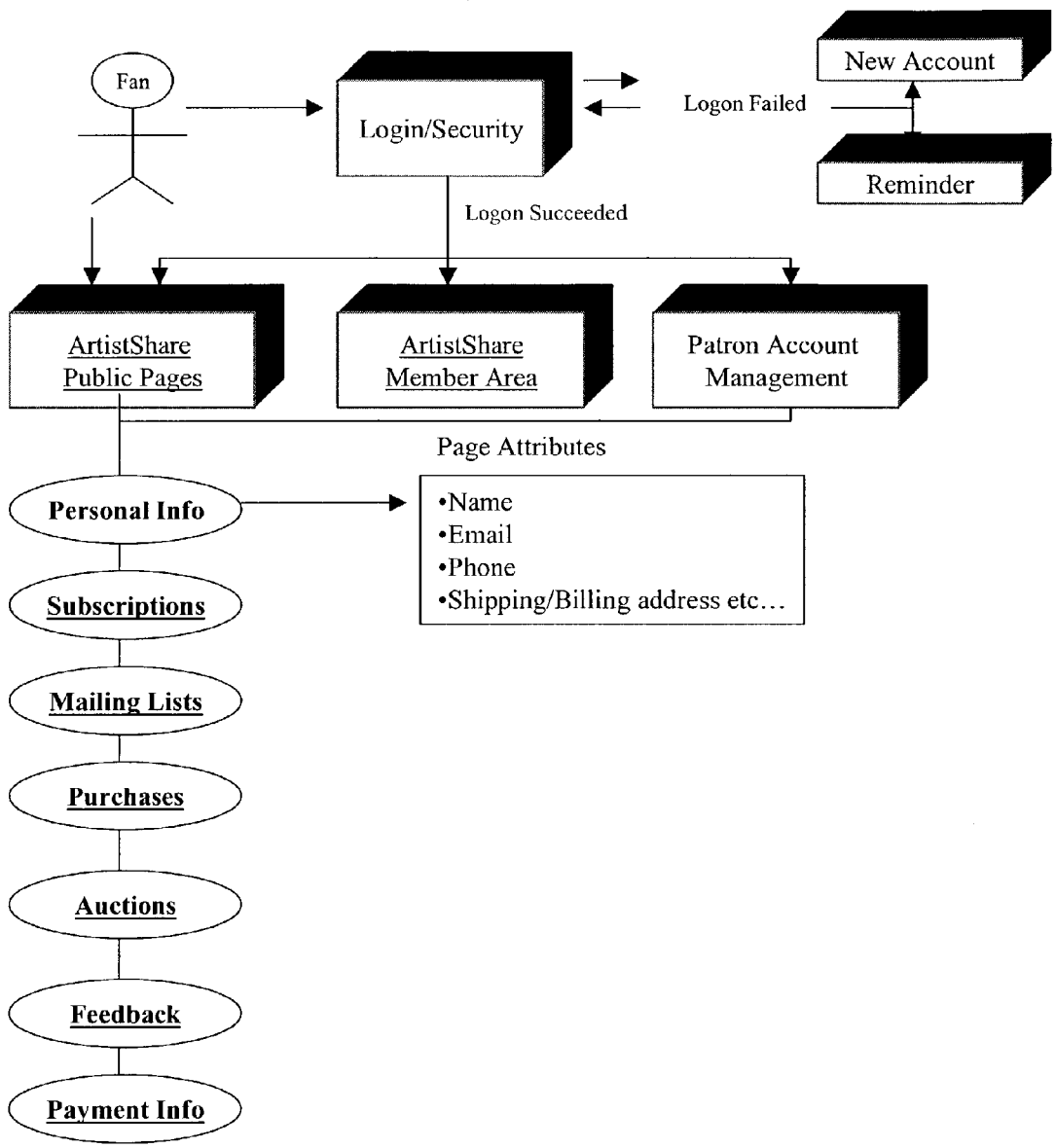
Figure 52:
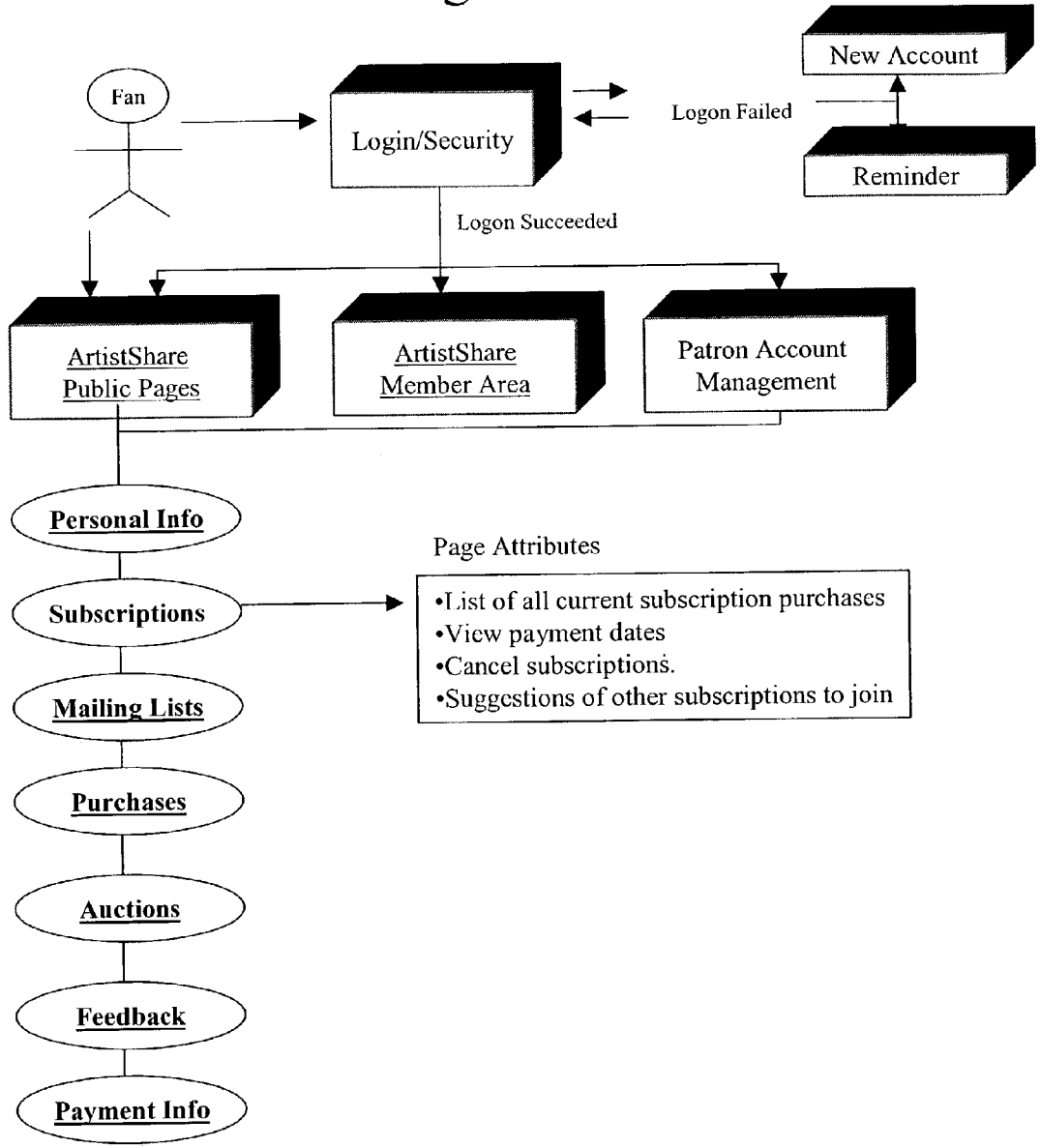
Figure 53:
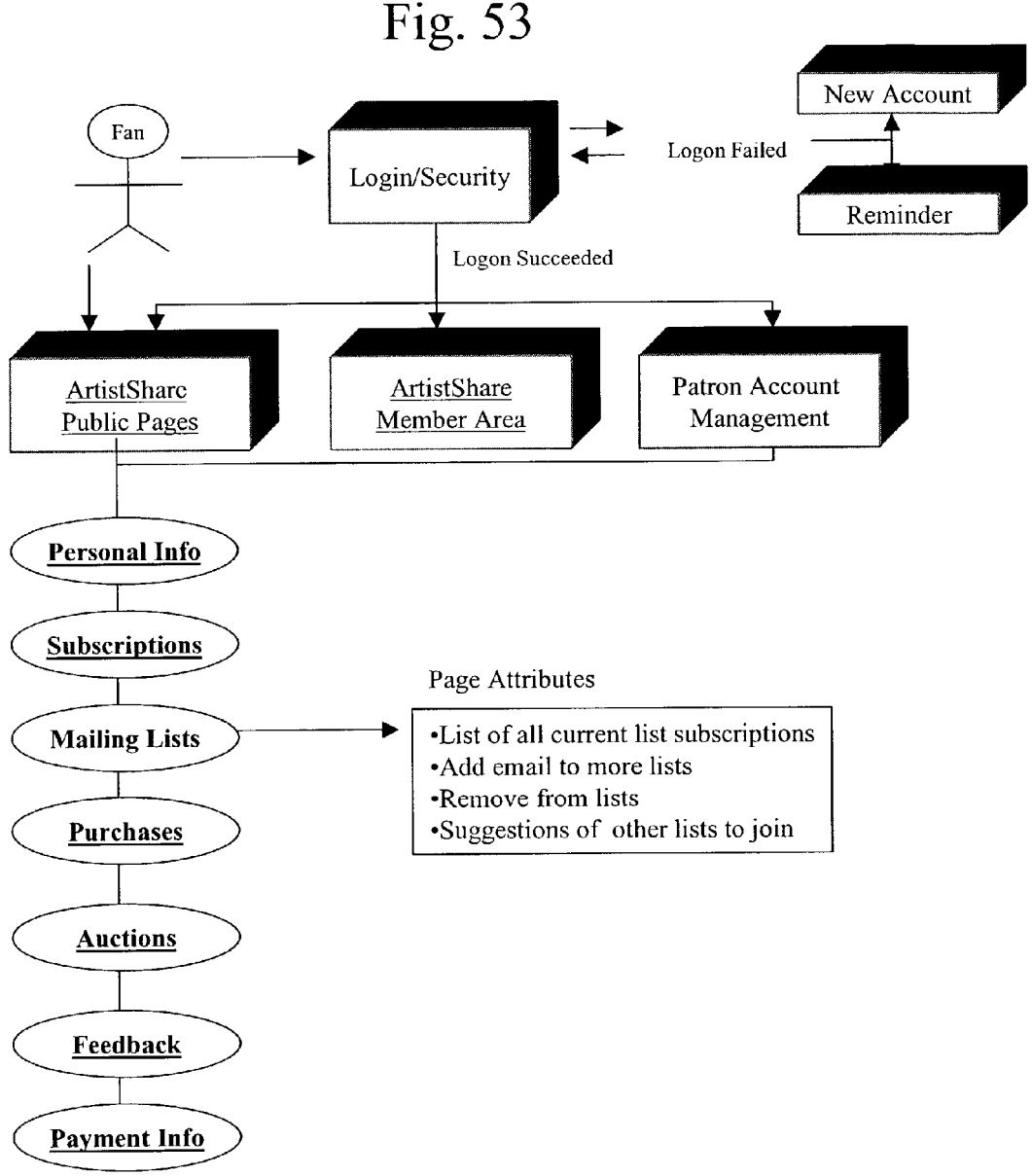
Figure 54:
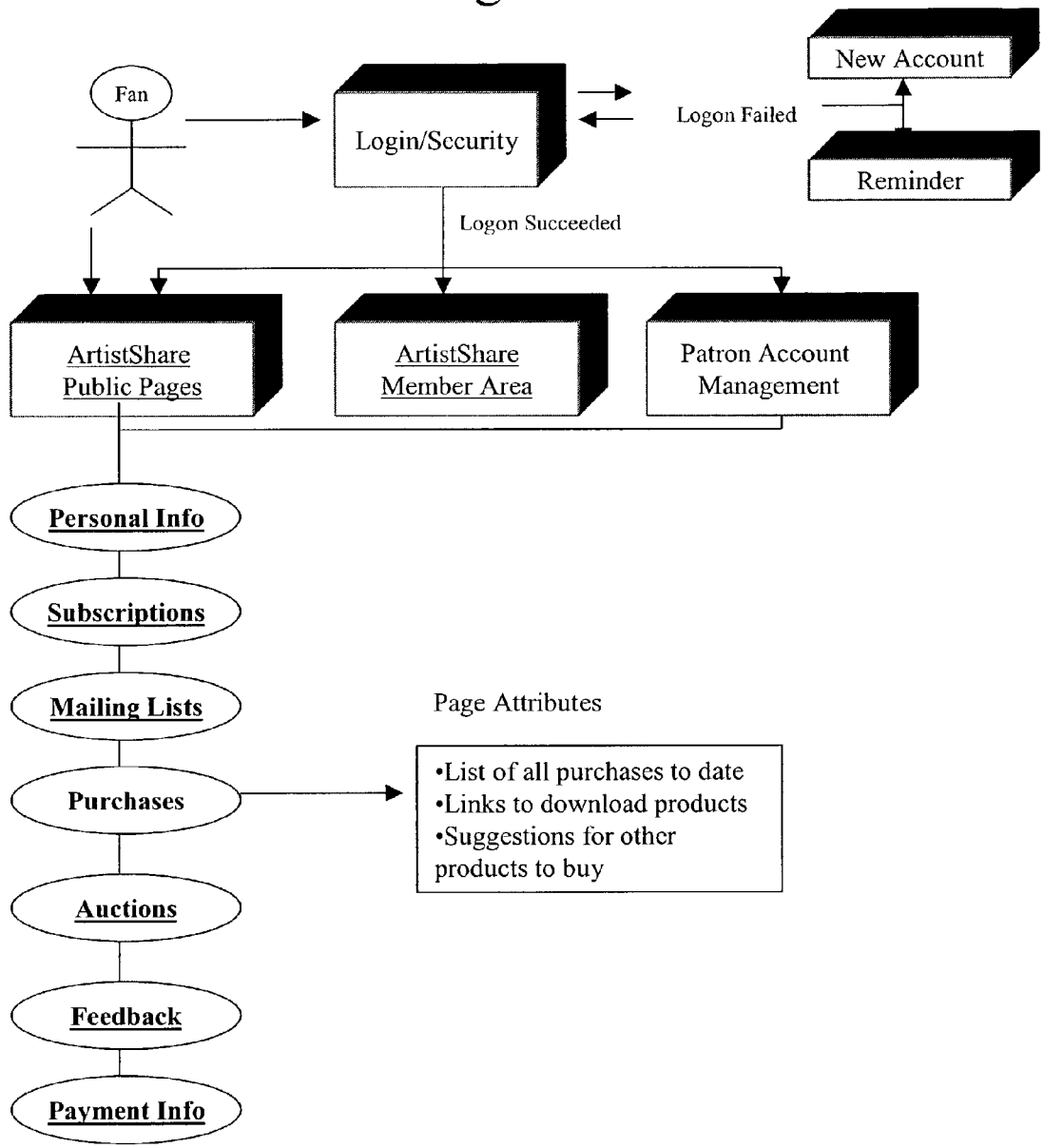
Figure 55:
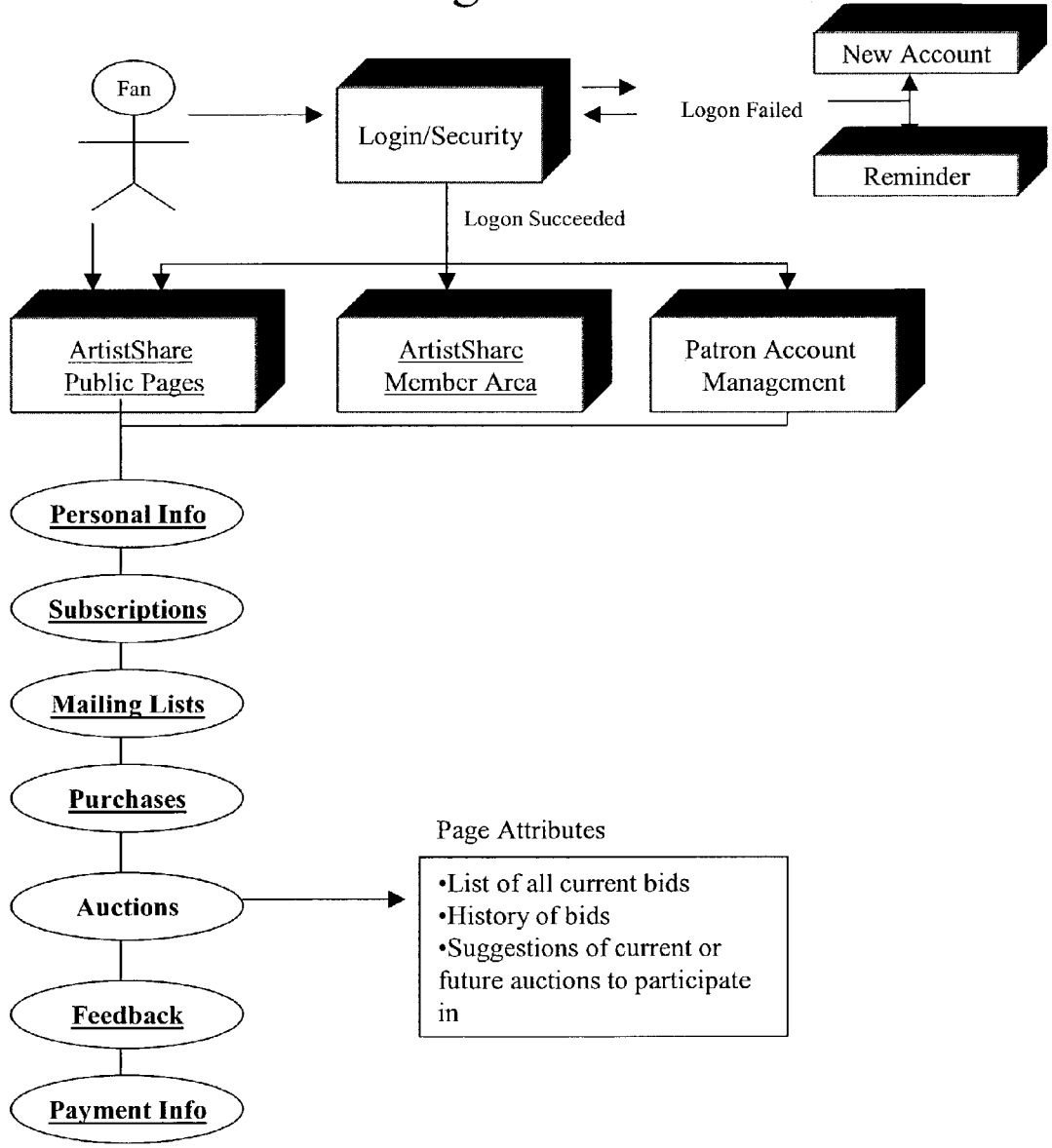
Figure 56:
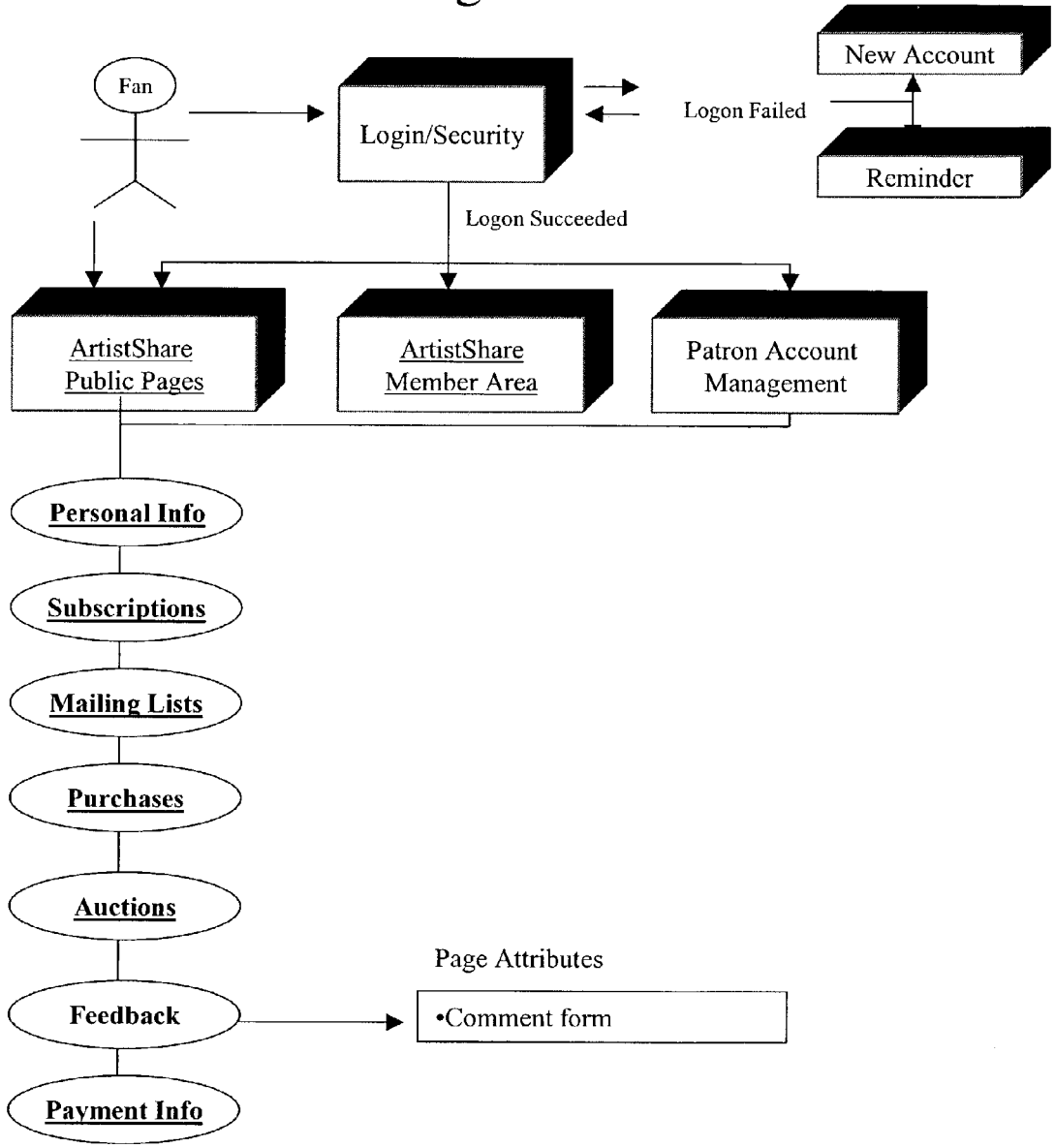

FIG. 42 illustrates the attributes of one or more web pages and/or one or more links for ArtistShare News and Events public pages and may include a main navigation link and a short description and a listing of current ArtistShare news and events thereof.

Member ArtistShare pages (FIGS. 43-49) may be similar to the public pages (and may be arranged the same as the public available pages), except that they may offer premium content and higher levels of access to media including news, downloads, offers and events. Member pages may also include shopping cart and auction pages for e-commerce transactions, as well as the purchase of artist products and associated merchandise. FIGS. 43-49 illustrate examples of the attributes that may be associated with web pages for member pages.

However, members of ArtistShare may be able to sign-up with various artists to become patrons of the artists. A patron is a fan who registers with an artist (for example through the ArtistShare system) and who provides a monetary contribution to a project of an artist in exchange for certain entitlements. Although an embodiment of the invention includes monetary contribution, other contributions are possible for certain fans who may contribute to the production of the project by either providing production assistance, including, for example, providing musical instruments, a studio, vocals, playing ability, musical arrangement, song writing, mixing, mastering and the like. Also, a fan, patron, or any interested individual, may purchase inventory items associated with completed projects.

Figure 57:
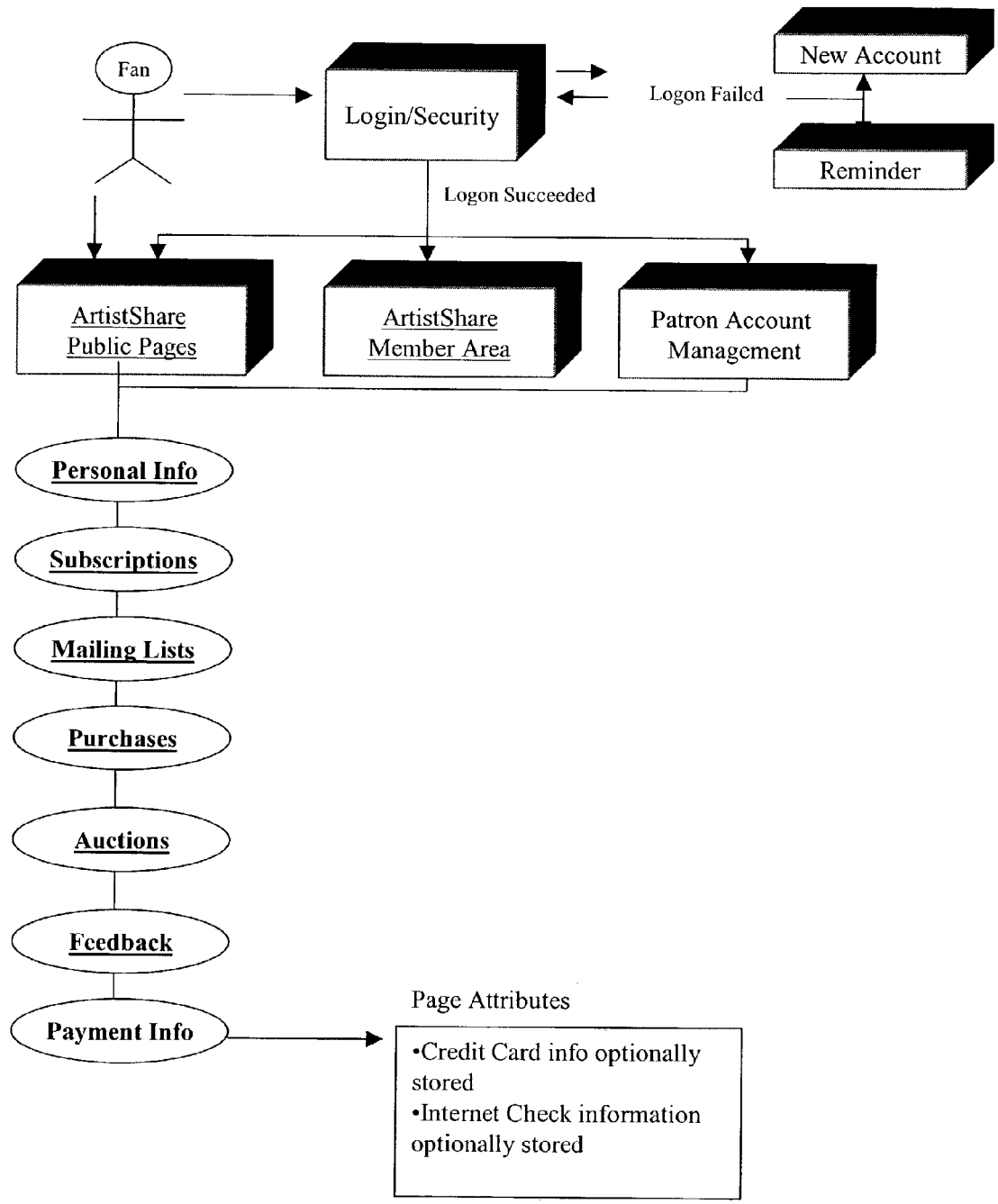
Figure 58:
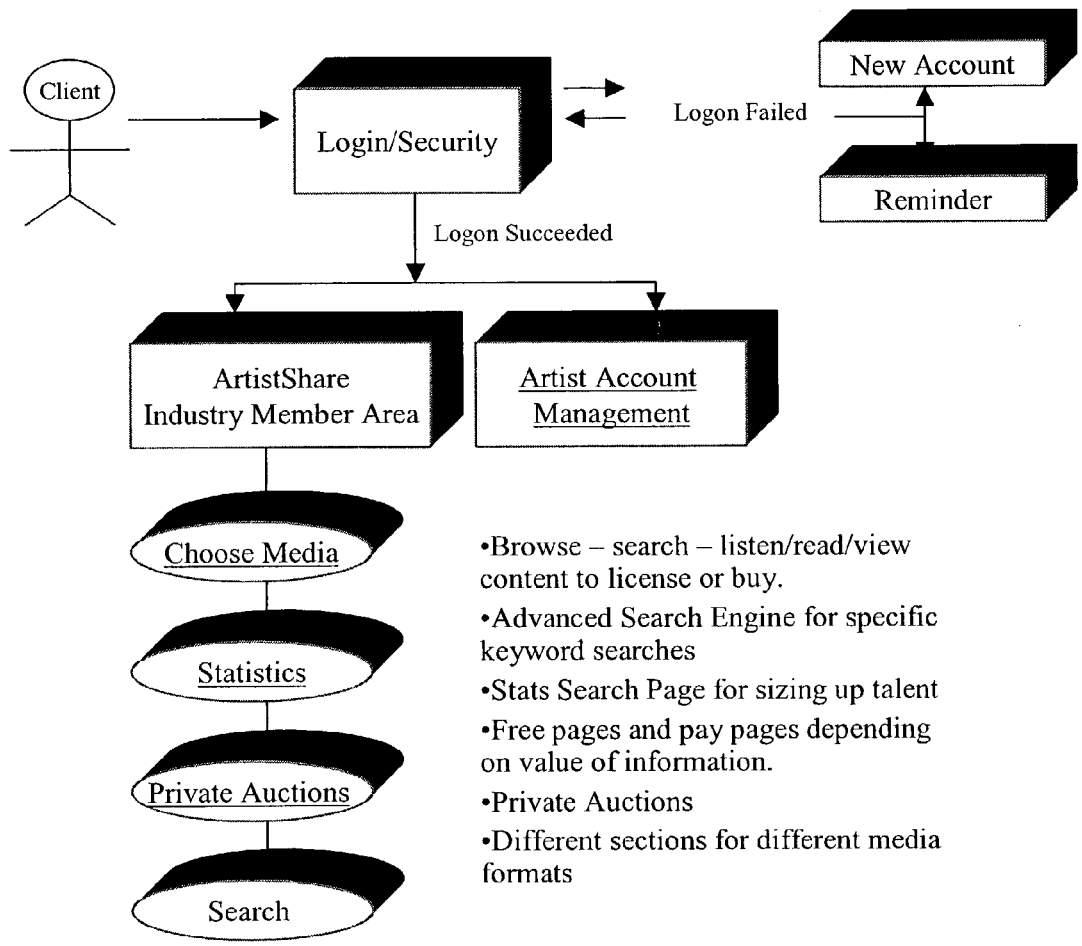
FIGS. 58-62 are block diagrams illustrating attributes one or more web pages and/or one or more links for industry accounts according to an embodiment of the present invention.
Figure 59:
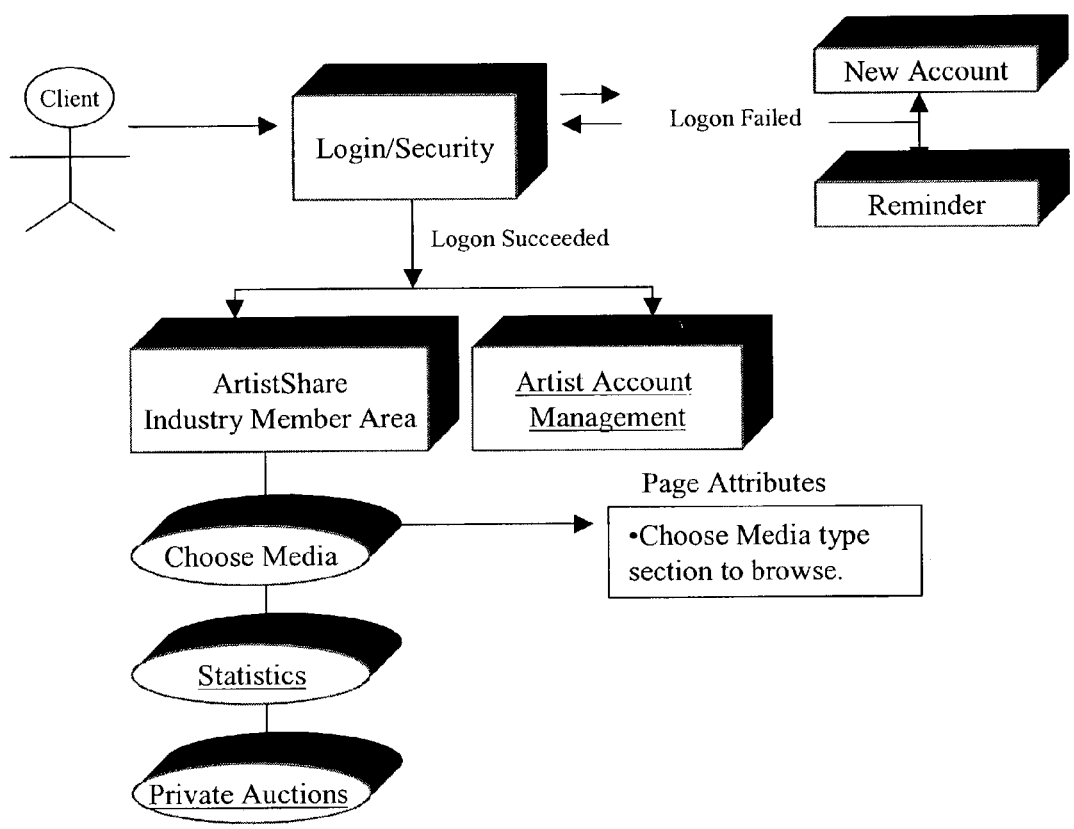

FIGS. 50-57 illustrate the attributes for one or more web pages and/or one or more links which may be used to manage accounts for fans and/or patrons. These attributes include a web-page(s) and/or link(s) to personal information (FIG. 51), purchased subscriptions (FIG. 52), mailing list subscribe and unsubscribe functions (FIG. 53), a list of purchases (FIG. 54), current and closed auctions the patron is involved in (FIG. 55), a feedback form to give feedback to ArtistShare or directly to the Artist (FIG. 56) and stored payment information such as credit card or wire transfer information for purchases (FIG. 57).

Figure 60:
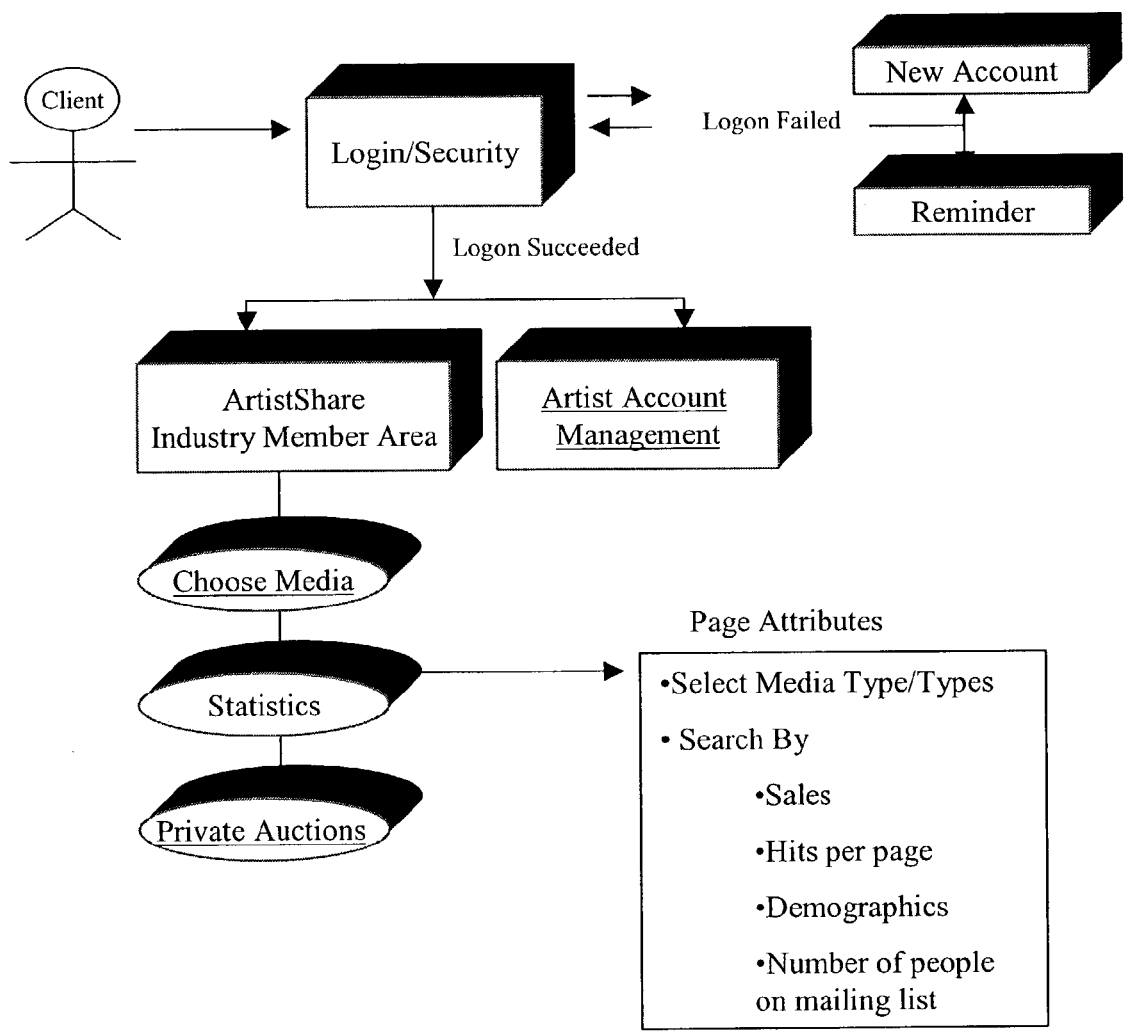
Figure 61:
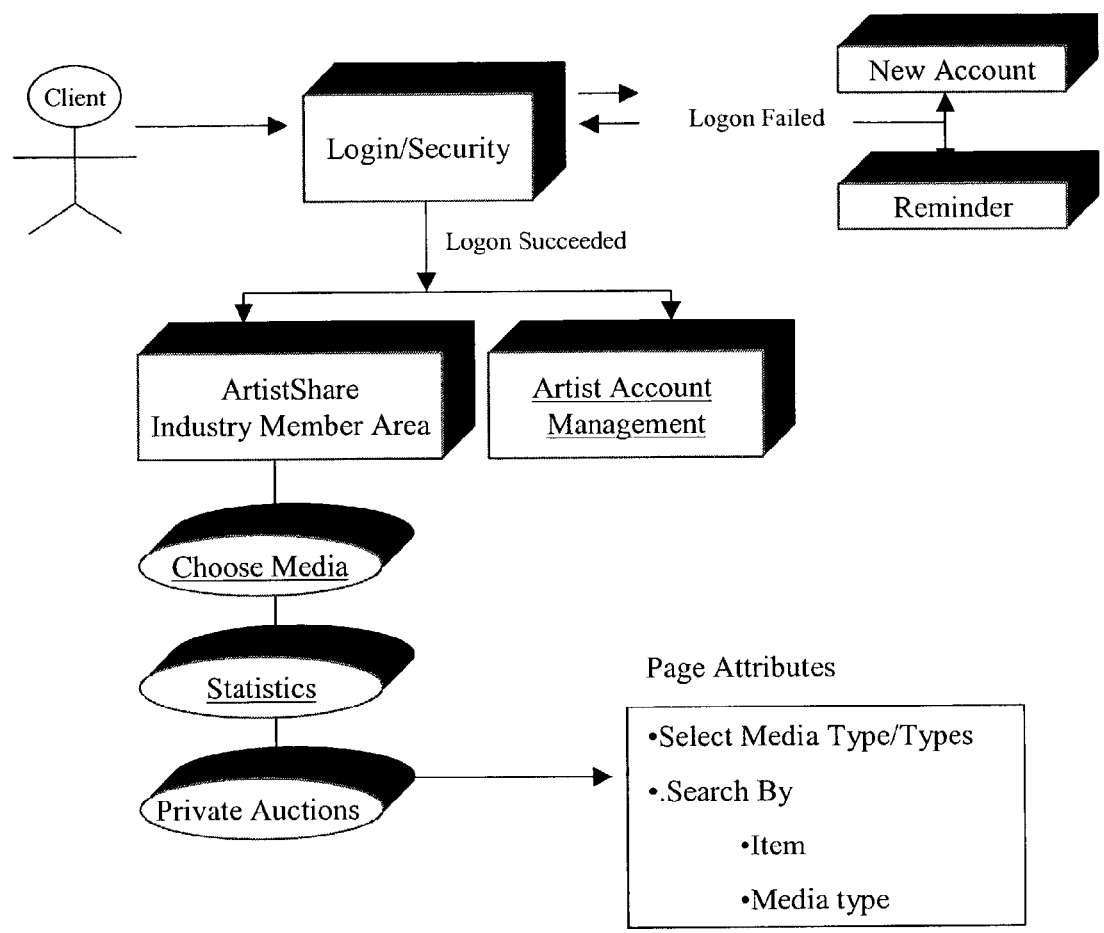

FIGS. 58-62 illustrate attributes of one or more web pages and/or one or more links associated with accounts for industry professionals, investors, and the like. These attributes may include perusing and selecting media of artists (FIG. 59), accessing statistics associated with an artist, project and/or media (for example) including sales, hits on web pages, demographics, and fan base statistics (FIG. 60). A web-page(s) and/or link(s) may also be provided to host private auctions by artists to industry professionals or investors. (FIG. 61). One or more web-pages and/or one or more links for account management (FIG. 62), allows an industry individual or investor to manage his account and may be similar to those of a Fan Account Management pages (FIGS. 50-57).

Group II Embodiments

Rather than turning over the copyright, publishing right, manufacturing rights, merchandising rights and/or distribution rights to a third party (a record company in this example), other related embodiments of the invention include the selling/auctioning or licensing rights of a project by the artist through ArtistShare.

Interested parties may access one or more databases of completed projects via the ArtistShare server (host), for example, which specify the availability of various rights for sale, auction or license, which may be interacted with via a client computer of an interested party. Thus, the interested party (e.g., industry professional, investor) may query the database to find particular projects and apply the query to a field of the database which in this case may include the type of music, the name of the artist, the age of the artist, the gender of the artist, lengths of songs, lengths of albums, and the like. The results may return a list of available projects having rights available for sale or license. Each project may include a hyperlink to a webpage for the project, which may include the rights available for sale or license, and a detailed description of the project.

Thus, record companies, distributors, merchandisers and retail stores may either buy outright or bid on the exclusive manufacturing, distribution, publishing rights to ArtistShare projects. This allows them to release a packaged, commercial product (compact disc of the recording) in retail outlets (record stores). Parties purchasing or licensing such rights reduce risk of investing as they'll be able to monitor a product's potential success based upon it's online success (e.g., artist popularity with fans, hits on pages, etc.).

The ArtistShare system may include one or more software based tools (for example) for allowing an interested party in gauging whether the rights to a project may be worth purchasing or licensing. Specifically, in an embodiment of the invention, the tools may analyze certain aspects of the projects and artist (e.g., tracking such aspects). These aspects may include but are not limited to past sales of other projects, number of patronage, demographics of patronage, hits associated with the project and/or other web-pages of the artist, and the like. These aspects, as one of skill in the art will appreciate, are tacked by various databases (remote or local) upon which the ArtistShare server communicates with. Accordingly, these aspects may be also be queried to return results of the degree of popularity amongst fans, industry professionals, other artist, etc. Thus, by using such queries, an interested party may determine the likely success of a project.

Accordingly, in the present group of embodiments, a method of managing a right in a creative work is provided and may be operable on a client-server computer system as previously described. The method may include collecting information on a plurality of creative works in a database. Each of the creative works may include one or more corresponding rights (distribution, publishing, IP, and the like) for sale or license. The database may then be searched by interested individuals for specific creative works having rights being offered for sale or license. Upon finding a particular creative work, the interested individual can purchase or license a corresponding right.

Group III Embodiments

Figure 4:
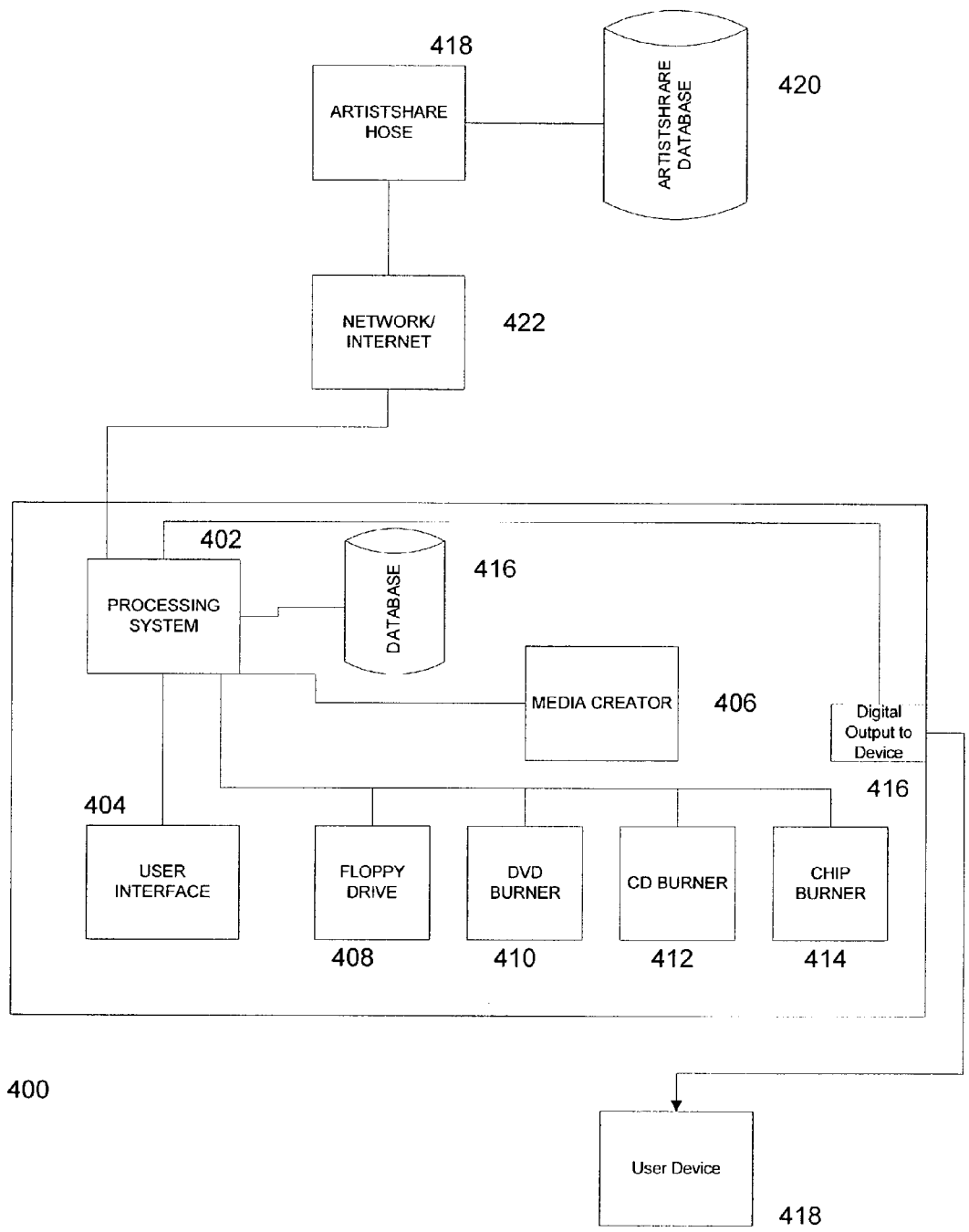
FIG. 4 illustrates a kiosk system according to an embodiment of the invention.

FIG. 4 illustrates one possible embodiment of Group III, which may include a system provided in a retail or distribution setting, which is linked to an ArtistShare database (preferably a live-online connection, however, a localized database which is routinely updated may also be used). The system may include a library of available content from Artists of ArtistShare. Such a system may be a kiosk.

As shown in FIG. 4, a kiosk 400 includes a processing system 402 that may be any computing device capable of being interconnected with the ArtistShare host server 418 and an associated one or more databases 420, via, for example, the Internet 422. According, the computing device may be a personal computer with a high-speed connection (DSL, cable, T-1), containing the usual computer hardware (e.g., processor, RAM and ROM memory, hard-drive, removable media drive(s), keyboard, mouse, display, loudspeaker, and the like), or a custom designed kiosk system having similar equipment to allow processing of information (e.g., processing system 402. The equipment allows graphical-user-interface software to produce a graphical user interface 404 on a display to operate thereon so that users of the system can interact with the ArtistShare system and query the relevant databases to find media (songs and albums for example) for any artist and/or media type. Customers may then select one or more media items for preview or purchase. Accordingly, after the media items are selected, a media creator 406 may be provided (e.g., software for creating digital copies onto readable mediums like, for example, burning CDs and the like) allowing the digital information of the selected items to be placed on media for purchase. Accordingly, the items may be stored on any type of media storage device having sufficient memory. Thus, the kiosk may include a floppy drive 408 to store media on 3½" disks, a DVD burner 410 to burn DVDs, a CD burner 412 to burn CDs, and a chip "burner" 414, which may store information to a memory chip, including, for example, smartmedia, memory stick, and compactflash cards, for example, or any other future medium for data storage. Alternatively, via the media creator 406, or via the processor, the digital media may be downloaded via an output 416 to a user device such as an MP3 player, for example. The connection between the user device and the kiosk may be any digital connection including serial, parallel, firewire, USB and the like or any future method of transferring and/or storing data.

Thus upon the kiosk being placed in any retail/distribution environment (a consumer music store or distribution warehouse for example), a customer or client using the graphicaluser-interface may be able to select songs from a database of available content where the system may establish the number of songs to be copied based on each song that is selected (e.g., 1-20) and then have them burned onto a CD, right there. The completed product is presented to the user within a short period of time (e.g., 5-15 minutes,—as technology progresses, this time is likely to be substantially shortened.), sent via courier to a specified address, available for immediate transfer to a personal device or delivered using any present or future technology.

The kiosk system may be used in the alternative to a client workstation for a fan, patron or other individual, allowing one using the kiosk system to register with an artist on the ArtistShare system, and make contributions and/or receive entitlements (burned CD/DVD). The kiosk system may also be any computer system configuration which allows anyone (artist or industry) to present artists' works for license or sale where the artist and artist's work information is accessed, media is presented for preview or purchase, requests for media and information are tracked and sales are generated.

Having now described a few embodiments of the invention, it should be apparent to those skilled in the art that the foregoing is merely illustrative and not limiting, having been presented by way of example only. Numerous modifications and other embodiments are within the scope of ordinary skill in the art and are contemplated as falling within the scope of the invention as defined by the appended claims and equivalents thereto. The contents of any references cited throughout this application are hereby incorporated by reference. The appropriate components, processes, and methods of those documents may be selected for the invention and embodiments thereof.

What is claimed is:

1. A system for marketing and funding one or more projects of an artist comprising a server having applications programs operable from a remote site for:
   providing software tools to an artist or Account Manager to manage at least one project, the project comprising at least one creative work;
   receiving information from the artist or Account Manager regarding at least one Sales Container associated with the at least one project, each Sales Container including at least one of a product, a service, and a patronage, while the artist retains outright ownership of the project and the creative work;
   transmitting offer data from a server to a client via a network, the offer data comprising an offer to Fans concerning the at least one Sales Container associated with at least one project, wherein the offer is for a Sales Container at a predetermined level of patronage in exchange for funds for the project;
   receiving at the client such offer data and presenting the offer to the Fan;
   transmitting acceptance data back to the server from the client accepting the offer;
   processing the acceptance data by the server;
   registering contact and marketing information regarding Patrons in a database; and
   providing the artist or Account Manager software tools to manage communications, through said Patron database, to Patrons regarding the sales and marketing of one or more projects.

2. The system according to claim 1, wherein the funds are used to finance the project.

3. The system according to claim 1, wherein the project is an incomplete project or a completed project.

4. The system according to claim 1, wherein the level of patronage comprises a particular sales container containing at least one entitlement for delivery to the interested party.

5. The system according to claim 4, wherein the funds are provided at a predetermined time.

6. The system according to claim 5, wherein the sales container containing at least one entitlement is provided to the interested party at a predetermined time.

7. The system according to claim 1, wherein the project is selected from the group consisting of: music/audio projects, film projects, printed/written projects, services project, visual art projects, multimedia projects, syndicated content projects and any creative work or service and any combination of the foregoing.

8. The system according to claim 1, wherein the offer is presented in at least one of the following manners: an auction, a point of sale, a subscription, a license, a pre-sale of the creative work, and a sponsorship.

9. The system according to claim 1, wherein the acceptance data comprises an acceptance to the offer at a level of participation among a plurality of levels.

10. The system according to claim 1, wherein the project upon completion is forwarded to the interested party via at least one of streaming media, at least one downloadable file, mail order, in person and/or by telephone.

11. The system of claim 1, wherein the server further includes at least one application program operable from a remote site for allowing Patrons to demonstrate interest in one or more projects prior to, during, and after creation and publication of the artist's completed project.

12. The system of claim 11 wherein the software program allowing Patrons to demonstrate interest in one or more projects specifies one or more sales containers which offer to Patrons the opportunity to be involved in the artist's creative work process.

13. The system of claim 12, wherein the opportunity to be involved in the artist's creative work process may include at least one of access to rough mixes, photos or videos from recording sessions or outtakes, invitations to recording sessions, and access to sheet music accompanying the work.

14. The system of claim 12, wherein sales containers are comprised of inventory items including access to downloadable songs, sheet music or scores, music lessons, custom song writing, personal interaction between artist and Patron, or digital and/or physical access to the creative work process of a work not yet created, partially created, or fully created.

15. A system for an artist to fund and market one or more projects comprising:
   processing means for providing software tools to an artist or Account Manager to manage at least one project, the project comprising at least one creative work;
   receiving means for receiving information from the artist or Account Manager regarding at least one Sales Container associated with the at least one project, each Sales Container including at least one of a product, a service, and a patronage, while the artist retains outright ownership of the project and the creative work;
   transmitting means for transmitting offer data from a server to a client via a network, the offer data comprising an offer to Fans, wherein the offer is for a Sales Container at a predetermined level of patronage in exchange for funds for the project;
   receiving means for receiving at the client such offer data and presenting the offer to at least one of Fans and Patrons;
   transmitting means for transmitting acceptance data back to the server from the client accepting the offer;

processing means for processing the acceptance data by the server;

transmitting means for transmitting to the artist or Account Manager information pertaining to the acceptance data and Patrons; and communication means for receiving from the artist or Account Manager at least one communication regarding the creative work process and directing said communication to at least one Patron, wherein the entitlement allows the interested party to participate in the project by receiving physical and/or digital content relating to the project.

16. The system of claim 15, wherein said communication means includes data base records pertaining to Patrons, said data base records being managed by the system.

17. A system for raising funds for and marketing one or more of an artist's projects to Patrons through the internet, without the necessity of a recording contract with a recording company and without the necessity of a production company, comprising a server having application programs operable from a remote site for:

allowing Patrons to demonstrate interest in one or more projects prior to, during, and after creation and publication of the project's artistic work;

registering contact information regarding interested Patrons in a searchable database;

providing to the artist or Account Manager software tools to design, create, and implement an artist-specific web page for the purpose of marketing said artist's projects to existing and new Patrons without the necessity of a contract with a recording company and without the necessity of a production company;

managing communications, through said patron database, from the artist or Account Manager to Patrons regarding sales and marketing of one or more projects; and managing and viewing financial and marketing information relative to projects supported through the system.

18. System for funding and marketing at least one project of an artist comprising:

a server having application programs operable for:

receiving data from an artist or Account Manager regarding at least one project by an Artist;

providing tools for the artist or Account Manager to present the at least one project to at least one of Fans and Patrons;

receiving data from the artist or Account Manager regarding at least one entitlement associated with at least one of the Artist and the project, said entitlement including at least one of a product, a service, and patronage, but not ownership in the project;

transmitting offer data to said Fans or Patrons, the offer data comprising an offer for said at least one entitlement at a predetermined level of patronage in exchange for funds for the project, the project comprising at least one creative work; and receiving acceptance data for an entitlement at a predetermined level of patronage from a Patron.

19. The system according to claim 18, wherein the project is an incomplete project or a completed project.

20. The system according to claim 18, wherein the level of patronage comprises a particular sales container containing at least one entitlement for delivery to the interested party.

21. The system according to claim 18, wherein the server further includes at least one application program operable from a remote site for receiving funds from a Patron.

22. The system according to claim 21, wherein the accepted entitlement is made available to the Patron at or after the time of receiving funds from the Patron.

23. The system according to claim 18, wherein the project is selected from the group consisting of: music/audio projects, film projects, printed/written projects, services project, visual art projects, multimedia projects, syndicated content projects and any creative work or service and any combination of the foregoing.

24. The system according to claim 18, wherein the offer is presented in at least one of the following manners: an auction, a point of sale, a subscription, a license, a pre-sale of the creative work, and a sponsorship.

25. The system according to claim 18, wherein the acceptance data comprises an acceptance to the offer at a level of participation among a plurality of levels.

26. The system according to claim 18, wherein the project upon completion is forwarded to the interested party via at least one of streaming media, at least one downloadable file, mail order, in person, and by telephone.

27. The system according to claim 18, wherein the server further includes at least one application program operable from a remote site for registering contact and marketing information regarding Fans and/or Patrons in a database.

28. The system according to claim 18, wherein the server further includes at least one application program operable from a remote site for transmitting data regarding at least one of the Artist and the project to at least one of Fans and Patrons.

29. The system according to claim 18, wherein the step of providing tools includes providing content management software accessible by the Account Manager.

30. The system according to claim 18, wherein the server further includes at least one application program operable from a remote site for receiving an artist's completed project.

31. The system according to claim 18, wherein the server further includes at least one application program operable from a remote site for receiving at least one entitlement associated with at least one of the project and artist.

32. The system according to claim 31, wherein the server further includes at least one application program operable from a remote site for converting the received entitlement into a digital format so as to be accessible by at least one Patron.

33. The system according to claim 18, wherein the at least one entitlement comprises at least one product associated with the artist's creative work process of the project.

34. The system according to claim 18, further comprising:

registering contact and marketing information regarding Patrons in a database; and providing the artist or Account Manager software tools to manage communications directly to Patrons regarding the sales and marketing of one or more projects.

35. System for funding and marketing at least one project of an artist comprising:

a server having application programs operable for:

receiving data from an artist or Account Manager regarding at least one project by an Artist;

providing tools for the artist or Account Manager, without the necessity of a recording company and without the necessity of a production company, to present the at least one project to at least one of Fans and Patrons;

receiving data from the artist or Account Manager regarding entitlements associated with at least one of the Artist and the project;

transmitting offer data to said Fans and/or Patrons, the offer data comprising an offer for at least one entitlement at a predetermined level of patronage in exchange for funds for the project, the project comprising at least one creative work; and receiving acceptance data for an entitlement at a predetermined level of patronage from a Patron.

36. System for funding and marketing a plurality of projects of an artist, the system comprising:

a server having application programs operable for:

receiving data from an artist or Account Manager regarding a first project by an Artist;

providing tools for the artist or Account Manager to present the first project to Fans of the artist;

receiving data from the artist or Account Manager regarding at least one entitlement associated with the first project, said entitlement including at least one of a product, a service, and patronage;

transmitting offer data to said Fans, the offer data comprising an offer for said at least one entitlement at a predetermined level of patronage in exchange for funds for the project, the project comprising at least one creative work;

receiving acceptance data from a Fan for an entitlement at a predetermined level of patronage;

registering the Fan as a Patron in a Patron database and storing contact information regarding the Patron; and managing communications, through said Patron database, from the artist or Account Manager to Patrons regarding sales and marketing of one or more additional projects.

37. System according to claim 36, further comprising:

receiving data from an artist or Account Manager regarding a second project by the Artist;

providing tools for the artist or Account Manager to present the second project to Fans of the artist;

receiving data from the artist or Account Manager regarding at least one entitlement associated with the second project, said entitlement including at least one of a product, a service, and patronage; and transmitting offer data to said Fans and/or Patrons, the offer data comprising an offer for said at least one entitlement at a predetermined level of patronage in exchange for funds for the project, the project comprising at least one creative work.

\* \* \* \* \*